United States Patent [19]
King et al.

[11] Patent Number: 5,351,231
[45] Date of Patent: Sep. 27, 1994

[54] PROGRAMMABLE MARK DETECTION AND WINDOWING FOR OPTICAL DISK CONTROLLERS

[75] Inventors: Larry King, Boulder; Trent Dudley, Littleton; Roger McPherson, Westminster, all of Colo.

[73] Assignee: Cirrus Logic, Inc., Fremont, Calif.

[21] Appl. No.: 868,011

[22] Filed: Apr. 13, 1992

[51] Int. Cl.⁵ .............................. G11B 7/00
[52] U.S. Cl. ........................ 369/124; 369/48
[58] Field of Search ............ 369/124, 48; 360/53

[56] References Cited
U.S. PATENT DOCUMENTS 4,663,752  5/1987  Kakuse et al. ................ 369/48
5,083,303  1/1992  Yanagida et al. ............. 369/48

Primary Examiner—Jack I. Berman
Attorney, Agent, or Firm—Blakely, Sokoloff, Taylor & Zafman

[57] ABSTRACT

Described in detail herein are the detection and windowing capabilities of the present invention which are critical for reading correct data in normal operations and recovering data during error conditions. Also described herein are the various programmable features of the detection windows of the invention. The flexibility of these features allows the designer to optimize the optical controller for the unique requirements of the particular optical drive and medium in use.

14 Claims, 3 Drawing Sheets

SM330 Windowing Algorithm

| SM | VF01 | AM | ID1 | VF02 | AM | ID2 | VF02 | AM | ID3 | PA |
|----|------|----|-----|------|----|----|------|----|-----|----|
| 5  | 12   | 1  | 5   | 8    | 1  | 5  | 8    | 1  | 5   | 1  |

Pre-Formatted Area of the Sector Format

*Figure 1*

CASE 1

CASE 2

CASE 3

CASE 4

Timing Relationships Between SMDET and TSMDET Signals

PROGRAMMABLE MARK DETECTION AND WINDOWING FOR OPTICAL DISK CONTROLLERS

BRIEF SUMMARY OF THE INVENTION

The preferred embodiment of the present invention is embodied in the CL-SM330 Optical Disk ENDEC/ECC, designed to work with the CL-SM331 SCSI Optical Disk Controller (both of which are manufactured and sold by Cirrus Logic, Inc. of Fremont, Calif.) to provide a SCSI (small computer systems interface) optical disk controller solution with minimal hardware. The function of the SM330 component in this optical controller chip set is to perform the encoding and decoding of the raw RLL encoded data written to and read from the disk, and to perform the error detection and correction functions.

One facet of the data decoding that the SM330 performs is to convert the encoded (2,7) RLL data pattern into the serial NRZ data which is transferred to the SM331, and subsequently transferred in bytes to the SCSI host. Before any decoded NRZ data is sent to the SM331 however, the correct sector must be detected, and the SM330 must be synchronized to the incoming data stream from the optical drive. Detection of the correct sector and maintaining synchronization throughout the sector are achieved with the detection and windowing capabilities of the SM330.

Described in detail herein are the detection and windowing capabilities of the SM330, which are critical for reading correct data in normal operations and recovering data during error conditions. Also described herein are the various programmable features of the SM330 detection windows. The flexibility of these features allows the designer to optimize the optical controller for the unique requirements of the particular optical drive and medium in use.

BRIEF DESCRIPTION OF THE DRAWINGS

FIG. 1 illustrates the Pre-Formatted Area of a sector.

DETAILED DESCRIPTION OF THE INVENTION

Figure 2:
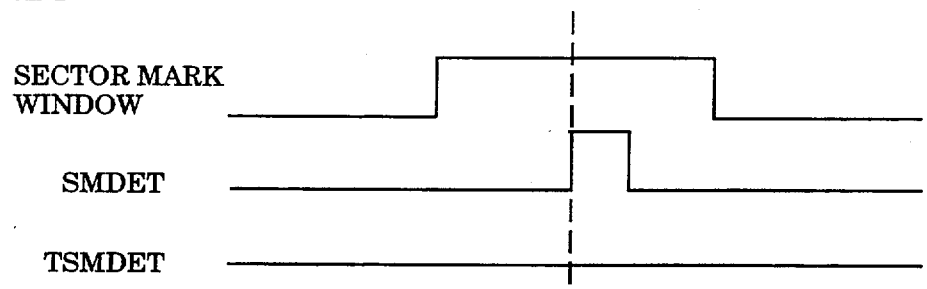
FIG. 2 shows the four possible cases that can occur with the timing of SMDET with respect to TSMDET.
Figure 2:
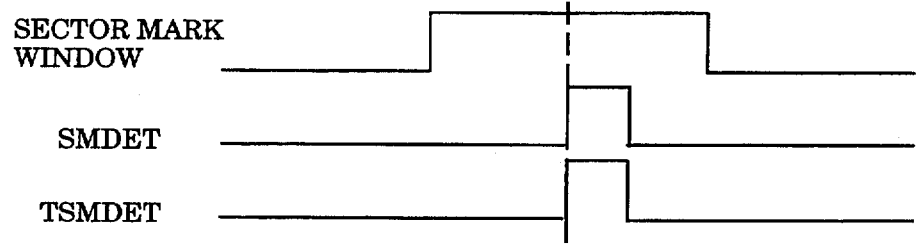
Figure 2:
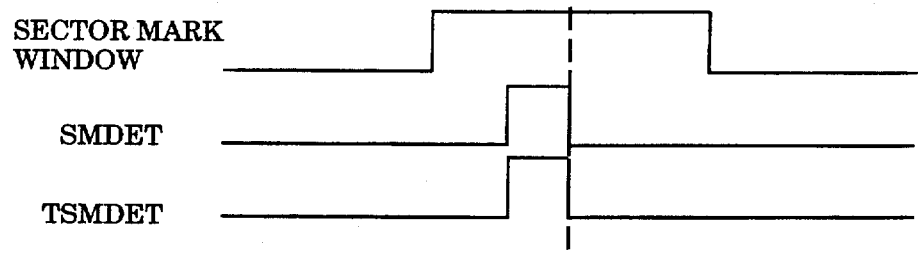
Figure 2:
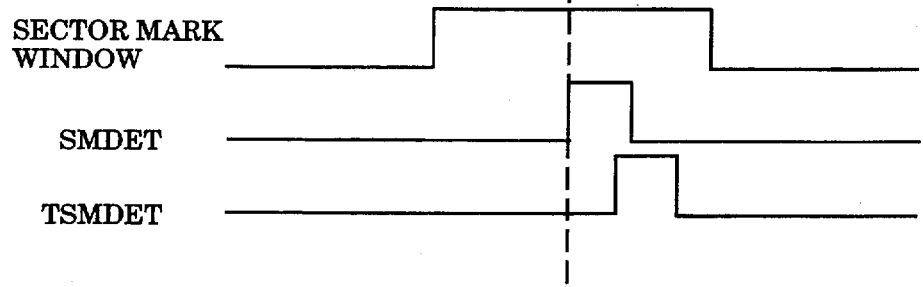

As described in the Brief Summary of the Invention section, the preferred embodiment of the present invention is embodied in the CL-SM330 Optical Disk ENDEC/ECC, designed to work with the CL-SM331 SCSI Optical Disk Controller (both of which are manufactured and sold by Cirrus Logic, Inc. of Fremont, Calif.) to provide a SCSI (small computer systems interface) optical disk controller solution with minimal hardware. The function of the SM330 component in this optical controller chip set is to perform the encoding and decoding of the raw RLL encoded data written to and read from the disk, and to perform the error detection and correction functions.

One facet of the data decoding that the SM330 performs is to convert the encoded (2,7) RLL data pattern into the serial NRZ data which is transferred to the SM331, and subsequently transferred in bytes to the SCSI host. Before any decoded NRZ data is sent to the SM331 however, the correct sector must be detected, and the SM330 must be synchronized to the incoming data stream from the optical drive. Detection of the correct sector and maintaining synchronization throughout the sector are achieved with the detection and windowing capabilities of the SM330.

Described in detail herein are the detection and windowing capabilities of the SM330, which are critical for reading correct data in normal operations and recovering data during error conditions. Also described herein are the various programmable features of the SM330 detection windows. The flexibility of these features allows the designer to optimize the optical controller for the unique requirements of the particular optical drive and medium in use.

Special Mark Detection Requirements

The most common operations performed by an optical controller are to read or write a sector or group of sectors. Before reading or writing a particular sector, the correct sector ID must be found. The Sector Mark and ID fields are located in the "Pre-Formatted Area" for rewritable, magneto-optic (MO) disks. Once the correct sector has been found, the SM330 must maintain bit synchronization with the sector data field (during a read operation), so that the data is read exactly as it was written. Thus the requirements of the data detection function are to 1) correctly detect the sector to be read, written or erased and 2) maintain bit synchronization while the sector data is being transferred.

Detection Windows

The concept of windows will be used throughout this document, so it is useful to explain the basic concept of windowing at this point. While reading this document, it would also be helpful to refer to Appendix D for the CL-SM330 data sheet, which provides the ANSI/ISO standard track formats for 90 mm and 130 mm media with sector sizes of 512 or 1024 bytes per sector. Also for reference, a set of circuit drawings for one embodiment of the invention is provided as Appendix B, the signal definitions therefor being provided in Appendix A. Appendix C provides the source code for the Window Sequence.

While reading or writing a sector of data, several different fields or events must be detected in the order they appear in the Pre-Formatted Area and data field. For example, the Address Mark detection must occur after the Sector Mark detection. To minimize the possibility of false detection of these fields, a windowing scheme is used. A detection window is a time frame in which the detection of a particular field is enabled. These detection windows (such as the Sector Mark window or Address Mark window) are internal to the SM330 and are based on the REF2F input clock, which is twice the NRZ data rate and equal to the RLL bit rate. The REF2F clock provides an ideal frequency at which the data is read from the disk. The actual data rate will deviate from the ideal frequency due to speed variations of the drive. Thus, the detection windows should be wide enough to account for speed variations of the drive motor and the sector size. Other factors also affect the detection windows for specific events, which will be discussed in later sections.

Sector Mark Detection

The Pre-Formatted Area of a sector is shown in FIG. 1. The first field in the Pre-Formatted Area is the Sector Mark Field. The Sector Mark consists of an embossed pattern of long marks and long spaces which does not occur in a normal data pattern. This unique pattern is designed to enable the drive to identify the start of a sector without the use of a phase-locked loop (PLL). The following SM330 registers are used to control Sector Mark detection:

| 11h | Configuration Register 2 |
| --- | --- |
| 24h | Sector Mark Control Register |
| 28h | Window Control Register |
| 2Ah | Sector Mark/ALPC Length |

The first thing the SM330 will look for during a read or write operation is a valid Sector Mark. The SM330 detects a Sector Mark by examining the raw data from the disk on the RAWIN input (pin 94). After power-up or head repositioning, a Sector Mark Reset should be issued by writing to the Sector Mark Control Register (24h). A Sector Mark Reset will disable the Sector Mark window until a valid Sector Mark has been found with the Sector Mark detection circuitry continuously active. After a Sector Mark has been found, Sector Mark windowing is enabled. The Sector Mark windowing can also be completely disabled by setting bit 6 of the Window Control Register (28h), which may be useful in sector size determination or Search ID operations.

The size and position of the Sector Mark window is a function of the medium size (90 or 130 mm), the sector size (512 or 1024) and the speed tolerance of the drive motor (0.5 or 1.0%). These parameters are programmed in Configuration Register 2 (11h). In addition, the positions of the address mark and data sync mark windows with reference to the sector mark window are controlled by bits 7-6 of the Sector Mark Control Register (24h). These bits will indicate whether the windows should be positioned normally, delayed or advanced depending on the speed of the disk being normal, slow or fast respectively. More details about the Sector Mark windowing are provided in a later section.

Sector Mark Thresholds

Sector Mark detection is contingent on the Sector Mark-Mark Threshold and the Sector Mark-Space Threshold, which are programmed in bits 5-0 of the Sector Mark Control Register (24h). These thresholds determine the minimum number of long marks and long spaces that must be correctly detected in qualifying a valid Sector Mark. The mark threshold has a range from zero to five and the space threshold has a range from zero to four. It is recommended that mark and space thresholds of at least four and three respectively be used to insure that false detection does not occur. Lower values for the mark and space thresholds can be used for error recovery.

Additional Sector Mark Controls

The Sector Mark/ALPC Length Register (2Ah) provides additional control over the Sector Mark detection. When Reg. 2Ah, bit 7 is reset, the Sector Mark detection circuit will ignore the first mark bit or first space bit at the boundary of a space to mark or mark to space transition respectively. When bit 7 is set, the Sector Mark detection circuit will ignore the first two bits of the mark or space at each boundary.

Also, Sector Mark Asymmetry Compensation can be enabled (Reg. 2Ah, bit 6 is set). If this mode is enabled, then bit 5 will determine whether the mark lengths are lengthened or shortened by one-half of one REF2F clock period in the Sector Mark detection circuitry.

Pseudo Sector Marks and True Sector Marks

There are two signals related to the Sector Mark detection, SMDET (Sector Mark Detected) and TSMDET (True Sector Mark Detected). The SMDET signal is set when a true Sector Mark detected or when a Pseudo Sector Mark is generated, whichever occurs first. TSMDET is set when a true Sector Mark is detected.

A true Sector Mark is detected (and TSMDET is asserted) when both the Sector Mark-Mark and Sector Mark-Space thresholds have been satisfied within the Sector Mark window. A Pseudo Sector Mark is generated (SMDET is asserted) at the expected position of the Sector Mark detection within the Sector Mark window. FIG. 2 shows the four possible cases that can occur with the timing of SMDET with respect to TSMDET. For each of these four cases, the following assumptions were made:

(i) 512-byte sector size, 0.5% speed tolerance
(ii) The previous Sector Mark has been found.
(iii) The current Sector Mark is been searched for with a Sector Mark window that is eight NRZ clock bytes wide.

The nominal expected position of the Sector Mark is in the center of the Sector Mark window for each case.

CASE 1: The true Sector Mark is not found within the Sector Mark window. A Pseudo Sector Mark is generated and SMDET is asserted at the nominal position in the Sector Mark window. TSMDET is not asserted.

CASE 2: The true Sector Mark is found at the nominal (center) position in the Sector Mark window. A Pseudo Sector Mark is generated at the nominal position in the Sector Mark window and SMDET is asserted. Likewise, TSMDET is also asserted at this time since a true Sector Mark has been found. The exact position of SMDET will vary from the exact position of TSMDET by +/−2 REF2F clocks.

CASE 3: The true Sector Mark is found early in the Sector Mark window. Since the Sector Mark is found before the Pseudo Sector Mark can be generated at the nominal position, both SMDET and TSMDET will be asserted simultaneously. The timing difference between SMDET and TSMDET will vary by +/−2 REF2F clocks. The window timing logic will now adjust to this Sector Mark as the new nominal position for calculating subsequent window positions.

CASE 4: The true Sector Mark in found late in the Sector Mark window. A Pseudo Sector Mark will be generated at the nominal position in the Sector Mark window and SMDET will be asserted. When the true Sector Mark is found later in the window, TSMDET will be asserted. The window timing logic will now adjust to the true Sector Mark as the new nominal position for calculating subsequent window positions.

Another note about the Pseudo Sector Mark: After a Sector Mark Reset, the generation of a Pseudo Sector Mark (along with the Sector Mark windowing) is inhibited until a true Sector Mark has been detected. Also, an optional interrupt can be generated when a true Sector Mark is not detected and a Pseudo Sector Mark is generated. This interrupt is enabled by setting bit 7 of the Media Error Enable Register (21h). When this bit is set, the sector for which the Pseudo Sector Mark was generated will not be read or written and the operation will be aborted.

The SMDET signal is connected to the SMDET input (pin 18) of the CL-SM331. SMDET is used by the Format Sequencer in the SM331 as an indication to branch to the next sequence in the Writable Control Store (WCS). The TSMDET signal can be optionally used by the drive servo system.

Sector Mark Window and Read Gate Positions

After a Sector Mark is detected, the VFO1 field immediately follows. The Device Read Gate signal (DRG, pin 86) should be asserted at this time so that the PLL can achieve initial phase and frequency lock to the repetitive VFO1 pattern. In normal operating conditions DRG should not be asserted while the Sector Mark is being read in order to prevent the PLL from locking to the low frequency pattern of the Sector Mark.

The assertion of DRG with respect to the Sector Mark window is a function of the window position programmed in the Sector Mark Control Register (Reg. 24h, bits 7–6). These bits determine whether the windows are positioned nominally, delayed or advanced. The assertion of DRG with respect to these window positions will be described:

(i) Advanced Window Position (Reg. 24h, bits 7–6=10b). In this case, the disk is assumed to be spinning fast by either 0.5% or 1.0% according to the value programmed in Configuration Register 2. The detection of the Sector Mark is expected to be early in the Sector Mark window, and DRG will be asserted before the nominal position of the Sector Mark window. This timing mode should only be used in recovery operations.

(ii) Nominal Window Position (Reg. 24h, bits 7–6=00b). The operation of this mode is identical to that of the Advanced Window Position. This timing mode should only be used in recovery operations.

(iii) Delayed Window Position (Reg. 24h, bits 7–6=01b). The disk is assumed to be spinning slow by either 0.5% or 1.0% according to the value programmed in Configuration Register 2. After the Sector Mark is found (and TSMDET asserted) within the Sector Mark Window, DRG will be asserted, allowing the PLL to lock to the VFO1 data pattern. If the Sector Mark is not found, then DRG is asserted at the end of the Sector Mark window to ensure that the VFO1 field has been entered. The Delayed Window Position is the recommended operating mode for the SM330.

Address Mark Detection

In addition to the detection of the Sector Mark, the ID Address Marks of a sector must be detected to establish bit and byte synchronization for the ID fields. The detection of the Address Marks is also windowed to prevent false detection. The ID Address Mark is a special one-byte pattern containing a run-length violation of the (2,7) RLL code. Each ID Address Mark is preceded by a VFO sync field and is followed by the ID/CRC field (***see Appendix D of the SM330 data sheet). There are three AM/ID fields in the Pre-Formatted Area of each sector. This is done for redundancy in case one or two of the AM/ID fields is corrupted or cannot be read by the PLL.

The following SM330 registers are used for AM/ID field detection:

| | |
|---|---|
| 24h | Sector Mark Control Register |
| 26h | ID Field/Data Sync Control Register |
| 28h | Window Control Register |

The Sector Mark Control Register will adjust the position of the AM window (normal, delayed, or advanced) based on the assumed speed of the drive. This feature is also used for the Sector Mark and Data Sync window positions. Bits 5–4 in the ID Field/Data Sync Control Register (26h) determine the ID Voting Threshold. This threshold will determine how many error-free ID fields must be read for the operation to continue without reporting an ID error. It is also possible to disable the AM window altogether by setting bit 5 in the Window Control Register (28h). This will make AM detection active throughout the entire Pre-Formatted Area. The windowing for the AM field will be explained in a later section.

Prior to the beginning of the VFO1 field, the external PLL is locked to the reference clock (REF2F) frequency. At the beginning of the VFO1 field, the PLL will switch its input from the REF2F reference frequency to the actual disk data and lock to the bit pattern in the VFO field. It is possible that defects in any of the VFO fields could put the PLL out of lock and prevent the Address Marks from being detected. This problem could be solved by skipping the first ID field, the first two ID fields or all three of the ID fields by programming bits 1–0 in the Window Control Register (28h). These bits control the assertion of DRG, thus allowing the PLL to skip over a defective ID field.

ID/CRC Field Detection

Before starting a read or write operation, the Target Sector and Target Track registers (14–16h) are set for the first desired sector to be read or written. The ID Found signal will be asserted when the correct sector ID has been found. IDF is asserted at the end of the Pre-Formatted Area after the following conditions have been met:

(i) The minimum number of error-free ID fields have been read as specified by the ID Voting Threshold (Reg. 26h, bits 5–4). An error-free ID field is defined as an ID field in which a valid Address Mark and ID field with good CRC have been found.

(ii) The track and sector information read from each error-free ID field matches the Target Sector and Target Track registers.

The IDF signal is used by the Format Sequencer in the SM331 as a branch condition in the sequencer control store (WCS).

Data Sync Mark Detection

The Data Sync Mark allows the SM330 to synchronize to the sector data field. The detection of the Data Sync Mark is also windowed to minimize the chance for false detection. Thus, we have seen that the Sector Mark detection, Address Mark detection, and now the Data Sync Mark detection are critical elements required for proper synchronization to the disk data. All three of these special marks are windowed to prevent false detection. Whenever a Sector Mark, Address Mark or Data Sync Mark is detected, the window timing logic will adjust to this special mark as the new nominal position for calculating subsequent window positions.

The following SM330 registers are used for Data Sync Mark detection:

| | |
|---|---|
| 26h | ID Field/Data Sync Control Register |
| 28h | Window Control Register |

The Data Sync Mark consists of a special three-byte pattern which indicates the beginning of the user data. The SM330 divides the RLL channel bit pattern into 12 four-bit groups and compares them to the Data Sync Mark pattern in order to detect a valid Data Sync Mark. The Data Sync Mark Threshold bits in the ID Field-/Data Sync Control Register (Reg. 26h, bits 3-0) determine the minimum number of four-bit groups that must be correctly matched in order for the Data Sync Mark to be found. A typical value to use is nine. If the Data Sync Mark Threshold is set to zero, then the Skip Data Sync Mark Mode is activated. This mode will be fully discussed in the Resync Mark description. The next section will describe how the Sector Mark, ID Address Mark and Data Sync Mark detection windows are controlled by the SM330 windowing method.

Special Mark Windowing

A brief description of the Sector Mark, ID Address Mark and Data Sync Mark windows has already been given. The registers which control the window size and position have also been described (Regs. 11h, 24h and 28h). To summarize, the window size is a function of form factor (90 mm or 130 mm), sector size and speed tolerance (0.5% or 1.0%). The window position can be delayed, advanced, or left at its nominal position. Alternately, the window can be disabled altogether.

In addition to this initial sizing of the Sector Mark, Address Mark and Data Sync Mark windows, the SM330 has a complex special mark windowing scheme which will widen the Sector Mark, Address Mark or Data Sync Mark windows when the previous special mark field cannot be found. By widening these windows, the SM330 will account for the additional uncertainty in the occurrence of these special marks due to the cumulative effects of drive speed variation.

Figure 3:
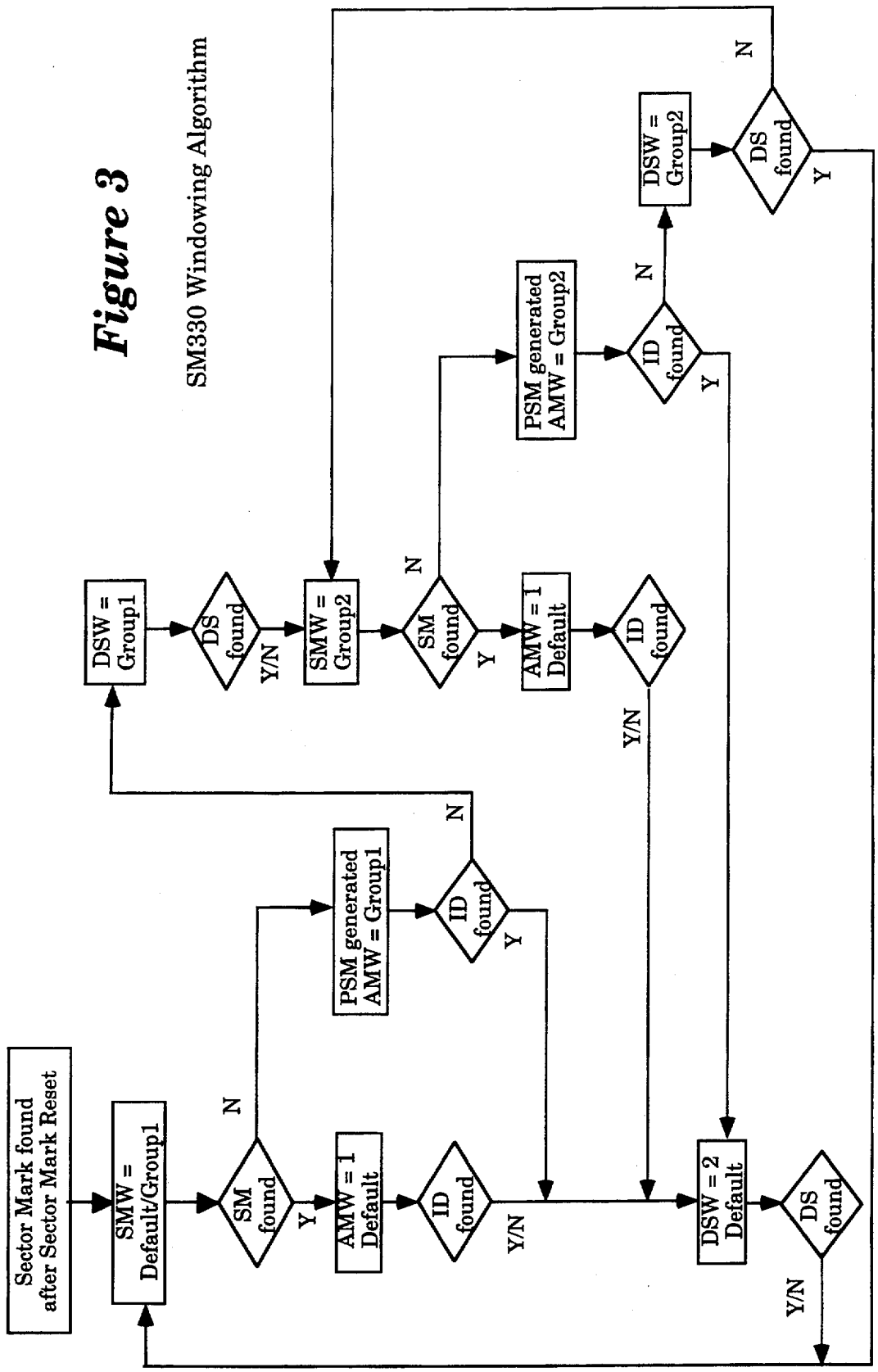
FIG. 3 and Table 1 describe in detail the method and sizes for the special mark windows, FIG. 3 presenting a flowchart describing the process in which the windows are widened.

FIG. 3 and Table 1 describe in detail the method and sizes for the special mark windows. FIG. 3 is a flowchart describing the process in which the windows are widened. The amount that the windows are widened depends on the sector size (512 or 1K) and the speed tolerance (0.5% or 1.0%) parameters, which are initialized in Configuration Register 2 (11h). In FIG. 3, the following definitions and comments apply:

| | |
|---|---|
| SM | Sector Mark |
| SMW | Sector Mark Window |
| PSM | Pseudo Sector Mark |
| AMW | Address Mark Window |
| ID | ID/Address Field |
| DS | Data Sync Mark |
| DSW | Data Sync Mark Window |

"ID found" in this flowchart means that at least one good Address Mark and ID with valid CRC was found.

A Pseudo Sector Mark generated will halt operation if Reg. 21h, bit 7 is set.

A valid ID field not found will halt operation if Reg. 21h, bit 5 is set.

A Data Sync Mark not found will halt operation if Reg. 21h, bit 3 is set. The Default, Group 1 and Group 2 window sizes are listed in Table 1.

In Table 1, the following definitions and comments apply:

E = Early window
N = Normal window
L = Late window
(Based on values programmed in Reg. 24h, bits 7-6)

Table 1 is a list of the actual window sizes in NRZ clock bytes that are used for each of the various blocks in the windowing flowchart. The window sizes are divided into four sections according to the selected form factor and sector size. In addition, each section has three size groups: Default window size, Group 1 window size, and Group 2 window size. As shown, the window sizes for the Sector Mark, Address Mark and Data Sync Mark windows also depend on the window position (early, nominal or late). The window position is programmed in bits 7-6 of the Sector Mark Control Register (Reg. 24h) as described earlier.

Example Using the SM330 Windowing Method

Due to the complexity of the windowing, it would be useful to run through an example using the windowing flowchart. Assume that we have a sector size of 512, a speed tolerance of 0.5%, and the "late" window position is selected (Reg. 24h, bits 7-6=01b). This would be a typical configuration for a 90 mm optical drive. A read operation is to be performed. Refer to FIG. 3 and Table 1 throughout this example.

1. The SM330 starts off by trying to find the Sector Mark for the first sector to be transferred. We will assume that the previous sector header has been found. This means that either the Sector Mark or at least one of the ID Fields with valid CRC for the previous sector was found. A detected ID Field implies that its corresponding Address Mark was also correctly detected. The window logic is now synchronized to the timing of the previous sector.

2. The Sector Mark window is set to its default size (eight NRZ bytes), which is the same as the Group 1 window size. The Sector Mark default window size is relatively large in order to account for the error tolerance that has been accumulated over the previous sector data field. That is, due to the speed variation of the drive, the actual position of the Sector Mark detection will vary from the expected nominal position.

3. If the Sector Mark is found, then the window logic is resynchronized to this event, and the Address Mark window is set to its default size of one NRZ byte. The Address Mark window will go active for each of the three Address Marks in the Pre-Formatted Area. The default Address Mark window size is small because the SM330 is already synchronized from the Sector Mark, and minimal error uncertainty has been introduced since the Sector Mark detection.

4. If the Sector Mark is not found, then a Pseudo Sector Mark is generated, and the Address Mark window is increased to the Group 1 size (38 bytes in this example). This increased window size takes into account the error uncertainty from the previous sector data field. The increased Address Mark window will be active over all three Address Mark/ID Field pairs.

5. When an ID Field with valid CRC has been read, the Address Mark window will reset back to its default size of one NRZ byte, and the window logic will resynchronize its timing to this event. The ID Field does not have to be the correct sector ID that the SM330 is looking for. This means that the windowing logic is independent of the assertion of the IDF (ID found, pin 51) output.

6. If an ID Field with valid CRC cannot be found, this means that the Address Mark was not detected and the window logic is out of sync with the ID data. In this case, the Data Sync Mark window will be increased to its Group 1 window size (10 NRZ bytes). The window sizing logic is not affected by whether or not a valid Data Sync Mark is detected.

7. At this point, we have read through the first sector. If the Sector Mark or any ID Field with valid CRC has been found, then the Sector Mark window will be reset to its default size, and we start back at the top of the flowchart in FIG. 3. If the Sector Mark and none of the IDs have been found, the Sector Mark window will increase to its Group 2 size.

8. Let's assume that the previous Sector Mark and IDs were not found. Now with the Sector Mark window at its Group 2 size, the error uncertainty of two sectors is taken into account. As before, if the Sector Mark is found, then Address Mark window is reset to its default size and the window logic is resynchronized to the new Sector Mark timing.

9. If the Sector Mark is not found with its Group 2 size, then a Pseudo Sector Mark is generated, and the Address Mark window is increased to its Group 2 size (39 in this example). The Address Mark window will be active over all three AM/ID Fields.

10. If any ID Field with valid CRC is read, then the Address Mark window and Data Sync Mark window will be reset to their default sizes. If no valid IDs are found, then the Data Sync Mark window will be increased to its Group 2 size (18 NRZ bytes in this example).

11. At this point, two consecutive Sector Marks have been missed, and two Pseudo Sector Marks have been generated. The detection of a valid Data Sync Mark with the Group 2 sized window will be used to resynchronize the window timing. That is, if a Data Sync Mark is detected, the Sector Mark window will reset to its default size.

12. Suppose that the Data Sync Mark was not found. The Sector Mark, Address Mark and Data Sync Mark window are now at their maximum Group 2 sizes. These windows will remain at their Group 2 sizes until a Sector Mark, ID Field or Data Sync Mark is detected.

Window Modes During Error Recovery

The special mark windowing just described is subject to the various error recovery modes programmed in the SM330 registers. These modes have a direct affect on the paths taken in the window flowchart in FIG. 3. This section will describe how various error recovery modes affect the windowing.

Pseudo Sector Mark Error

Normally, the SM330 will be programmed to abort the current operation if a Pseudo Sector Mark is generated (Reg. 21h, bit 7 is set). Thus, when a Sector Mark is not found, an interrupt will be generated and the operation is aborted. The window sizes will not be increased. During error recovery, this mode could be disabled (Reg. 21h, bit 7 is reset). The generation of a PSM will increase the size of the AM window and the operation will continue.

ID Voting Thresholds

Under normal operating conditions, the ID Voting Threshold (Reg. 26h, bits 5-4) is set as high as possible to insure data integrity (a value of two is recommended). During error recovery, the ID threshold may be decreased in order to find a bad sector ID. The operation of the Address Mark windows is independent of the ID Voting Threshold. For example, if the threshold is set to one, the default Address Mark windows will still be asserted for every ID field. In addition, the Group 1 or Group 2 Address Mark window (see Table 1) will be asserted over all three AM/ID fields.

ID Skip Control

During error recovery, it is possible to skip the first ID, first two IDs, or all three ID Fields (Reg 28h, bits 1-0). In this case, the assertion of the Address Mark windows is disabled by each skipped ID Field. For example, if the first and second ID Fields are skipped, the AM window will not be active until the third ID Field.

Data Sync Mark Window

The windowing for the Data Sync Mark is only enabled when the ID Voting Threshold is met and the sector ID matches that in the ID Target Sector and ID Target Track registers (Regs. 14h-16h). That is, even if valid IDs are found for a given sector, the Data Sync Mark will not be windowed or looked for it the Target ID does not match.

Fatal Data Sync Error

Under normal conditions, the Fatal Data Sync Error interrupt will be enabled (Reg. 21h, bit 3 is set). When the Data Sync Mark is not detected the operation will be aborted and the windowing is reset. During error recovery, this interrupt may be disabled. In this case, when a Data Sync Mark is not detected, the next Sector Mark window will be increased (see FIG. 3 ). For example, if a Sector Mark, ID Fields or Data Sync Marks are not found, then the Sector Mark window is increased to its Group 2 size.

Resetting the Windowing

After a power-up, drive selection, seek, or other break in drive orientation, it is very useful to issue a Sector Mark Reset. This is accomplished by writing to the Sector Mark Control Register (24h). The special mark windowing will be reset (see FIG. 3 ). The Sector Mark window and PSM generation will be disabled until a valid Sector Mark is detected. After a valid Sector Mark is found, the special mark windowing is activated.

Resync Mark Detection

The Resync Mark is a one-byte pattern interspersed at regular intervals throughout the data field. It is used so that the PLL and SM330 can regain bit and byte synchronization to the data stream and limit the propagation of errors. The initial timing for the Resync Mark window is defined by the Data Sync Mark detection and is refined by successive Resync Mark detection.

The following SM330 registers are used for the Resync Mark detection:

| | |
|---|---|
| 25h | Resync Mark Control Register |
| 28h | Window Control Register |

False Resync Protection Mode

Bits 7-6 in the Resync Mark Control Register control the False Resync Protection mode. If bit 7 is reset, then normal Resync Mark detection is enabled. That is, every time a Resync Mark is detected the window logic will reset the position and width of the next Resync Mark window. For purposes of retry or data recovery, the False Resync Protection Mode can be enabled by setting bit 7. In this case, bit 6 will determine the False Resync Protection Mode. See page 57 of the CL-SM330 data sheet for more details on this mode.

Resync Mark Error Threshold

Bits 3-0 of the Resync Mark Control Register determine the Resync Mark Error Threshold. This threshold has a range of zero to 15 and specifies the number of "missing" or "used" Resync Marks that must be exceeded before the Resync Mark Threshold Error bit is set (Media Error Status Register 23h, bit 2). A "missing" Resync Mark is one that cannot be detected within the Resync Mark window. A "used" Resync Mark is one that is detected in the Resync Mark window, but the decoder must be used to reestablish bit synchronization.

Resync Mark Windowing

The Resync Mark window has two basic modes of operation. The first mode of the Resync Mark window controls how initial Resync Mark detection is windowed. The second mode of operation controls how subsequent, or normal Resync Marks are windowed after the initial Resync Mark has been found.

Initial Resync Mark Detection

Initial Resync Mark detection refers to the first Resync Mark that is detected after the Data Sync Mark. The initial Resync Mark window is dependent on whether the previous Sector Mark or one of the ID fields was found, whether the preceding Data Sync Mark was found, and whether the Skip Data Sync Mark Mode is enabled or disabled.

As discussed earlier, the Skip Data Sync Mark Mode is enabled when the Data Sync Mark Threshold is set to zero (Reg. 26h, bits 3-0=0000b). In this case, the Resync Mark Skip Count will also be enabled (Reg. 25h, bits 5-4). Thus, when the Skip Data Sync Mark Mode is enabled, the detection logic will skip the Data Sync Mark and the first N number of Resync Marks as specified in the Resync Mark Skip Count. The Valid Data Sync byte "0D hex" and an appropriate number of dummy data bytes will be transferred and synchronization will be attempted on the next Resync Mark.

If the Skip Data Sync Mark Mode is disabled (when the Data Sync Mark Threshold is nonzero), then the detection logic will look for the Data Sync Mark and all of the Resync Marks.

With this background information, we can now examine the operation of the initial Resync Mark detection more closely. This operation can be viewed as four separate cases:

CASE 1: The Skip Data Sync Mark Mode is disabled. Either the previous Sector Mark or one of the ID fields was found, but the Data Sync Mark was not found.

When the Data Sync Mark is not found, the Resync Mark window is set to a fixed value of 40 REF2F clock periods. If the first Resync Mark is not found, then the controller will abort the current operation and report a Fatal Data Sync Error (Reg. 23h, bit 3 is set).

CASE 2: The Skip Data Sync Mark Mode is disabled. The Sector Mark, ID fields and Data Sync Mark were not found.

When the Data Sync Mark is not found, the Resync Mark window is set to a fixed value of 160 REF2F clock periods. If the first Resync Mark is not found, then the controller will abort the current operation and report a Fatal Data Sync Error (Reg. 23h, bit 3 is set).

CASE 3: The Skip Data Sync Mark Mode is enabled. Either the previous Sector Mark or one of the ID fields was found.

The Data Sync Mark will be skipped. The controller will also skip the first N number of Resync Marks, where N is the value of the Resync Mark Skip Count (Reg. 25h, bits 5-4). The Resync Mark window is set to a fixed value of 40 REF2F clock periods for the next (N+1) Resync Mark. If the N+1 Resync Mark is not found, then the controller will abort the current operation and report a Fatal Data Sync Error (Reg. 23h, bit 3 is set).

CASE 4: The Skip Data Sync Mark Mode is enabled. Neither the Sector Mark or any of the ID fields was found.

The Data Sync Mark will be skipped. The controller will also skip the first N number of Resync Marks, where N is the value of the Resync Mark Skip Count (Reg. 25h, bits 5-4). The Resync Mark window is set to a fixed value of 160 REF2F clock periods for the next (N+1) Resync Mark. If the N+1 Resync Mark is not found, then the controller will abort the current operation and report a Fatal Data Sync Error (Reg. 23h, bit 3 is set).

NOTE: For all of the above cases, if the initial Resync Mark is detected, then the detection circuit will adjust its nominal window position for the next Resync Mark. At this point, normal Resync Mark detection will be used.

Normal Resync Mark Detection

Normal Resync Mark detection is used after the initial Resync Mark has been detected. Remember, the initial Resync Mark is either the first Resync Mark (if the Skip Data Sync Mark Mode is disabled) or the N+1 Resync Mark after N Resync Marks have been skipped (if the Skip Data Sync Mark Mode is enabled).

The Resync Mark detection is subject to the Resync Mark Error Threshold as described earlier. The normal Resync Mark window width is controlled by the Resync Mark Window Control bits in the Window Control Register (Reg. 28h, bits 3-2). These bits control the size and growth of the Resync Mark window. There are four selections for the size and growth of the Resync Mark window: small progressive, large progressive, small fixed, and large fixed. Page 61 of the CL-SM330 data sheet will provide more details.

Example of Resync Mark Detection

The following example of Resync Mark detection will help explain its operation during initial and normal Resync Mark detection.

Example conditions:
1. Skip Data Sync Mark Mode is enabled (Reg. 26h, bits 3–0 =000b)
2. Resync Mark Skip Count is two (Reg. 25h, bits 5–4=10b)
3. Small Progressive Resync Mark Window (Reg. 28h, bits 3–2=00b)
4. Either the previous Sector Mark or one the ID fields was found The Data Sync Mark and the first two Resync Marks are skipped. The initial Resync Mark window width is set to 40 REF2F clocks. If the initial (third in this case) Resync Mark is not found, then the controller will abort the current operation and report and Fatal Data Sync error. If the initial Resync Mark is detected, the Resync Mark window resets to the nominal width of nine clocks. The Resync Mark window will remain at nine clocks as long as the Resync Marks are detected. If a Resync Mark is missed, the Resync Mark window will increase to 15. If further consecutive Resync Marks are missed, the Resync Mark window will first increase to 19, then 25, and then remain at the maximum width of 25 until a Resync Mark is found. When a Resync Mark is found, the Resync Mark window will reset back to nine clock periods. If the Resync Mark Error Threshold (Reg. 25h, bits 3–0) is exceeded while the data field is being read, the controller will abort the current operation and set the Resync Mark Error Threshold Exceeded bit (Reg. 23h, bit 2).

Other Window Functions

The Pre-Format window, TOF window and ALPC window are additional window functions of the SM330. When these different windows are active, the PREFMT, TOFWIN and ALPCWIN signals are asserted respectively. These window control signals are used by the drive electronics for various purposes. See the SM330 data sheet for more details about these window functions.

While a preferred embodiment of the present invention has been disclosed and described herein, it will be obvious to those skilled in the art that various changes in form and detail may be made therein without departing from the spirit and scope of the invention.

TABLE 1

Special Mark Window Sizes

| SECTOR SIZE AND SPEED TOLERANCE WINDOW POSITION | 512, 0.5% | | | 512, 1.0% 1024, 0.5% | | | 1024, 1.0% | | |
|---|---|---|---|---|---|---|---|---|---|
| | E | N | L | E | N | L | E | N | L |
| DEFAULT SIZE | | | | | | | | | |
| Sector Mark Window | | 8 | | | 16 | | | 31 | |
| Addr Mark Window | | 1 | | | 1 | | | 1 | |
| Data Sync Window | | 2 | | | 2 | | | 2 | |
| GROUP 1 SIZE | | | | | | | | | |
| Sector Mark Window | | 8 | | | 16 | | | 31 | |
| Addr Mark Window | 30 | 30 | 38 | 30 | 30 | 39 | 30 | 39 | 39 |
| Data Sync Widow | | 10 | | | 18 | | 32 | 32 | 27 |
| GROUP 2 SIZE | | | | | | | | | |
| Sector Mark Window | | 16 | | | 31 | | | 57 | |
| Addr Mark Window | 30 | 30 | 39 | 30 | 39 | 39 | 30 | 39 | 39 |
| Data Sync Window | | 18 | | 32 | 32 | 27 | 58 | 55 | 27 |

Notes:
E = Early window
N = Normal window
L = Late window
(Based on values programmed in Reg. 24h, bits 7–6)

Appendix to the Windowing Patent Application

Signal Definitions for SM_SQ Schematic

| | |
|---|---|
| DT_PLS_ | Signal representing Data Time plus 8 bytes. |
| NCG | Window to generate/check the NRZ CRC byte. |
| DT_ | Data Time. Active over the data field. |
| DG_LE_ | Leading Edge of Data Gate. Begins Data Time. |
| ID_NM[2] | Number (1, 2 or 3) of current ID. |
| CRC_OK_ | Data field CRC OK on Reads. |
| DSM_FND | Data Sync Mark Found. |
| RG26B7 | Contents of Register 26, Bit 7 = Enable Modified ID DRG. |
| IDF_VLD | ID Field Valid. |
| SRG | Sequencer Read Gate. Input to CL-SM330. |
| RG20B2 | Enable ID Compare Register Found function. |

| | |
|---|---|
| TERM_OP_ | Terminate Operation |
| SET_SMW_SY_ | Test Mode signal to set the Sector Mark Window. |
| RRCLK | Read Reference Clock = REF2F / 2. |
| RG12B5 | Enable ALPC Window on Read Operations. |
| RG3FB5 | Enable Short Sectors (Test mode only). |
| SYS_RST_ | System Reset |
| RAW_DATA | RAWIN signal pin. |
| UPDATA[8] | processor data bus |
| UPCTL[8] | processor data bus control signals |
| RD_WROM_ | Diagnostic Read Window ROM data. |
| SET22B2 | Set Compare Register Found Interrupt Bit |
| SET2BB7 | Set Loss of Lock Detected Status Bit |

Appendix A

| | |
|---|---|
| REF2F | Reference clock from the drive (2x NRZ bit rate) |
| CORR_OVERRUN_ | Error status from Corrector indicating too many errors to correct before the next sector needed the corrector. |
| CORR_BUSY_ | Status signal indicating that the corrector is running. |
| SET_SMW_ | Signal to start the Sector Mark Window |
| IDB_SET_OCI_ | Signal to set the Operation Complete Status Bit. |
| RG10_[3] | Configuration bit instructing Supression of Error Vector Transmission. |
| SM | Signal that drives the SMDET output indicating a true or Psuedo Sector Mark has been detected. |
| PFT | Preformat signal indicating the optical head is under the Preformat area. |
| CMP_FND | Status bit indicating that the Compare Register has been matched to the Target Register. |
| TOF_WD | Signal indicating that the optical head is under the Track Offset Field area. |
| ALPC_WD | Signal indicating the the optical head is under the Auto Laser Power Calibration field area. |
| AMW_DSBL_ | Signal indicating that the Address Mark Windowing is disabled. |

| | |
|---|---|
| OP_ABRT_ | Signal indicating the current operation has been aborted. |
| ID_OP_ | Signal indicating that the current operation is an ID operation, such as READ-ID or SEARCH-ID. |
| SKIP_SCTR_ | Signal indicating that the current sector is being skipped. |
| AMW_GTD | Signal indicating the beginning of the Address Mark Window. |
| DSW_GTD | Signal indicating that the Data Sync Mark Window has begun. |
| STRT_SCTR | Signals the start of a sector. Issued at the beginning of the Sector Mark Window. |
| WRT_FLAG | Signal indicating the Flag Field of the disk is under the optical head. |
| RECIRC_TRGT | Signal to control the shifting of the ID Target register. |
| RG28[3:2] | Resync Mark Window Control - See appendix A |
| RUN | Signal indicating that the CL-SM330 is currently executing an operation. |
| RG10[8] | Configuration Register 1 - See Appendix 1 |
| RG11[8] | Configuration Register 2 - See Appendix 1 |
| SM_THR_MET_ | Signal indicating that the Sector Mark Threshold has been met. |
| RG2B[6:5] | LFLD Control signals - See Appendix 1 |
| PSM_GEN_ | Signal indicating that a Psuedo Sector Mark has been generated. |
| SET23B6 | Set Status Bit indicating that the Sector Mark Detector has detected a true Sector Mark when the Sector Mark Window was closed. |
| SET23B1 | Set Status Bit indicating that a Written Flag Field was detected when attempting a write operation on WORM media. |
| SET23B0 | Set Status Bit indicating that a Blank Operation error was detected or that the Corrector has completed its correction. |
| SET22B1 | Set Status Bit indicating that the Sector Transfer Count has been decremented to zero. |
| TSM_ | Status signal indicating that a True Sector Mark has been | detected.

WROM_DATA[8]   Window ROM data bus. Contains the windowing program.

WROM_ADR[9]   Window ROM Address bus.

WINDOWS[10]   Outputs from the Window Sequencer.

Source Code for the Window Sequencer:

* Source for CL-SM330 window generator ROM

* 12-17-90

| Address | code | delay | | command | | comment |
|---------|------|-------|------|---------|------|---------|
| 000 | 98 | 25 | SM: | DS | 24 | *entry point when sm found |
| 001 | 32 | 1 | | SET | AMW | |
| 002 | 81 | 2 | | DS | 1 | |
| 003 | 22 | 1 | | RST | AMW | |
| 004 | 87 | 8 | | DS | 7 | |
| 005 | 37 | 1 | | SET | DRG | |
| 006 | 8e | 15 | ID1: | DS | 14 | *entry point when id1 found |
| 007 | 32 | 1 | | SET | AMW | |
| 008 | 81 | 2 | | DS | 1 | |
| 009 | 22 | 1 | | RST | AMW | |
| 00a | 87 | 8 | | DS | 7 | |
| 00b | 37 | 1 | | SET | DRG | |
| 00c | 8e | 15 | ID2: | DS | 14 | *entry point when id2 found |
| 00d | 32 | 1 | | SET | AMW | |
| 00e | 81 | 2 | | DS | 1 | |
| 00f | 22 | 1 | | RST | AMW | |
| 010 | 85 | 6 | | DS | 5 | |
| 011 | 38 | 1 | | SET | TOF | |
| 012 | 80 | 1 | | DS | 0 | |
| 013 | 21 | 1 | | RST | PFT | |

Appendix C

| | | | | | | |
|---|---|---|---|---|---|---|
| 014 | 42 1e | 2 | ID3: | BR | D90 | A4 *entry point when id3 found |
| 016 | 36 | 1 | | SET | IDE | |

| | | | | | | |
|---|---|---|---|---|---|---|
| 017 | 83 | 4 | | DS | 3 | |
| 018 | 34 | 1 | | SET | FLG | |
| 019 | 89 | 10 | | DS | 9 | |
| 01a | 24 | 1 | | RST | FLG | |
| 01b | 39 | 1 | | SET | ALPC | |
| 01c | 48 21 | 2 | | BR | 1 | A5 |
| 01e | 36 | 1 | A4: | SET | IDE | |
| 01f | 39 | 1 | | SET | ALPC | |
| 020 | 81 | 2 | | DS | 1 | |
| 021 | a0 | 33 | A5: | DS | 32 | |
| 022 | 33 | 1 | | SET | DSW | |
| 023 | 82 | 3 | | DS | 2 | |
| 024 | 81 | 2 | DS: | DS | 1 | *entry point when dsm found |
| 025 | 23 | 1 | | RST | DSW | |
| 026 | 35 | 1 | B1: | SET | BLNK | |
| 027 | c2 | 129 | | DD | 8 | |
| 028 | 25 | 1 | | RS. | BLNK | |
| 029 | 43 39 | 2 | | BR | S1K | B4 |
| 02b | 42 2e | 2 | | BR | D90 | B2 *512 path |
| 02d | 9a | 27 | | DS | 26 | |
| 02e | 47 33 | 2 | B2: | BR | DIAG | B3 *if diag, skip delay of 1088 |
| 030 | ff | 1009 | | DD | 63 | |
| 031 | c1 | 65 | | DD | 4 | |
| 032 | 8d | 14 | | DS | 13 | |
| 033 | b7 | 56 | B3: | DS | 55 | |
| 034 | 40 7e | 2 | | BR | P1 | E1 *branch if 512 & 1% |
| 036 | 85 | 6 | | DS | 5 | |
| 037 | 48 4a | 2 | | BR | 1 | C1 *branch since 512 & 1/2% |

| | | | | | | | |
|---|---|---|---|---|---|---|---|
| 039 | 41 3d | 2 | B4: | BR | D130 | B5 | *1k path |
| 03b | d1 | 81 | | DD | 5 | | |
| 03c | 82 | 3 | | DS | 2 | | |

| | | | | | | | |
|---|---|---|---|---|---|---|---|
| 03d | 47 43 | 2 | B5: | BR | DIAG | B6 | *if diag, skip delay of 2142 |
| 03f | ff | 1009 | | DD | 63 | | |
| 040 | ff | 1009 | | DD | 63 | | |
| 041 | f1 | 113 | | DD | 7 | | |
| 042 | 8a | 11 | | DS | 10 | | |

| | | | | | | | |
|---|---|---|---|---|---|---|---|
| 043 | e3 | 225 | B6: | DD | 14 | | |
| 044 | 8f | 16 | | DS | 15 | | |
| 045 | 40 c6 | 2 | | BR | P1 | G1 | *branch if 1k & 1% |
| 047 | 8c | 13 | | DS | 12 | | |
| 048 | 48 7e | 2 | | BR | 1 | E1 | *branch since 1k & 1/2% |

* entry point to generate windows for the following case
*                              512    1/2%       found previous sm or id

| | | | | | | |
|---|---|---|---|---|---|---|
| 04a | 31 | 1 | C1: | SET | PFT | |
| 04b | 85 | 6 | | DS | 5 | |
| 04c | 45 5e | 2 | | BR | LW | C2 |
| 04e | 30 | 1 | | SET | SMW | *early & nominal path |
| 04f | 37 | 1 | | SET | DRG | |
| 050 | 85 | 6 | | DS | 5 | |
| 051 | 3a | 1 | | SET | SMK | *generate pseudo sm |
| 052 | 86 | 7 | | DS | 6 | |
| 053 | 20 | 1 | | RST | SMW | |
| 054 | 87 | 8 | | DS | 7 | |
| 055 | 32 | 1 | | SET | AMW | |
| 056 | ba | 59 | | DS | 58 | |
| 057 | 22 | 1 | | RST | AMW | |
| 058 | 88 | 9 | | DS | 8 | |

| | | | | | | |
|---|---|---|---|---|---|---|
| 059 | 21 | 1 | | RST | PFT | |
| 05a | 36 | 1 | | SET | IDE | |
| 05b | 8d | 14 | | DS | 13 | |
| 05c | 48 6b | 2 | | BR | 1 | C3 |
| | | | | | | |
| 05e | 30 | 1 | C2: | SET | SMW | *late path |
| 05f | 86 | 7 | | DS | 6 | |
| 060 | 3a | 1 | | SET | SMK | *generate pseudo sm |
| 061 | 86 | 7 | | DS | 6 | |
| 062 | 20 | 1 | | RST | SMW | |
| 063 | 87 | 8 | | DS | 7 | |
| 064 | 32 | 1 | | SET | AMW | |
| 065 | c1 | 65 | | DD | 4 | |
| 066 | 89 | 10 | | DS | 9 | |
| 067 | 22 | 1 | | RST | AMW | |
| 068 | 88 | 9 | | DS | 8 | |
| 069 | 21 | 1 | | RST | PFT | |
| 06a | 36 | 1 | | SET | IDE | |
| | | | | | | |
| 06b | 42 6e | 2 | C3: | BR | D90 | C4 |
| 06d | 8f | 16 | | DS | 15 | |
| | | | | | | |
| 06e | 93 | 20 | C4: | DS | 19 | |
| 06f | 33 | 1 | | SET | DSW | |
| 070 | 92 | 19 | | DS | 18 | |
| 071 | 23 | 1 | | RST | DSW | |
| | | | | | | |
| 072 | 35 | 1 | D1: | SET | BLNK | |
| 073 | c2 | 129 | | DD | 8 | |
| 074 | 25 | 1 | | RST | BLNK | |
| 075 | 42 78 | 2 | | BR | D90 | D2 |
| 077 | 99 | 26 | | DS | 25 | |
| 078 | 47 7d | 2 | D2: | BR | DIAG | D3 *If diag, skip delay of 1088 |

| | | | | | | |
|---|---|---|---|---|---|---|
| 07a | ff | 1009 | | DD | 63 | |
| 07b | c1 | 65 | | DD | 4 | |
| 07c | 8d | 14 | | DS | 13 | |
| 07d | b5 | 54 | D3: | DS | 53 | |

\* entry point to generate windows for the following cases

| | | | | |
|---|---|---|---|---|
| \* | | 512 | 1/2% | missed previous sm & id |
| \* | | 512 | 1% | found previous sm or id |
| \* | | 1k | 1/2% | found previous sm or id |

| | | | | | | |
|---|---|---|---|---|---|---|
| 07e | 31 | 1 | E1: | SET | PFT | |
| 07f | 85 | 6 | | DS | 5 | |
| 080 | 45 92 | 2 | | BR | LW | E2 |
| 082 | 30 | 1 | | SET | SMW | \*early & nominal path |
| 083 | 37 | 1 | | SET | DRG | |
| 084 | 8d | 14 | | DS | 13 | |
| 085 | 3a | 1 | | SET | SMK | \*generate pseudo sm |
| 086 | 87 | 8 | | DS | 7 | |
| 087 | 32 | 1 | | SET | AMW | |
| 088 | 85 | 6 | | DS | 5 | |
| 089 | 20 | 1 | | RST | SMW | |
| 08a | b3 | 52 | | DS | 51 | |
| 08b | 22 | 1 | | RST | AMW | |
| 08c | 88 | 9 | | DS | 8 | |
| 08d | 21 | 1 | | RST | PFT | |
| 08e | 36 | 1 | | SET | IDE | |
| 08f | 9d | 30 | | DS | 29 | |
| 090 | 48 9f | 2 | | BR | 1 | E3 |
| 092 | 30 | 1 | E2: | SET | SMW | \*late path |
| 093 | 8e | 15 | | DS | 14 | |
| 094 | 3a | 1 | | SET | SMK | \*generate pseudo sm |

| | | | | | | |
|---|---|---|---|---|---|---|
| 095 | 8e | 15 | | DS | 14 | |
| 096 | 20 | 1 | | RST | SMW | |
| 097 | 85 | 6 | | DS | 5 | |
| 098 | 32 | 1 | | SET | AMW | |
| 099 | c1 | 65 | | DD | 4 | |
| 09a | 8b | 12 | | DS | 11 | |
| 09b | 22 | 1 | | RST | AMW | |
| 09c | 88 | 9 | | DS | 8 | |
| 09d | 21 | 1 | | RST | PFT | |
| 09e | 36 | 1 | | SET | IDE | |
| | | | | | | |
| 09f | 42 a2 | 2 | E3: | BR | D90 | E4 |
| 0a1 | 8f | 16 | | DS | 15 | |
| | | | | | | |
| 0a2 | 83 | 4 | E4: | DS | 3 | |
| 0a3 | 33 | 1 | | SET | DSW | |
| 0a4 | a2 | 35 | | DS | 34 | |
| 0a5 | 23 | 1 | | RST | DSW | |
| 0a6 | 35 | 1 | F1: | SET | BLNK | |
| 0a7 | c2 | 129 | | DD | 8 | |
| 0a8 | 25 | 1 | | RST | BLNK | |
| 0a9 | 43 ba | 2 | | BR | S1K | F6 |
| 0ab | 42 ae | 2 | | BR | D90 | F2 *512 path |
| 0ad | 99 | 26 | | DS | 25 | |
| | | | | | | |
| 0ae | 47 b3 | 2 | F2: | BR | DIAG | F3 *if diag, skip delay of 1088 |
| 0b0 | ff | 1009 | | DD | 63 | |
| 0b1 | c1 | 65 | | DD | 4 | |
| 0b2 | 8d | 14 | | DS | 13 | |
| | | | | | | |
| 0b3 | 9a | 27 | F3: | DS | 26 | |
| 0b4 | 40 c6 | 2 | | BR | P1 | G1 *branch if 512 & 1% |
| 0b6 | 10 | 1 | | EDSM | | *allow dsm to refine windows |

| | | | | | | |
|---|---|---|---|---|---|---|
| 0b7 | 8b | 12 | | DS | 11 | |
| 0b8 | 48 7e | 2 | | BR | 1 | E1 *loop back since 512 & 1/2% |
| 0ba | 41 be | 2 | F6: | BR | D130 | F7 *1k path |
| 0bc | d1 | 81 | | DD | 5 | |
| 0bd | 82 | 3 | | DS | 2 | |
| 0be | 47 c4 | 2 | F7: | BR | DIAG | F8 *if diag, skip delay of 2142 |
| 0c0 | ff | 1009 | | DD | 63 | |
| 0c1 | ff | 1009 | | DD | 63 | |
| 0c2 | f1 | 113 | | DD | 7 | |
| 0c3 | 8a | 11 | | DS | 10 | |
| 0c4 | e3 | 225 | F8: | DD | 14 | |
| 0c5 | 83 | 4 | | DS | 3 | |

\* entry point to generate windows for the following cases
*        512       1%       missed previous sm & ld
*        1k       1/2%       missed previous sm & ld
*        1k       1%       found previous sm or ld

| | | | | | | |
|---|---|---|---|---|---|---|
| 0c6 | 31 | 1 | G1: | SET | PFT | |
| 0c7 | 83 | 4 | | DS | 3 | |
| 0c8 | 45 f1 | 2 | | BR | LW | G6 |
| 0ca | 46 e1 | 2 | | BR | EW | G5 |
| 0cc | 30 | 1 | | SET | SMW | *nominal path |
| 0cd | 9d | 30 | | DS | 29 | |
| 0ce | 3a | 1 | | SET | SMK | *generate pseudo sm |
| 0cf | 37 | 1 | | SET | DRG | |
| 0d0 | 84 | 5 | | DS | 4 | |
| 0d1 | 32 | 1 | | SET | AMW | |
| 0d2 | 96 | 23 | | DS | 22 | |
| 0d3 | 20 | 1 | | RST | SMW | |
| 0d4 | b4 | 53 | | DS | 52 | |

| | | | | | |
|---|---|---|---|---|---|
| 0d5 | 22 | 1 | RST | AMW | |
| 0d6 | 88 | 9 | DS | 8 | |
| 0d7 | 21 | 1 | RST | PFT | |
| 0d8 | 36 | 1 | SET | IDE | |
| | | | | | |
| 0d9 | 42 dc | 2 G2: | BR | D90 | G3 |
| 0db | 8f | 16 | DS | 15 | |
| | | | | | |
| 0dc | 85 | 6 G3: | DS | 5 | |
| 0dd | 33 | 1 | SET | DSW | |
| 0de | 99 | 26 | DS | 25 | |
| 0df | 58 04 | 2 | BR | 1 | G7 |
| | | | | | |
| 0e1 | 30 | 1 G5: | SET | SMW | *early path |
| 0e2 | 37 | 1 | SET | DRG | |
| 0e3 | 97 | 24 | DS | 23 | |
| 0e4 | 32 | 1 | SET | AMW | |
| 0e5 | 83 | 4 | DS | 3 | |
| 0e6 | 3a | 1 | SET | SMK | *generate pseudo sm |
| 0e7 | 9d | 30 | DS | 29 | |
| 0e8 | 20 | 1 | RST | SMW | |
| 0e9 | 96 | 23 | DS | 22 | |
| 0ea | 22 | 1 | RST | AMW | |
| 0eb | 88 | 9 | DS | 8 | |
| 0ec | 21 | 1 | RST | PFT | |
| 0ed | 36 | 1 | SET | IDE | |
| 0ee | 9b | 28 | DS | 27 | |
| 0ef | 48 d9 | 2 | BR | 1 | G2 |
| 0f1 | 81 | 2 G6: | DS | 1 | *late path |
| 0f2 | 30 | 1 | SET | SMW | |
| 0f3 | 9d | 30 | DS | 29 | |
| 0f4 | 3a | 1 | SET | SMK | *generate pseudo sm |
| 0f5 | 9d | 30 | DS | 29 | |

| | | | | | | |
|---|---|---|---|---|---|---|
| 0f6 | 20 | 1 | | RST | SMW | |
| 0f7 | 84 | 5 | | DS | 4 | |
| 0f8 | 32 | 1 | | SET | AMW | |
| 0f9 | c1 | 65 | | DD | 4 | |
| 0fa | 8b | 12 | | DS | 11 | |
| 0fb | 22 | 1 | | RST | AMW | |
| 0fc | 88 | 9 | | DS | 8 | |
| 0fd | 21 | 1 | | RST | PFT | |
| 0fe | 36 | 1 | | SET | IDE | |
| 0ff | 83 | 4 | | DS | 3 | |
| 100 | 33 | 1 | | SET | DSW | |
| 101 | 52 04 | 2 | | BR | D90 | G7 |
| 103 | 8f | 16 | | DS | 15 | |
| 104 | a2 | 35 | G7: | DS | 34 | |
| 105 | 23 | 1 | | RST | DSW | |
| 106 | 35 | 1 | H1: | SET | BLNK | |
| 107 | c2 | 129 | | DD | 8 | |
| 108 | 25 | 1 | | RST | BLNK | |
| 109 | 53 17 | 2 | | BR | S1K | H6 |
| 10b | 52 0e | 2 | | BR | D90 | H2 *512 & 1% path |
| 10d | 99 | 26 | | DS | 25 | |
| 10e | 57 13 | 2 | H2: | BR | DIAG | H3 *if diag, skip delay of 1088 |
| 110 | ff | 1009 | | DD | 63 | |
| 111 | c1 | 65 | | DD | 4 | |
| 112 | 8d | 14 | | DS | 13 | |
| 113 | 8b | 12 | H3: | DS | 11 | |
| 114 | 10 | 1 | | EDSM | | *allow dsm to refine windows |
| 115 | 48 c6 | 2 | | BR | 1 | G1 *loop back since 512 & 1% |
| 117 | 51 1b | 2 | H6: | BR | D130 | H7 *1k path |

| | | | | | | |
|---|---|---|---|---|---|---|
| 119 | d1 | 81 | | DD | 5 | |
| 11a | 82 | 3 | | DS | 2 | |
| 11b | 57 21 | 2 | H7: | BR | DIAG | H8 *if diag, skip delay of 2142 |
| 11d | ff | 1009 | | DD | 63 | |
| 11e | ff | 1009 | | DD | 63 | |
| 11f | f1 | 113 | | DD | 7 | |
| 120 | 8a | 11 | | DS | 10 | |
| 121 | f2 | 177 | H8: | DD | 11 | |
| 122 | 89 | 10 | | DS | 9 | |
| 123 | 50 29 | 2 | | BR | P1 | J1 *branch if 1k & 1% |
| 125 | 10 | 1 | | EDSM | | *allow dsm to refine windows |
| 126 | 96 | 23 | | DS | 22 | |
| 127 | 48 c6 | 2 | | BR | 1 | G1 *loop back since 1k & 1/2% |

* entry point to generate windows for the following case

| | | | | | | |
|---|---|---|---|---|---|---|
| * | | | | 1k | 1% | missed previous sm & ld |
| 129 | 31 | 1 | J1: | SET | PFT | |
| 12a | 83 | 4 | | DS | 3 | |
| 12b | 55 57 | 2 | | BR | LW | J6 |
| 12d | 56 41 | 2 | | BR | EW | J4 |
| 12f | 30 | 1 | | SET | SMW | *nominal path |
| 130 | b7 | 56 | | DS | 55 | |
| 131 | 3a | 1 | | SET | SMK | *generate pseudo sm |
| 132 | 37 | 1 | | SET | DRG | |
| 133 | 84 | 5 | | DS | 4 | |
| 134 | 32 | 1 | | SET | AMW | |
| 135 | b0 | 49 | | DS | 48 | |
| 136 | 20 | 1 | | RST | SMW | |
| 137 | 9a | 27 | | DS | 26 | |
| 138 | 22 | 1 | | RST | AMW | |

| | | | | | |
|---|---|---|---|---|---|
| 139 | 88 | 9 | | DS | 8 |
| 13a | 21 | 1 | | RST | PFT |
| 13b | 36 | 1 | | SET | IDE |
| 13c | 83 | 4 | | DS | 3 |
| 13d | 33 | 1 | | SET | DSW |
| 13e | b5 | 54 | | DS | 53 |
| 13f | 58 67 | 2 | | BR | 1 | J7 |

| | | | | | | |
|---|---|---|---|---|---|---|
| 141 | 30 | 1 | J4: | SET | SMW | *early path |
| 142 | 37 | 1 | | SET | DRG | |
| 143 | 97 | 24 | | DS | 23 | |
| 144 | 32 | 1 | | SET | AMW | |
| 145 | 9d | 30 | | DS | 29 | |
| 146 | 3a | 1 | | SET | SMK | *generate pseudo sm |
| 147 | 9b | 28 | | DS | 27 | |
| 148 | 22 | 1 | | RST | AMW | |
| 149 | 88 | 9 | | DS | 8 | |
| 14a | 21 | 1 | | RST | PFT | |
| 14b | 36 | 1 | | SET | IDE | |
| 14c | 8f | 16 | | DS | 15 | |
| 14d | 20 | 1 | | RST | SMW | |
| 14e | 52 51 | 2 | | BR | D90 | J5 |
| 150 | 8f | 16 | | DS | 15 | |

| | | | | | | |
|---|---|---|---|---|---|---|
| 151 | 92 | 19 | J5: | DS | 18 | |
| 152 | 33 | 1 | | SET | DSW | |
| 153 | c1 | 65 | | DD | 4 | |
| 154 | 8c | 13 | | DS | 12 | |
| 155 | 58 6a | 2 | | BR | 1 | J8 |

| | | | | | | |
|---|---|---|---|---|---|---|
| 157 | 81 | 2 | J6: | DS | 1 | *late path |
| 158 | 30 | 1 | | SET | SMW | |
| 159 | b7 | 56 | | DS | 55 | |

| | | | | | | |
|---|---|---|---|---|---|---|
| 15a | 3a | 1 | | SET | SMK | *generate pseudo sm |
| 15b | b7 | 56 | | DS | 55 | |
| 15c | 20 | 1 | | RST | SMW | |
| 15d | 84 | 5 | | DS | 4 | |
| 15e | 32 | 1 | | SET | AMW | |
| 15f | c1 | 65 | | DD | 4 | |
| 160 | 8b | 12 | | DS | 11 | |
| 161 | 22 | 1 | | RST | AMW | |
| 162 | 88 | 9 | | DS | 8 | |
| 163 | 21 | 1 | | RST | PFT | |
| 164 | 36 | 1 | | SET | IDE | |
| 165 | 83 | 4 | | DS | 3 | |
| 166 | 33 | 1 | | SET | DSW | |
| | | | | | | |
| 167 | 52 6a | 2 | J7: | BR | D90 | J8 |
| 169 | 8f | 16 | | DS | 15 | |
| | | | | | | |
| 16a | a2 | 35 | J8: | DS | 34 | |
| 16b | 23 | 1 | | RST | DSW | |
| | | | | | | |
| 16c | 35 | 1 | K1: | SET | BLNK | |
| 16d | c2 | 129 | | DD | 8 | |
| 16e | 25 | 1 | | RST | BLNK | |
| 16f | 51 73 | 2 | | BR | D130 | K2 |
| 171 | d1 | 81 | | DD | 5 | |
| 172 | 82 | 3 | | DS | 2 | |
| | | | | | | |
| 173 | 57 79 | 2 | K2: | BR | DIAG | K3 *if diag, skip delay of 2142 |
| 175 | ff | 1009 | | DD | 63 | |
| 176 | ff | 1009 | | DD | 63 | |
| 177 | f1 | 113 | | DD | 7 | |
| 178 | 8a | 11 | | DS | 10 | |
| | | | | | | |
| 179 | e2 | 161 | K3: | DD | 10 | |

| | | | | | |
|---|---|---|---|---|---|
| 17a | 80 | 1 | DS | 0 | |
| 17b | 10 | 1 | EDSM | | *allow dsm to refine windows |
| 17c | 58 29 | 2 | BR | 1 | J1 *loop back since 1k & 1% |
Appendix B
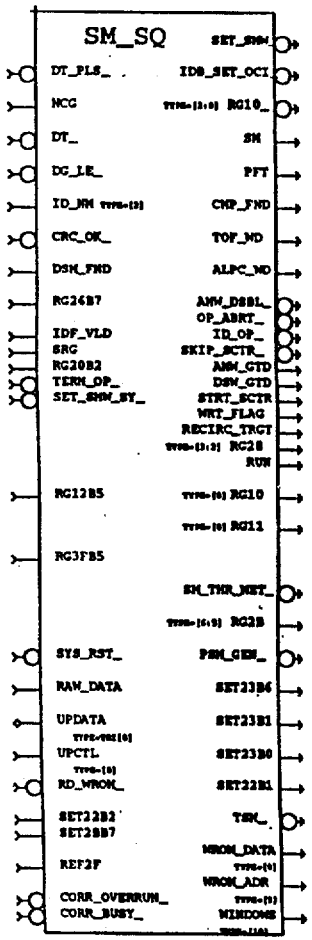

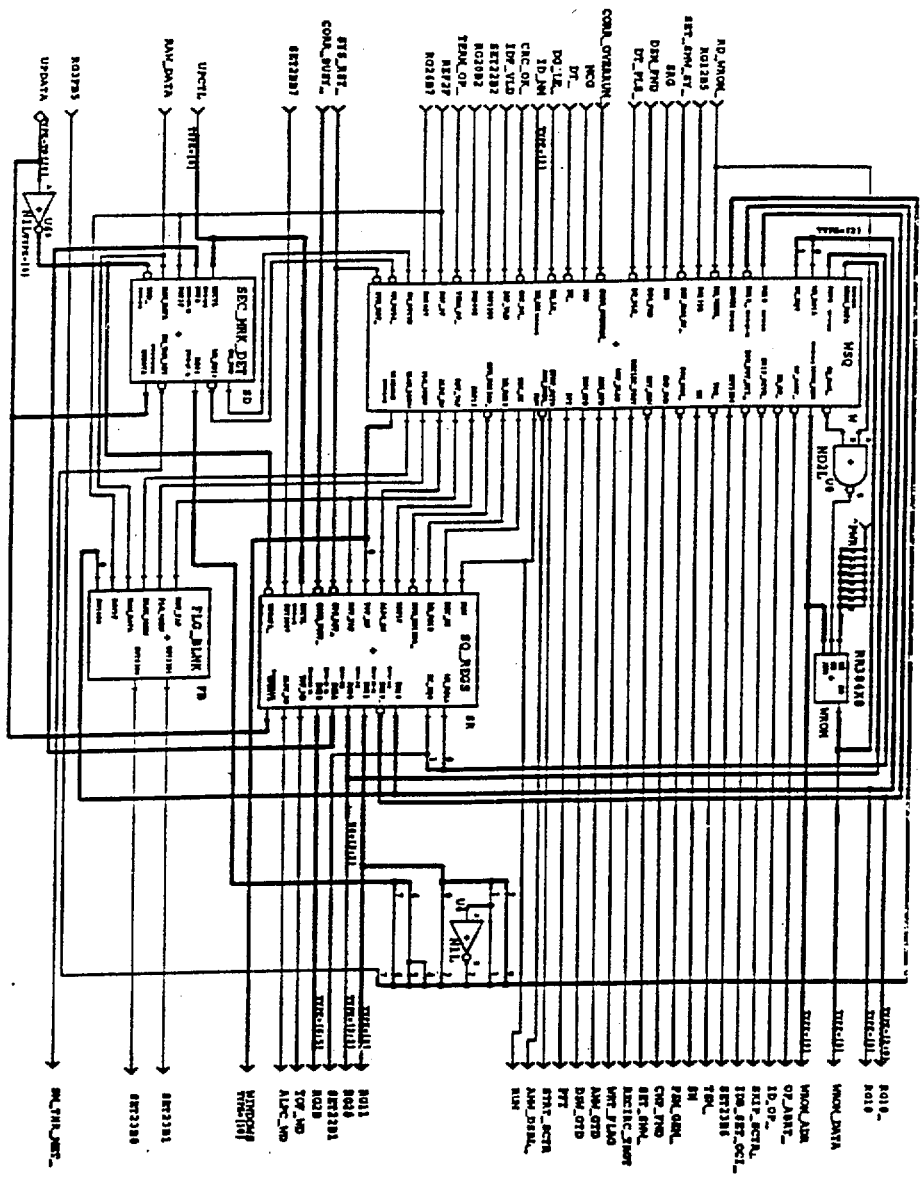

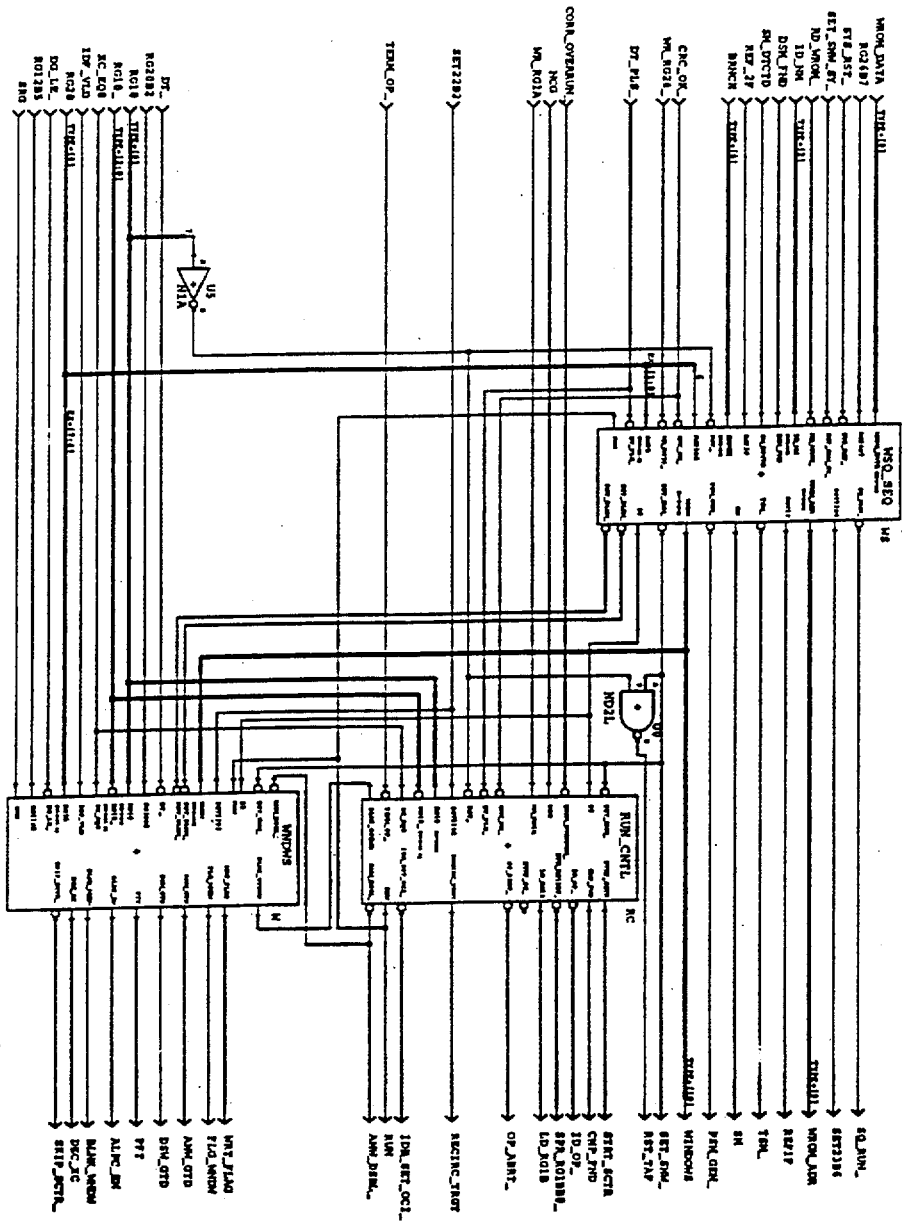

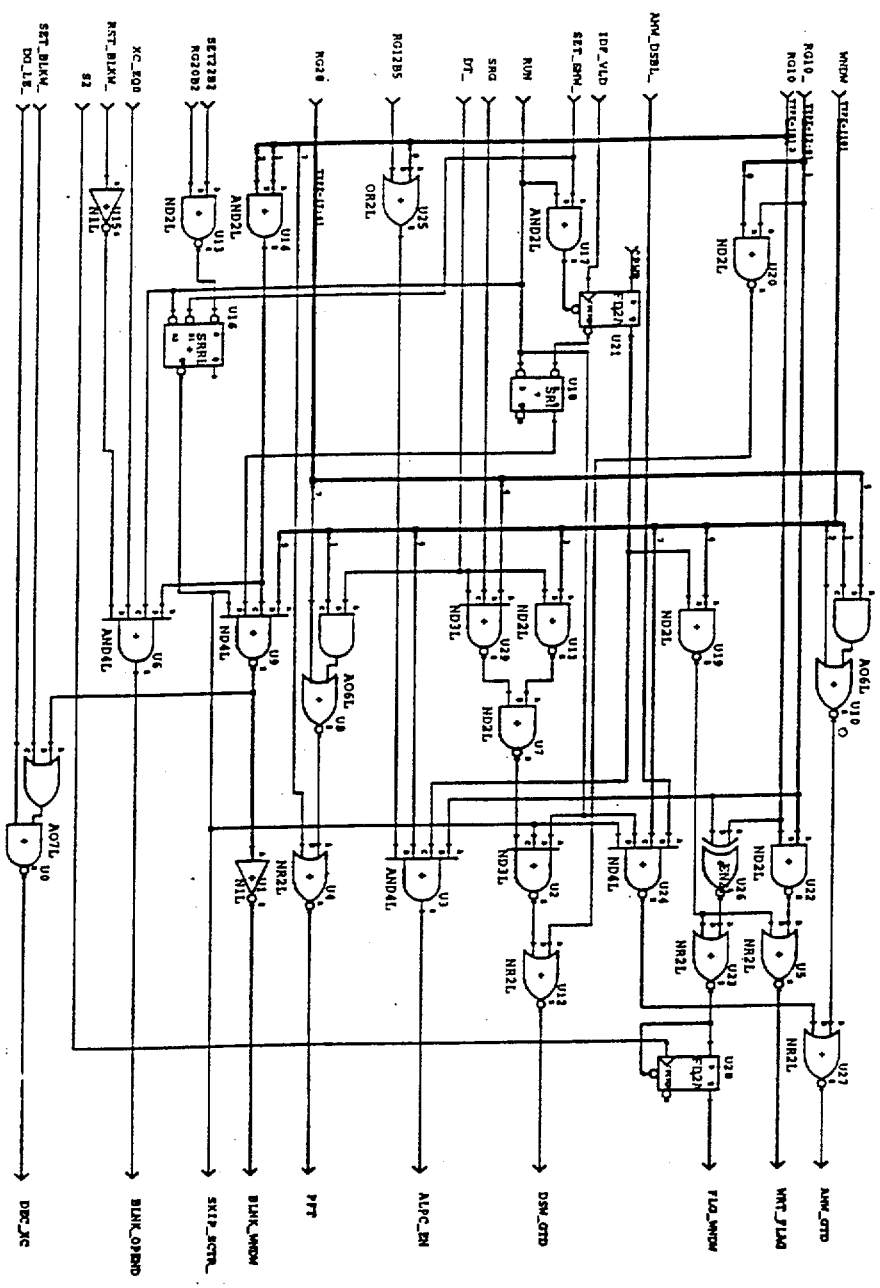

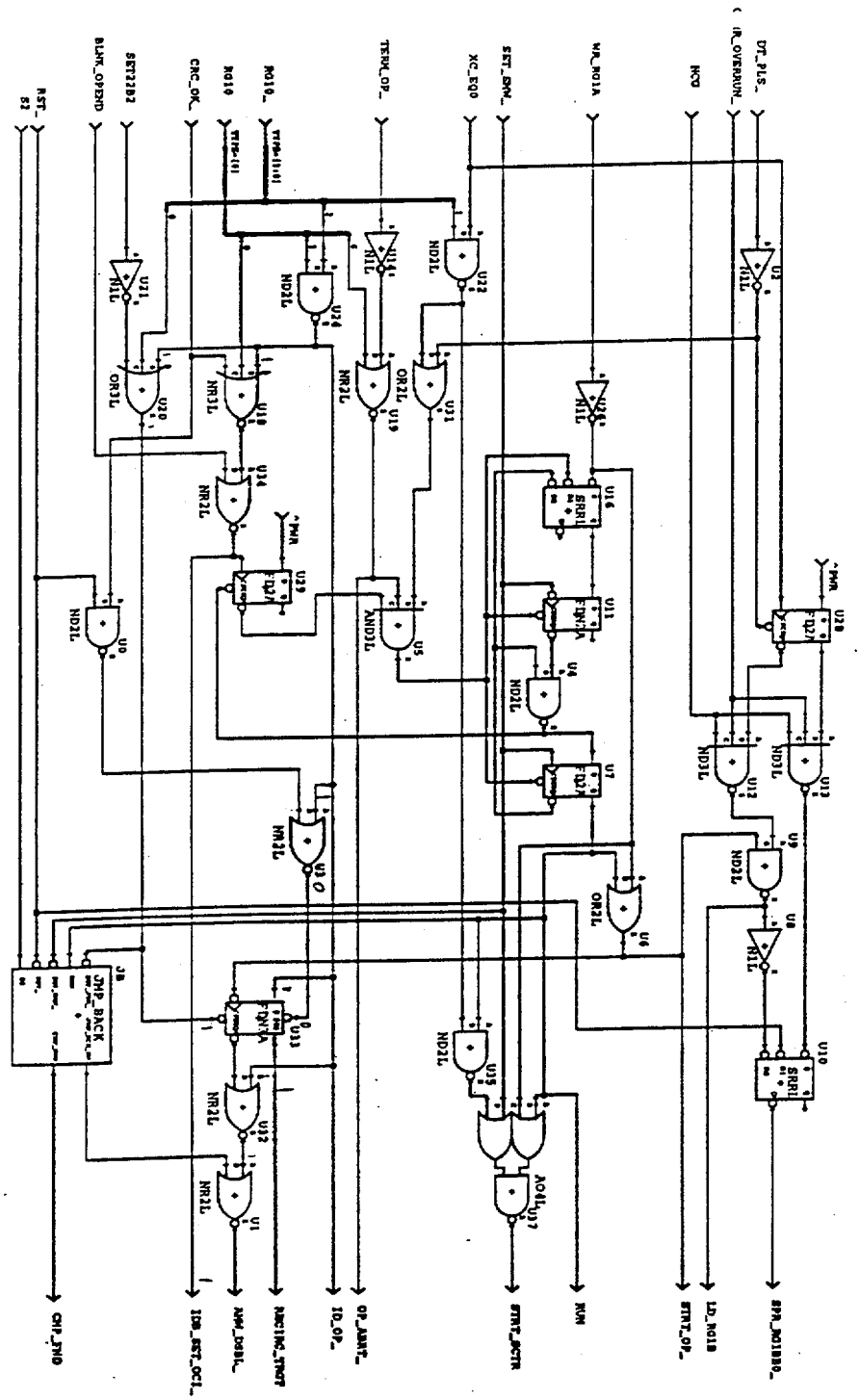

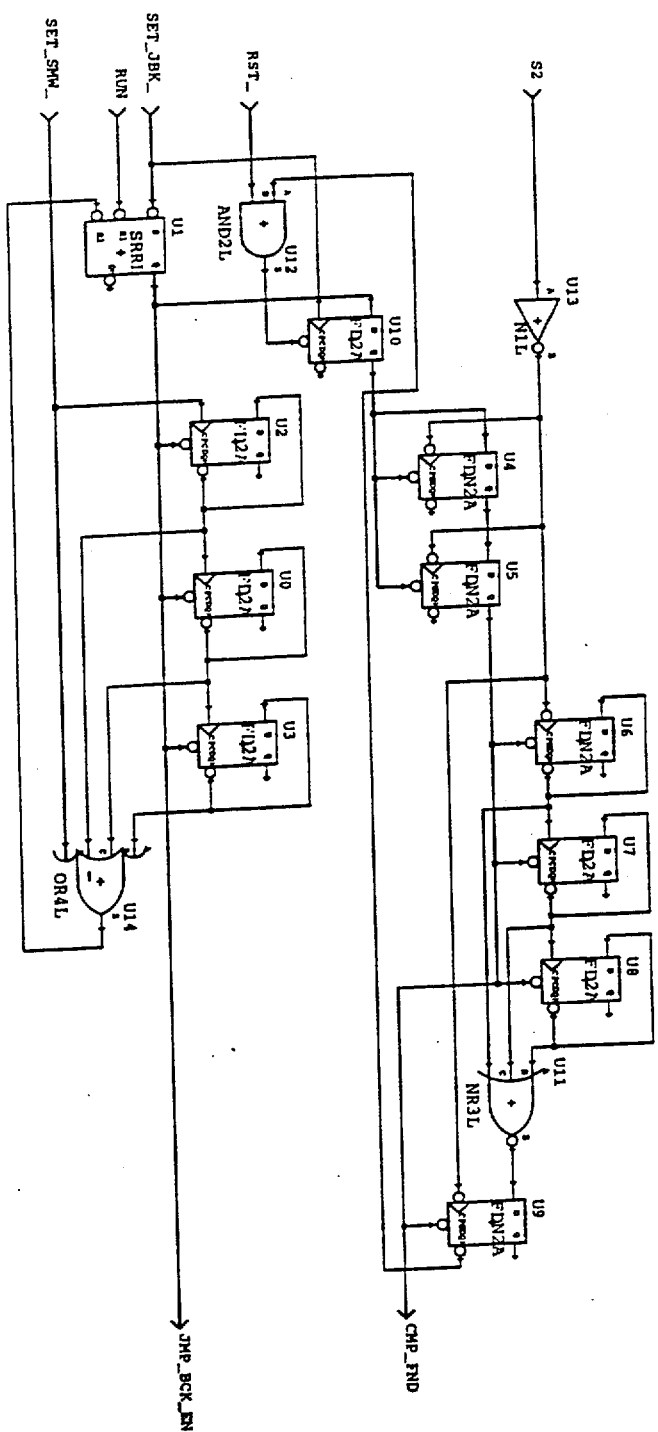

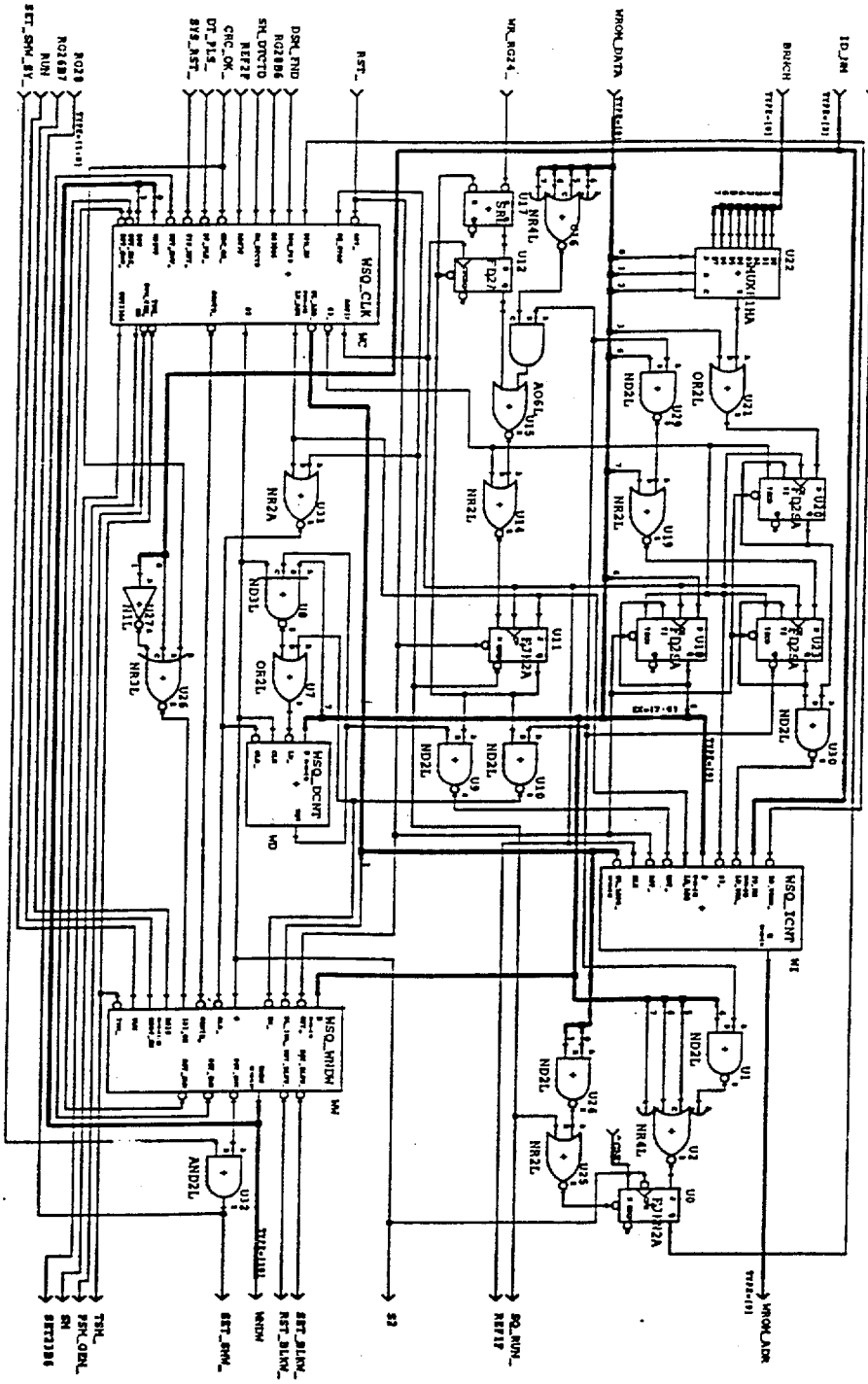

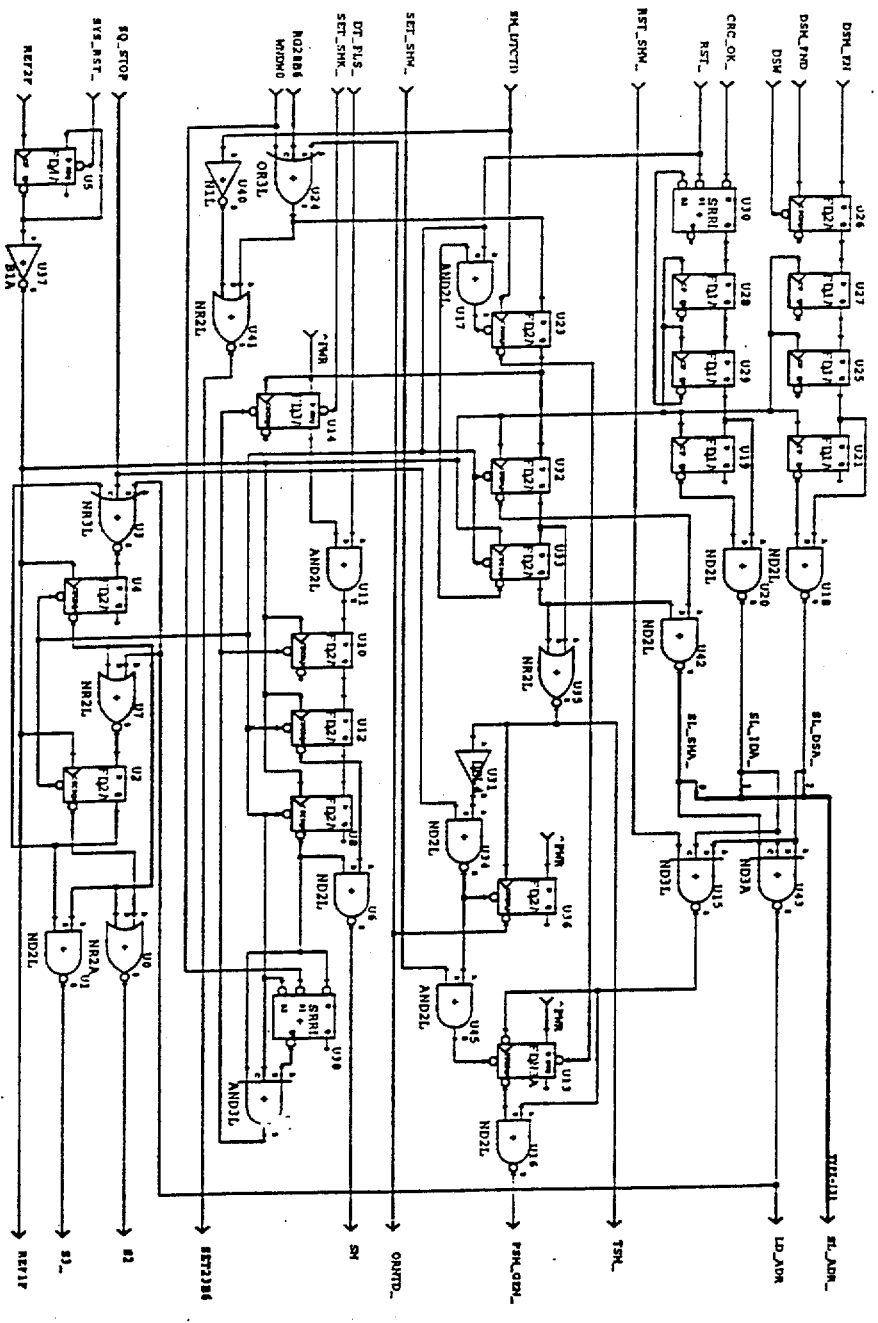

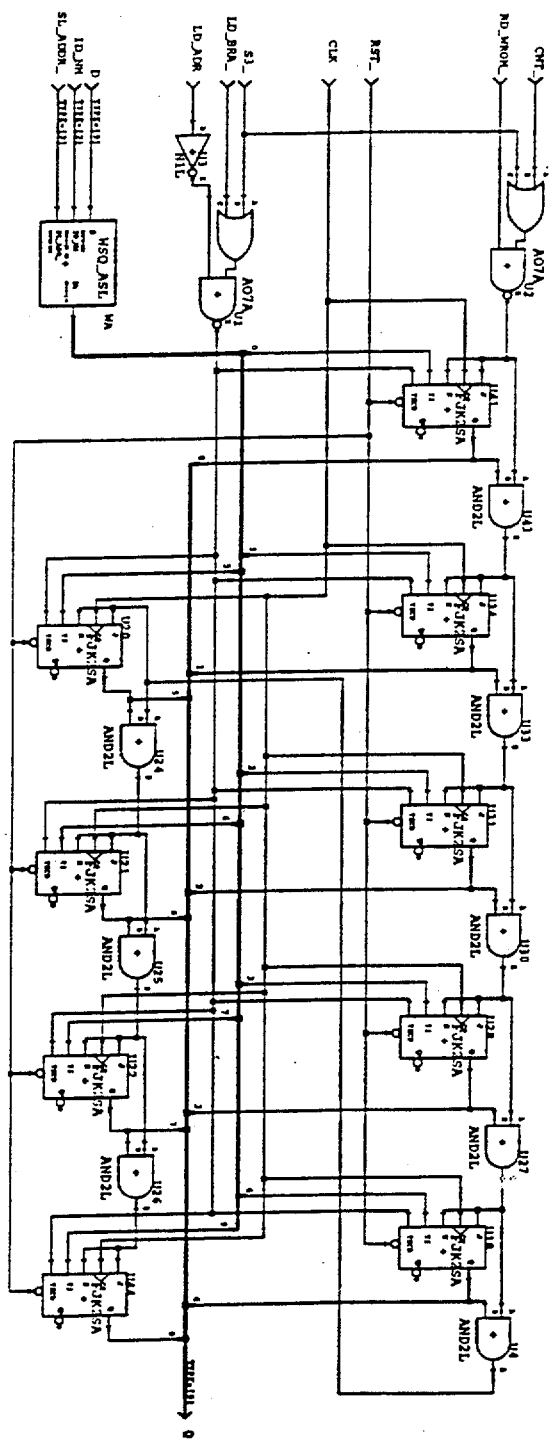

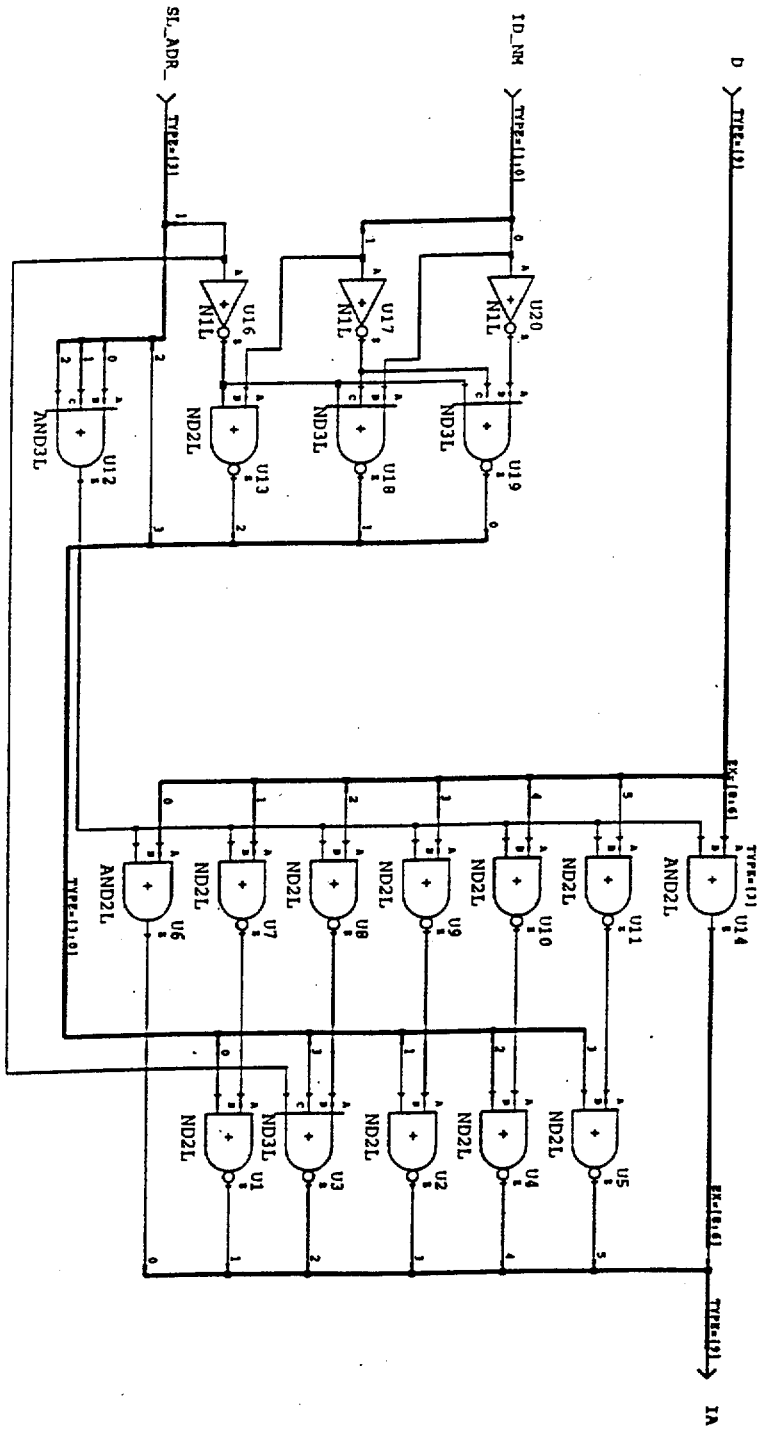

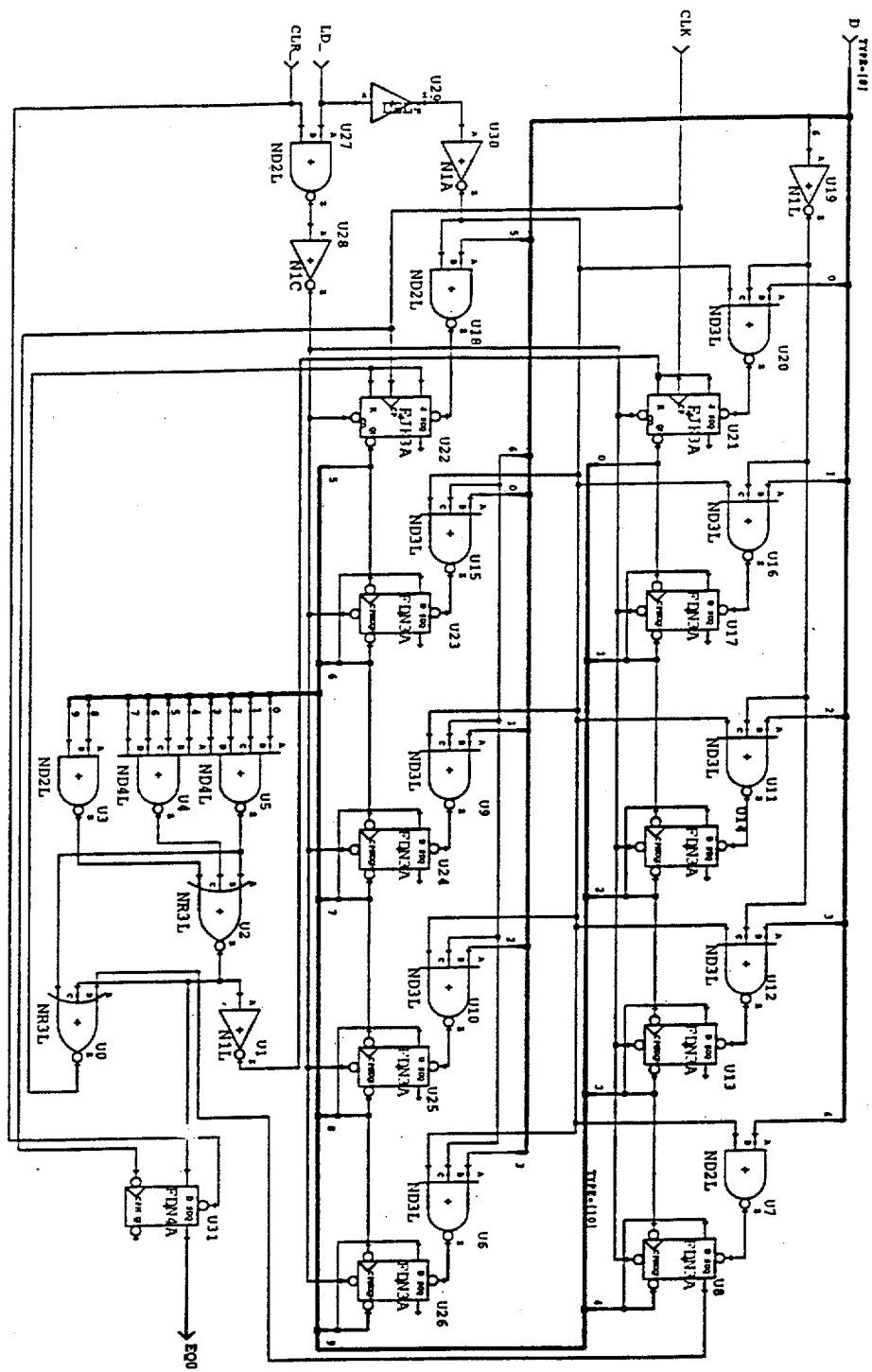

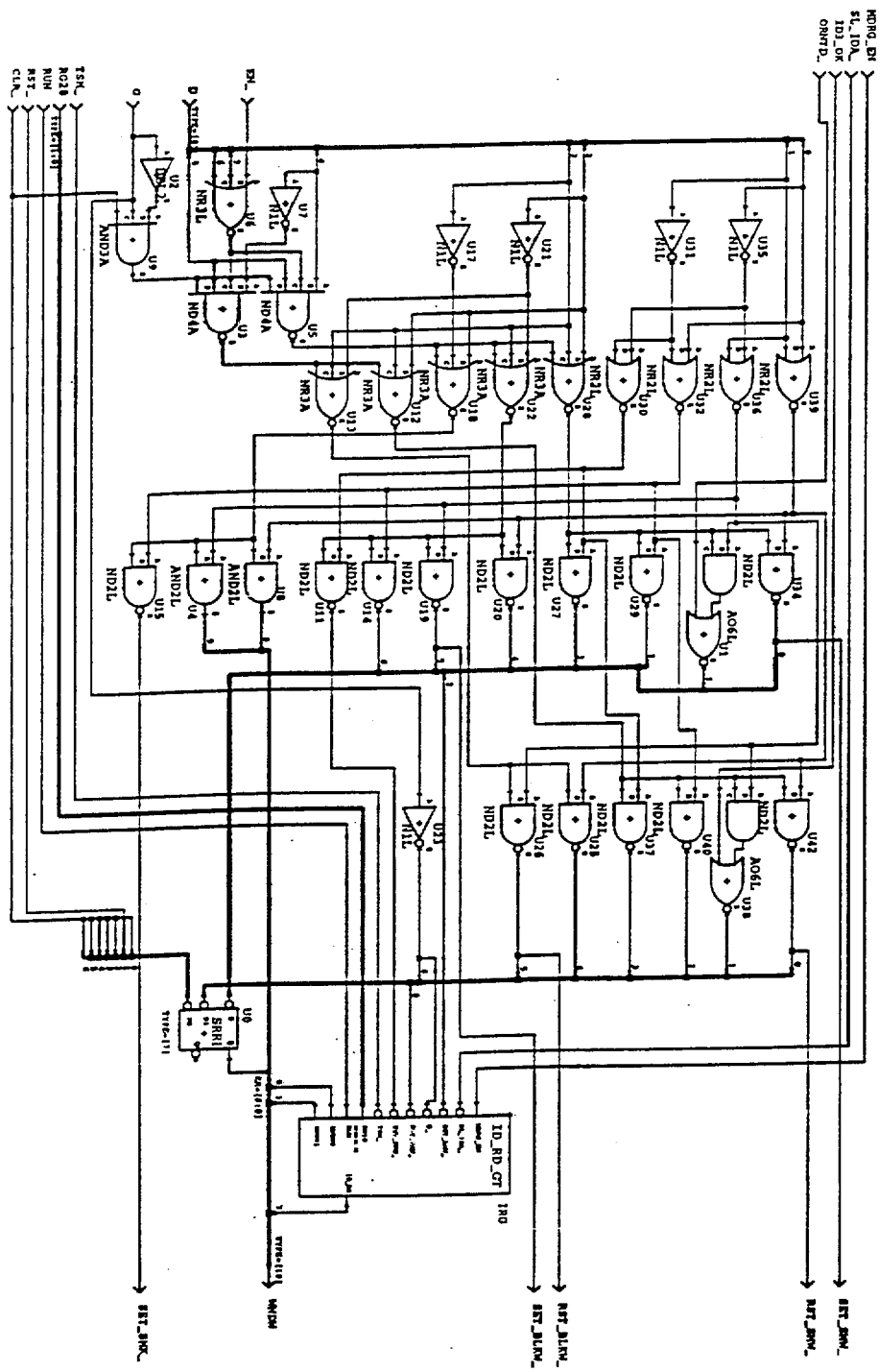

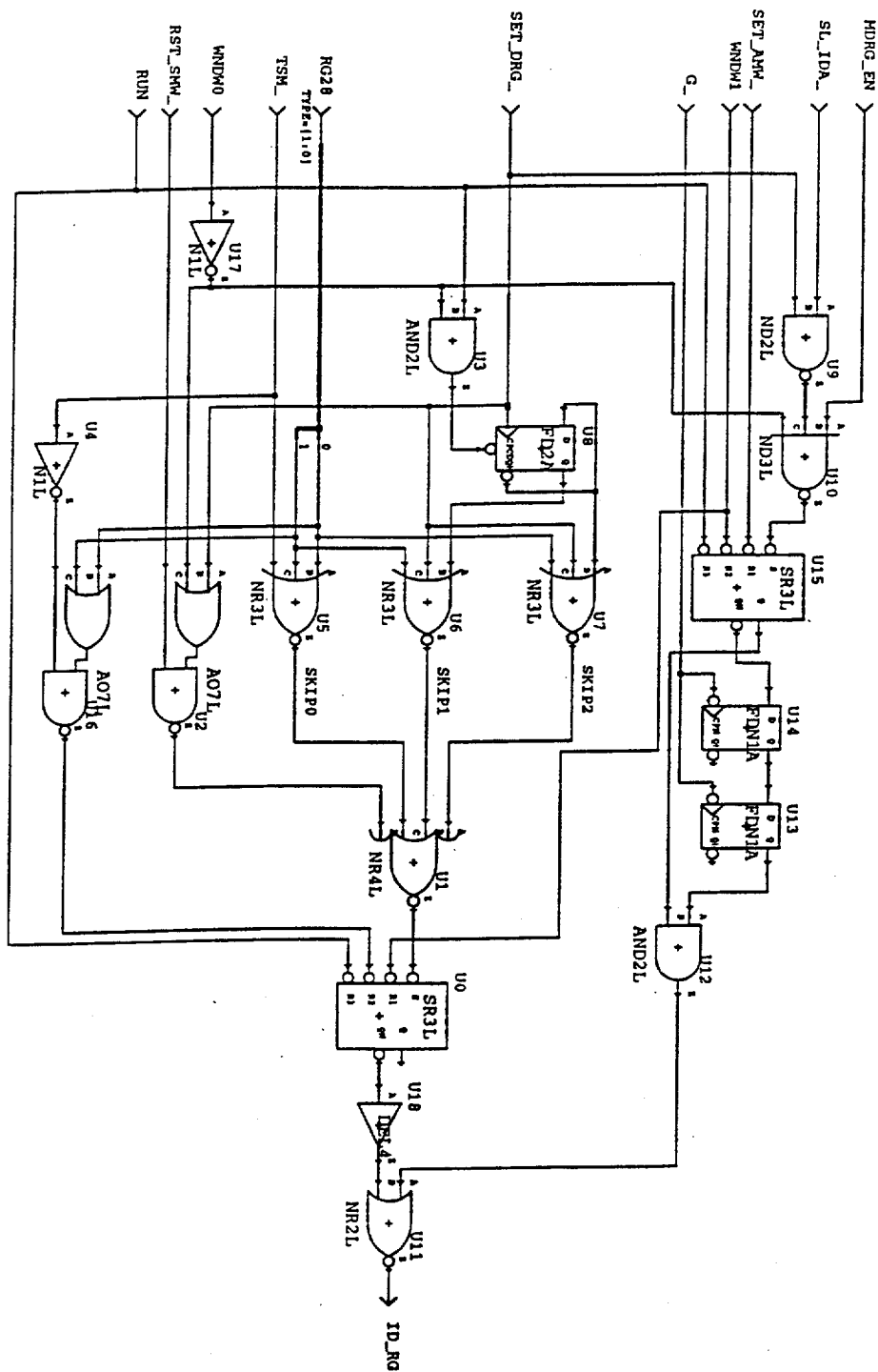

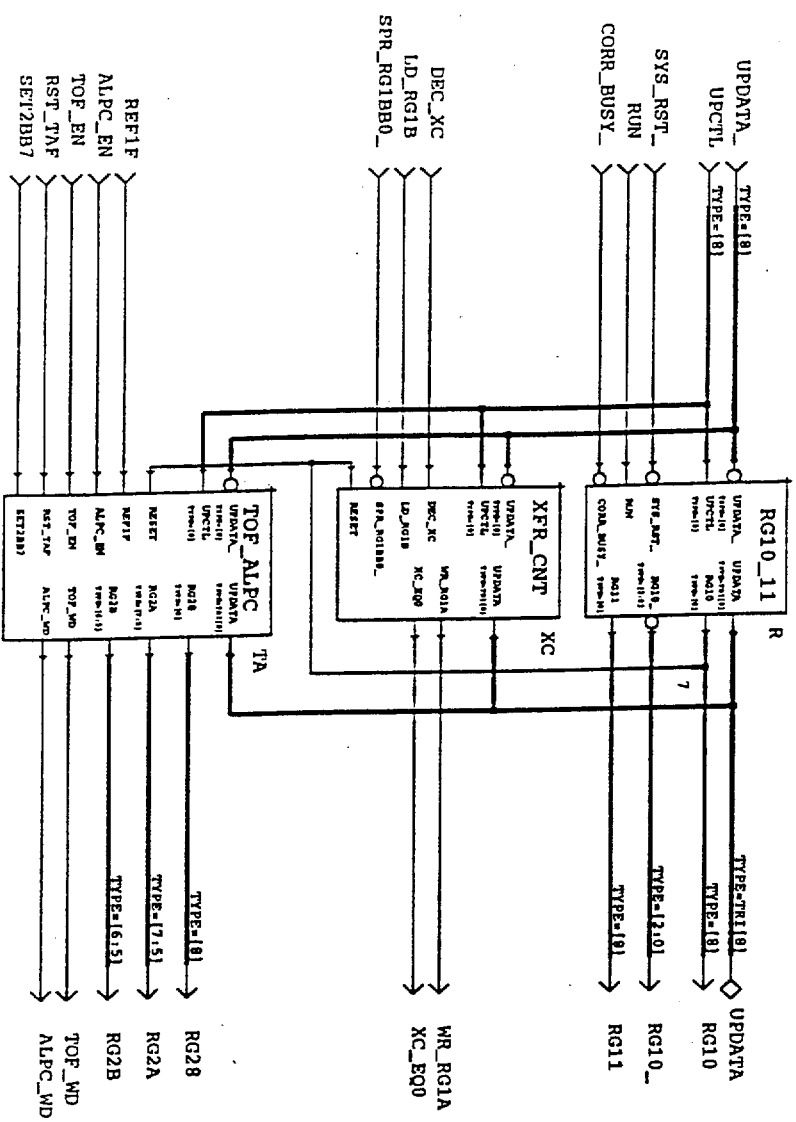

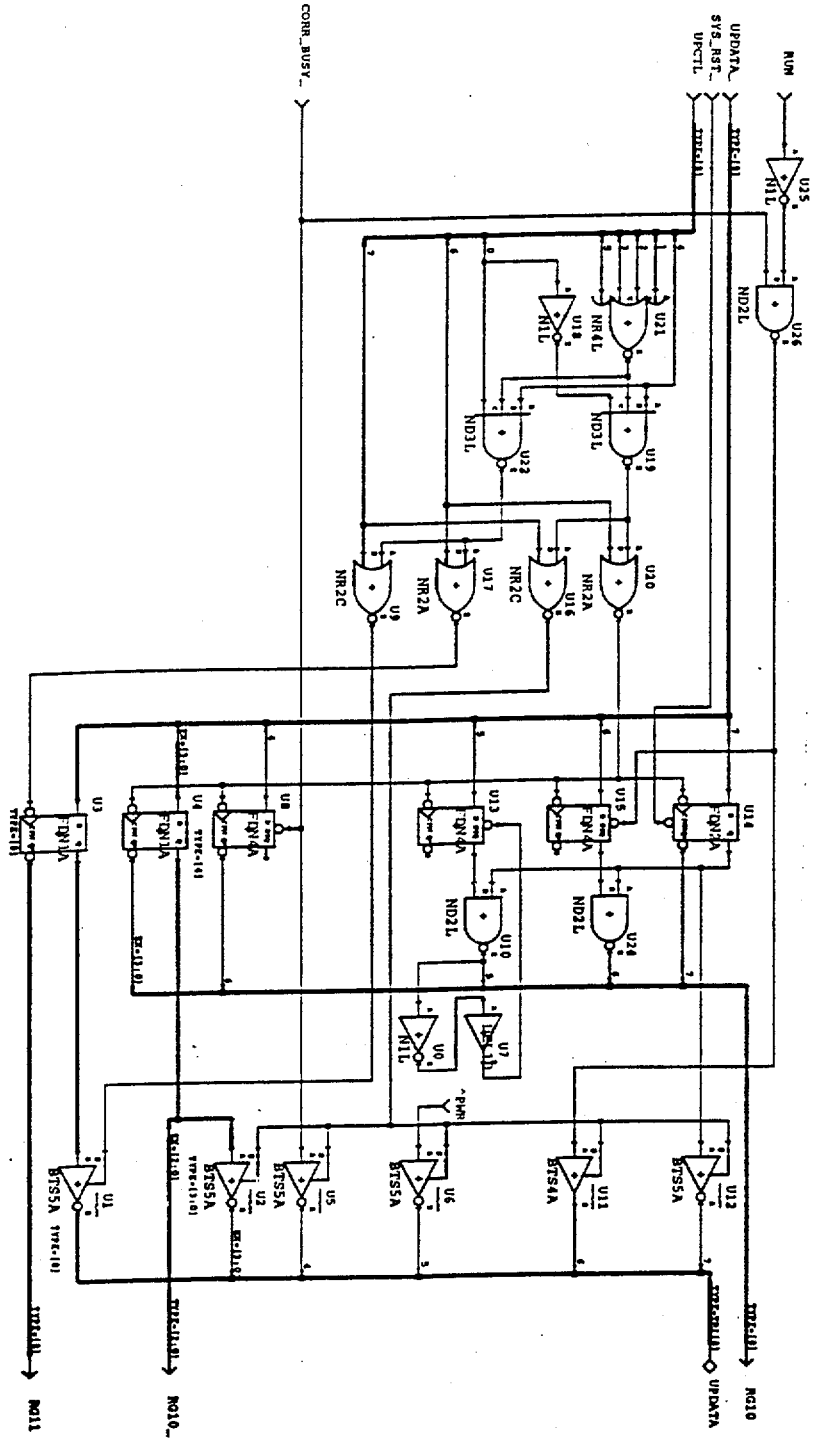

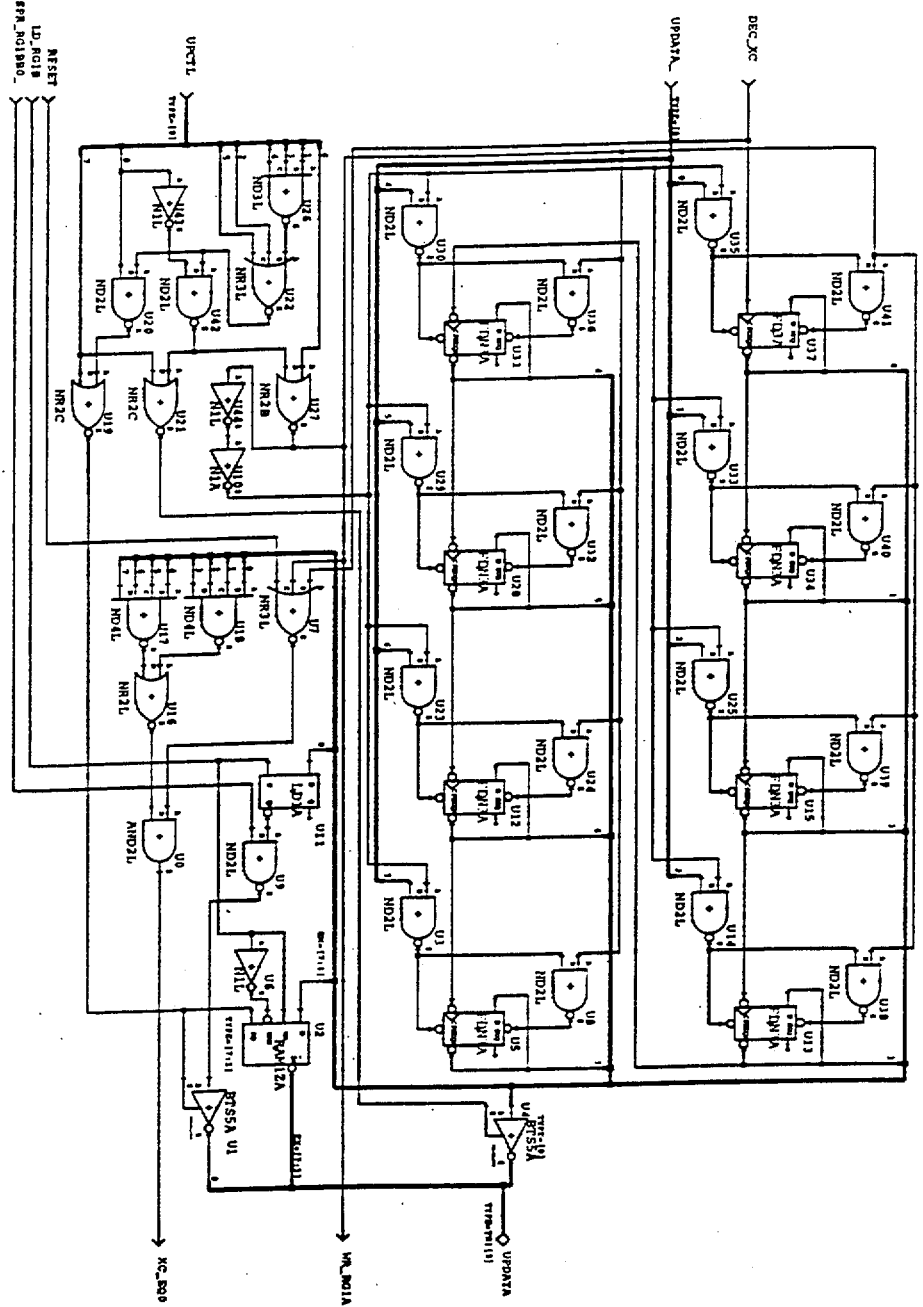

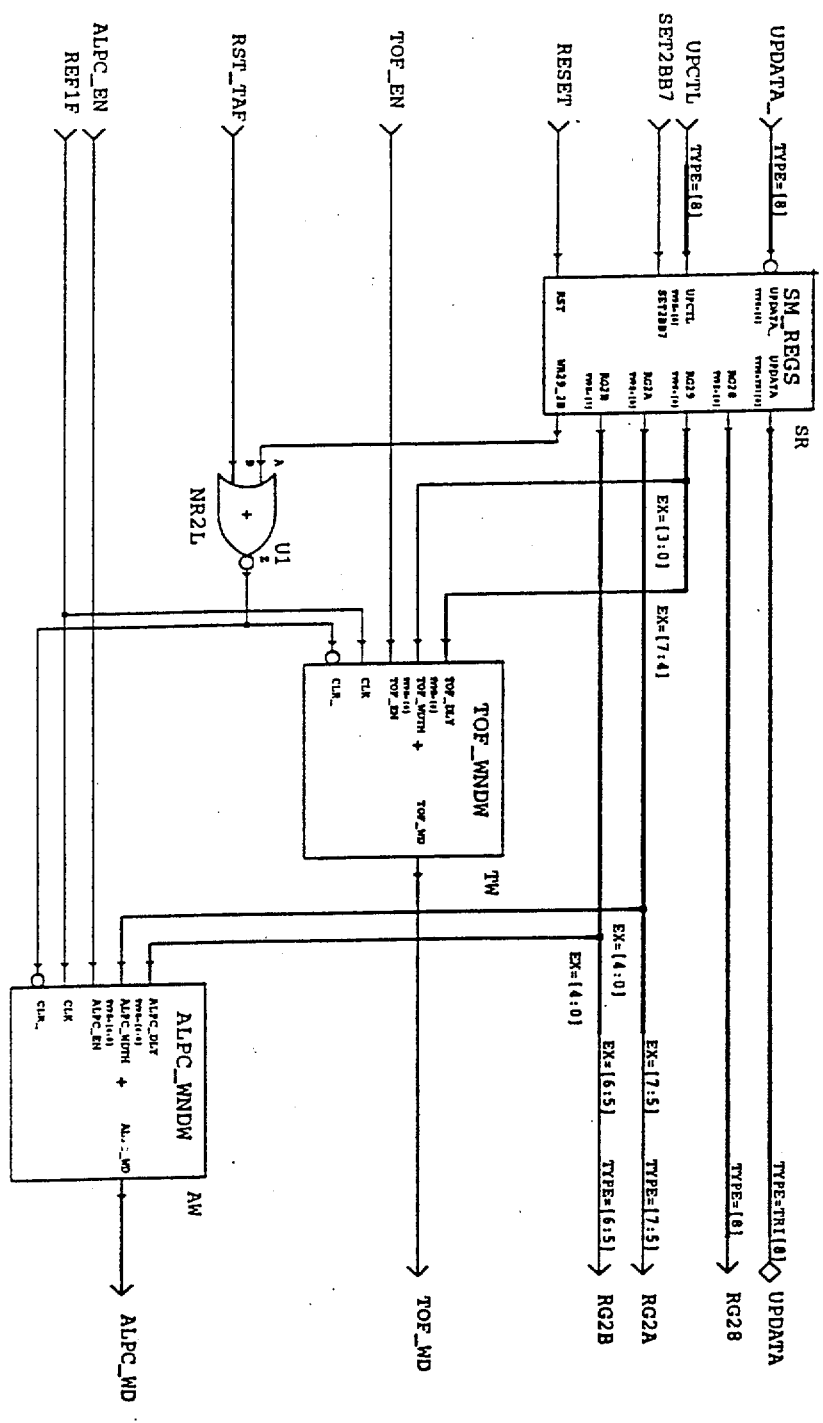

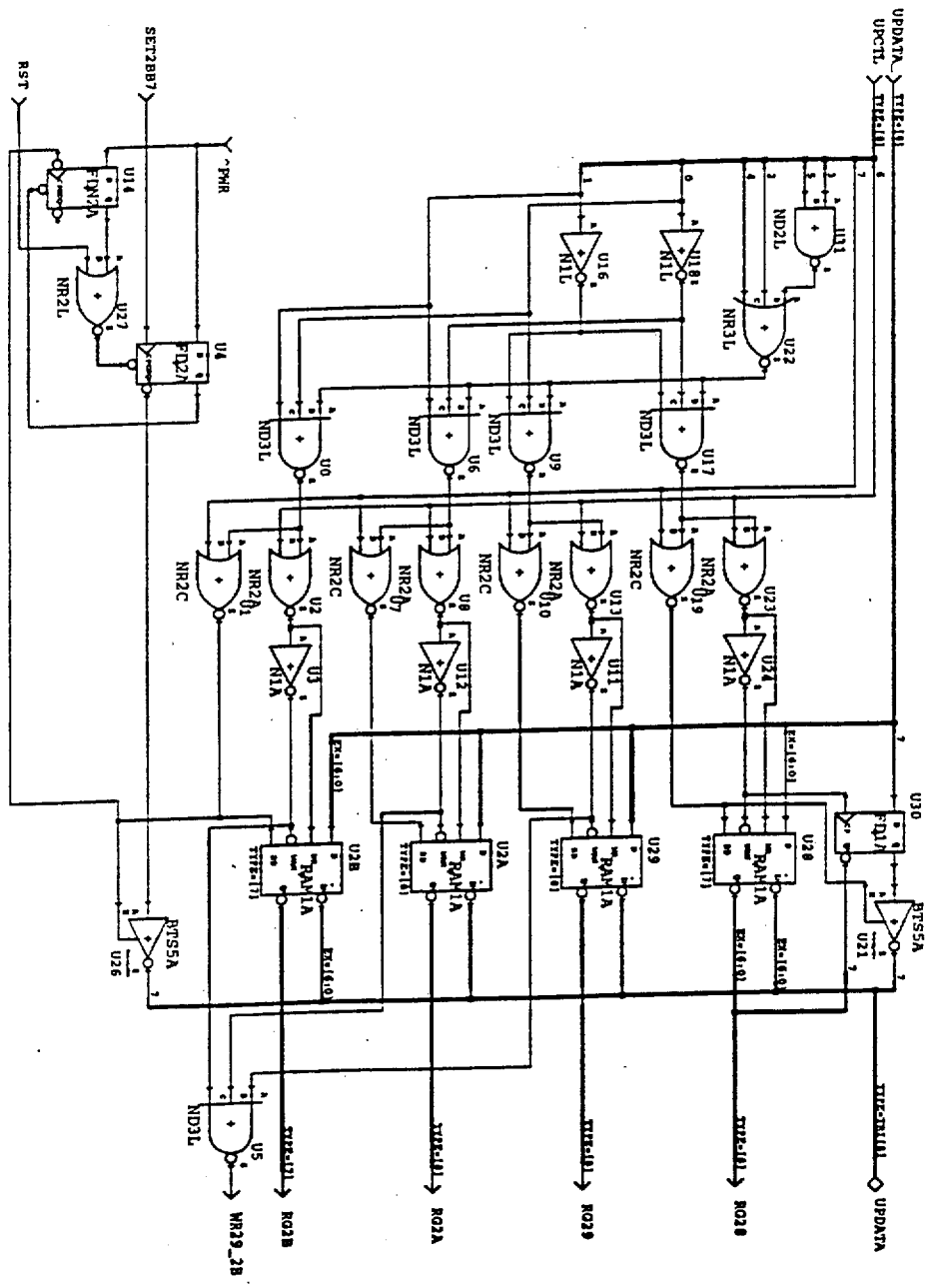

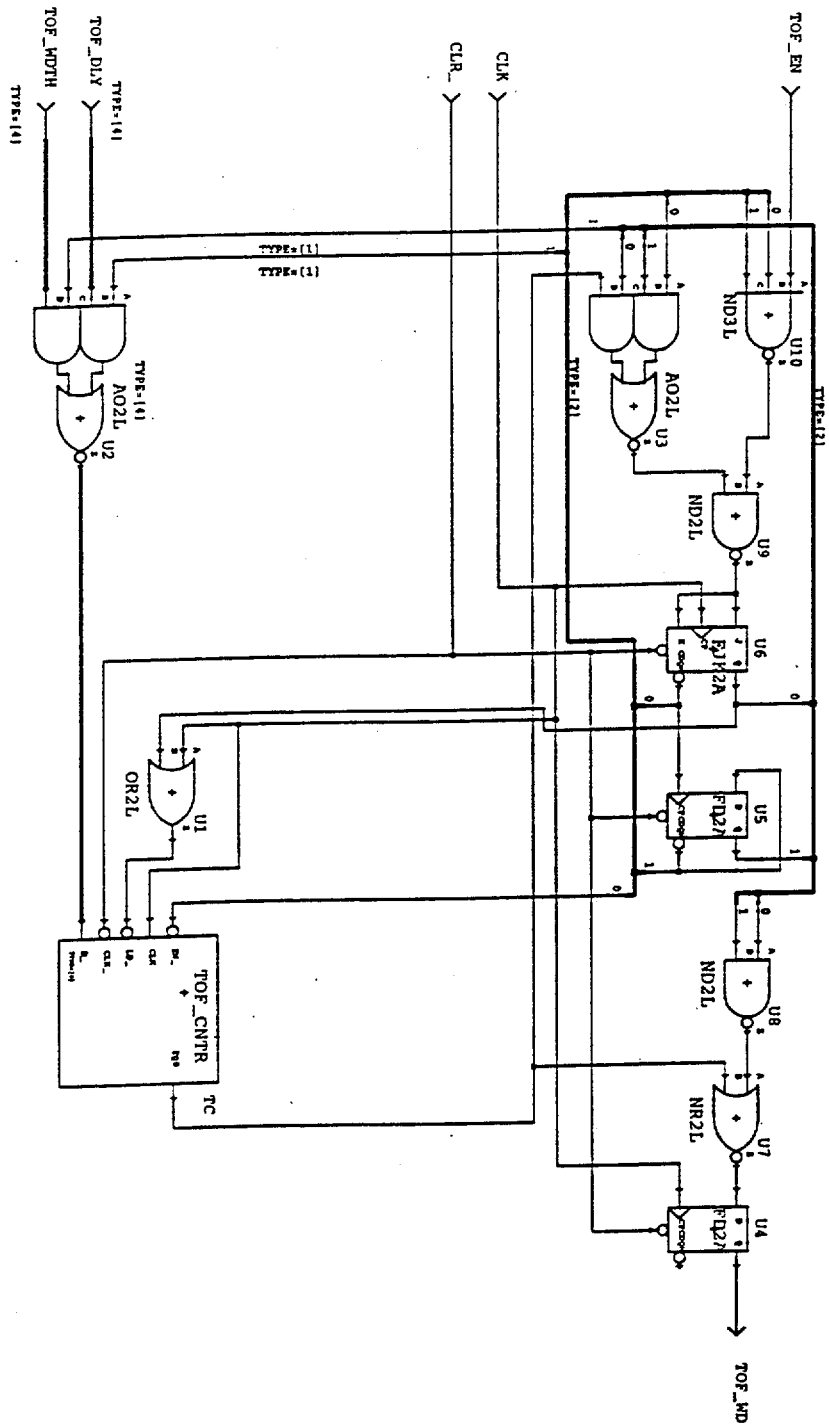

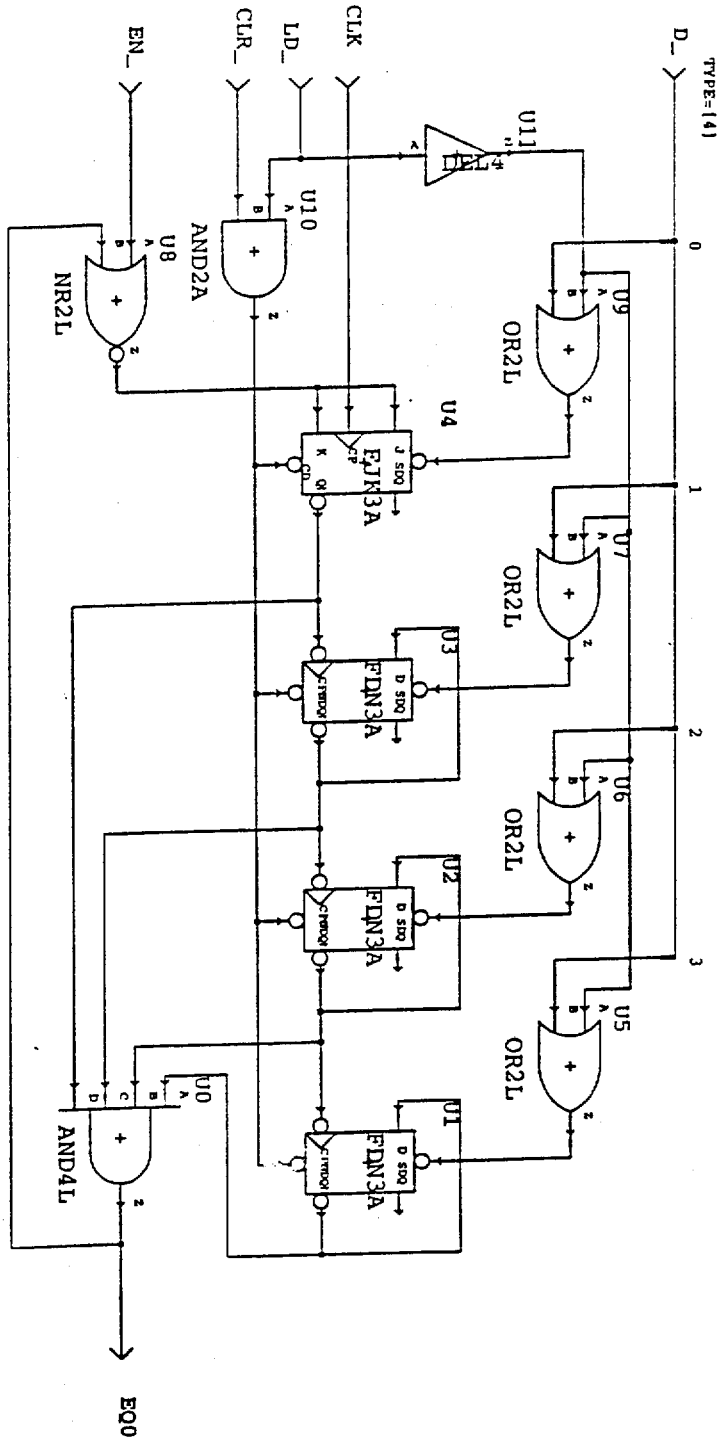

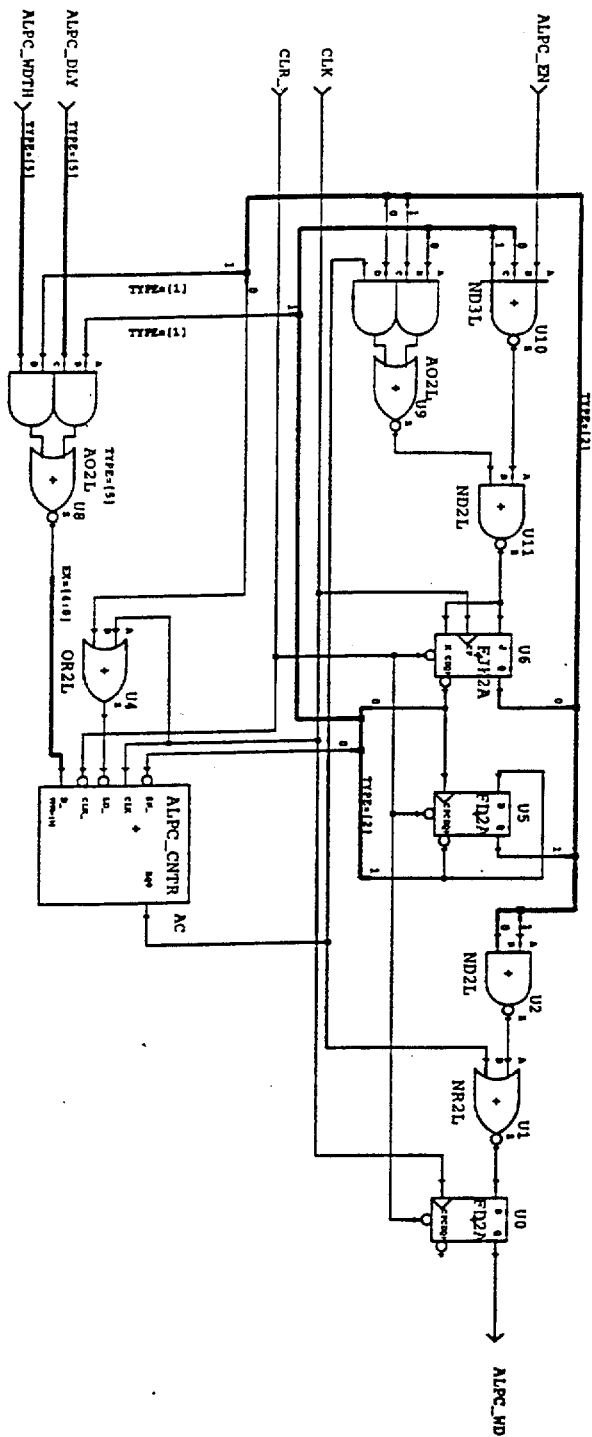

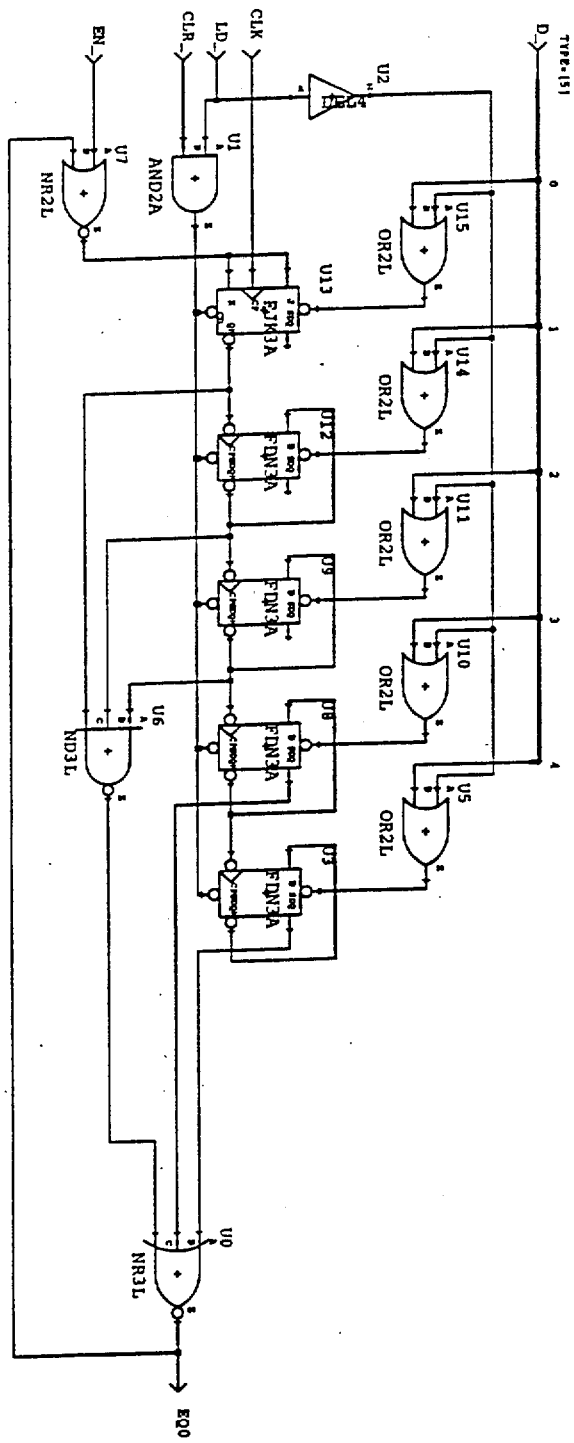

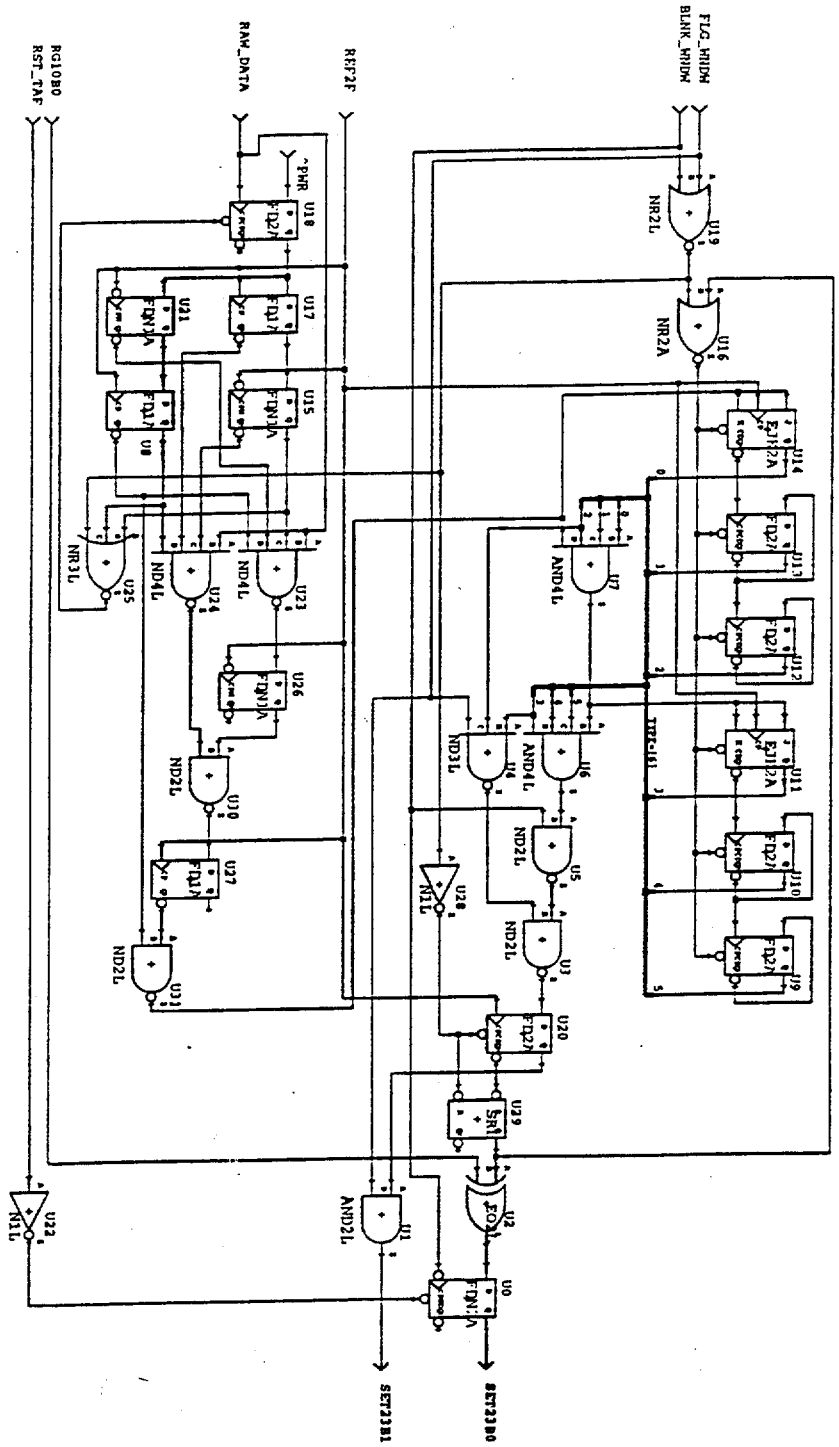

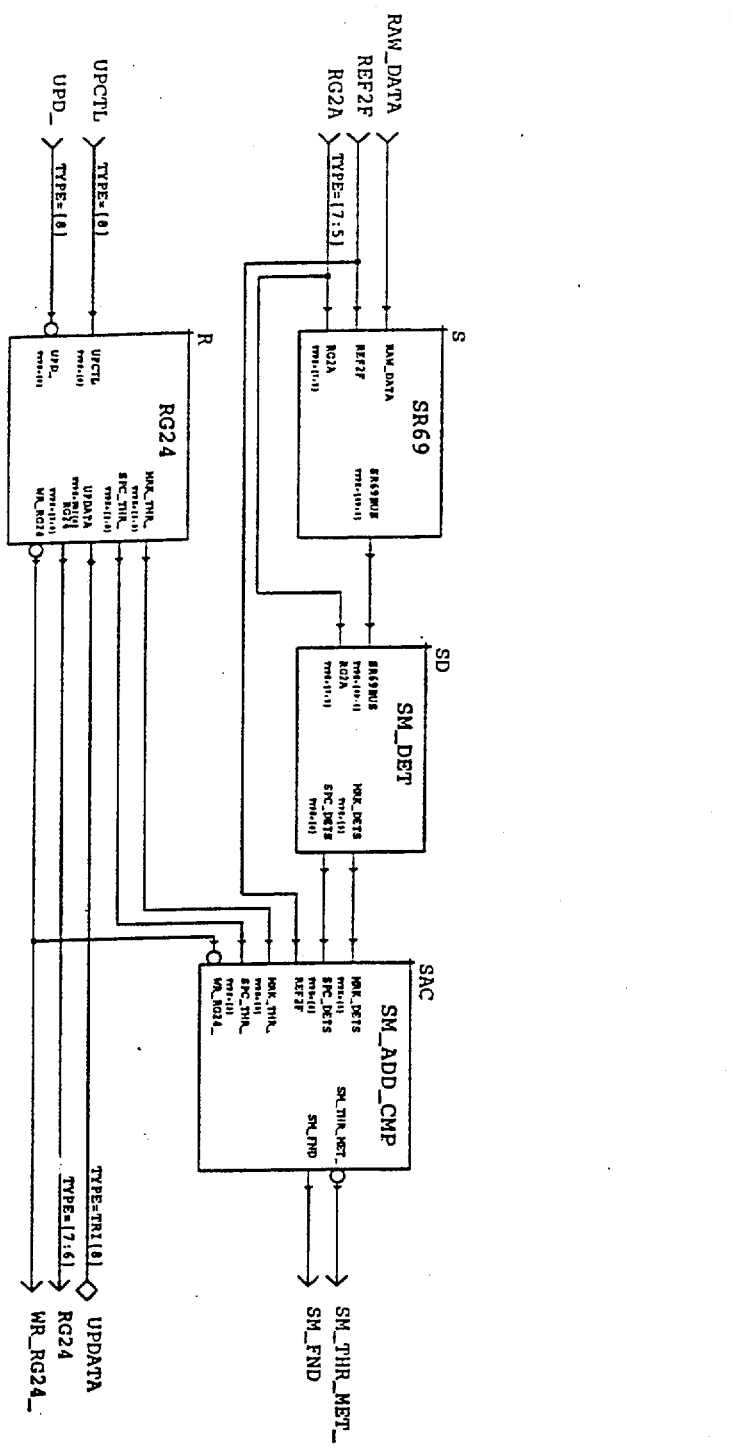

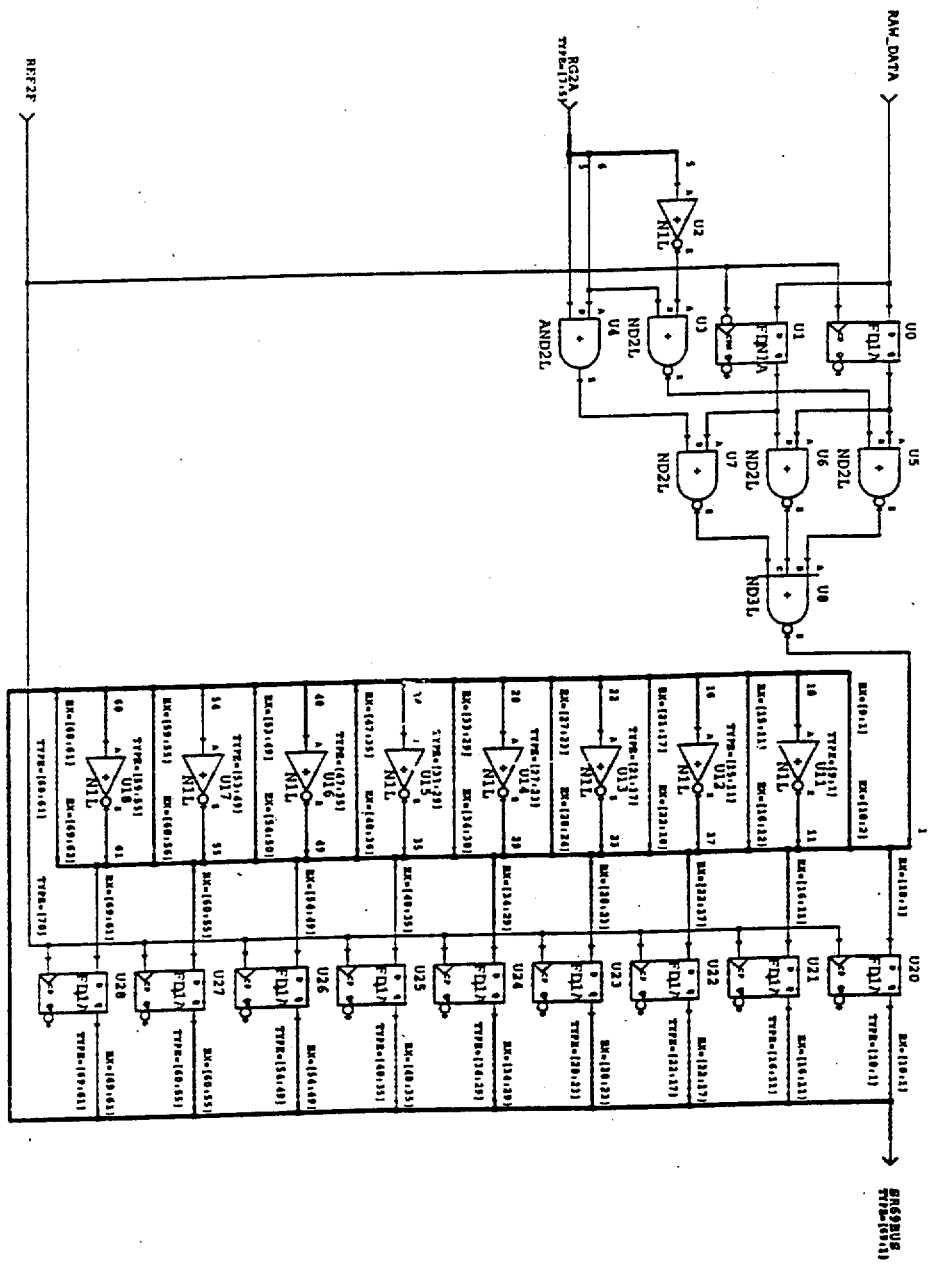

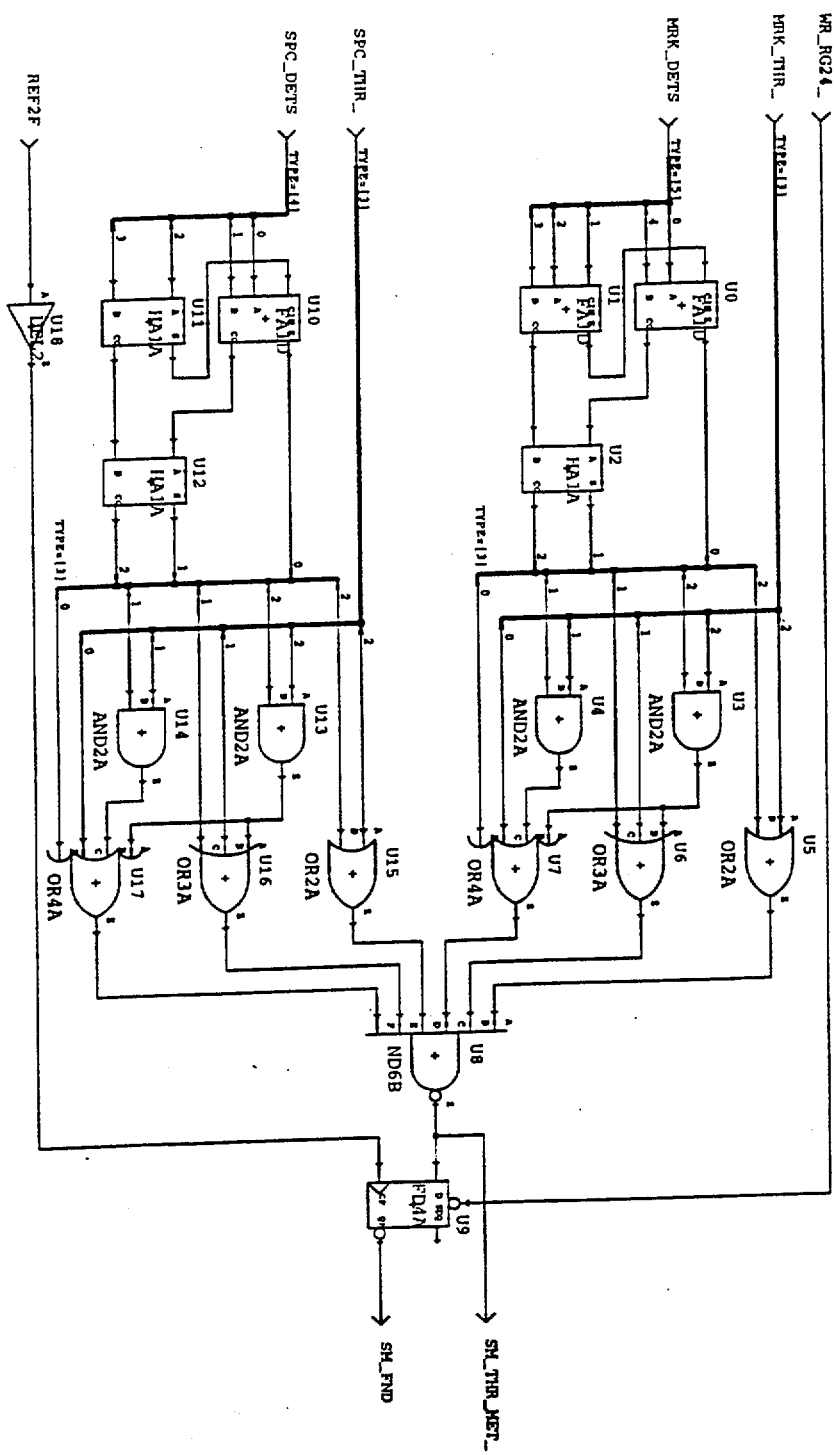

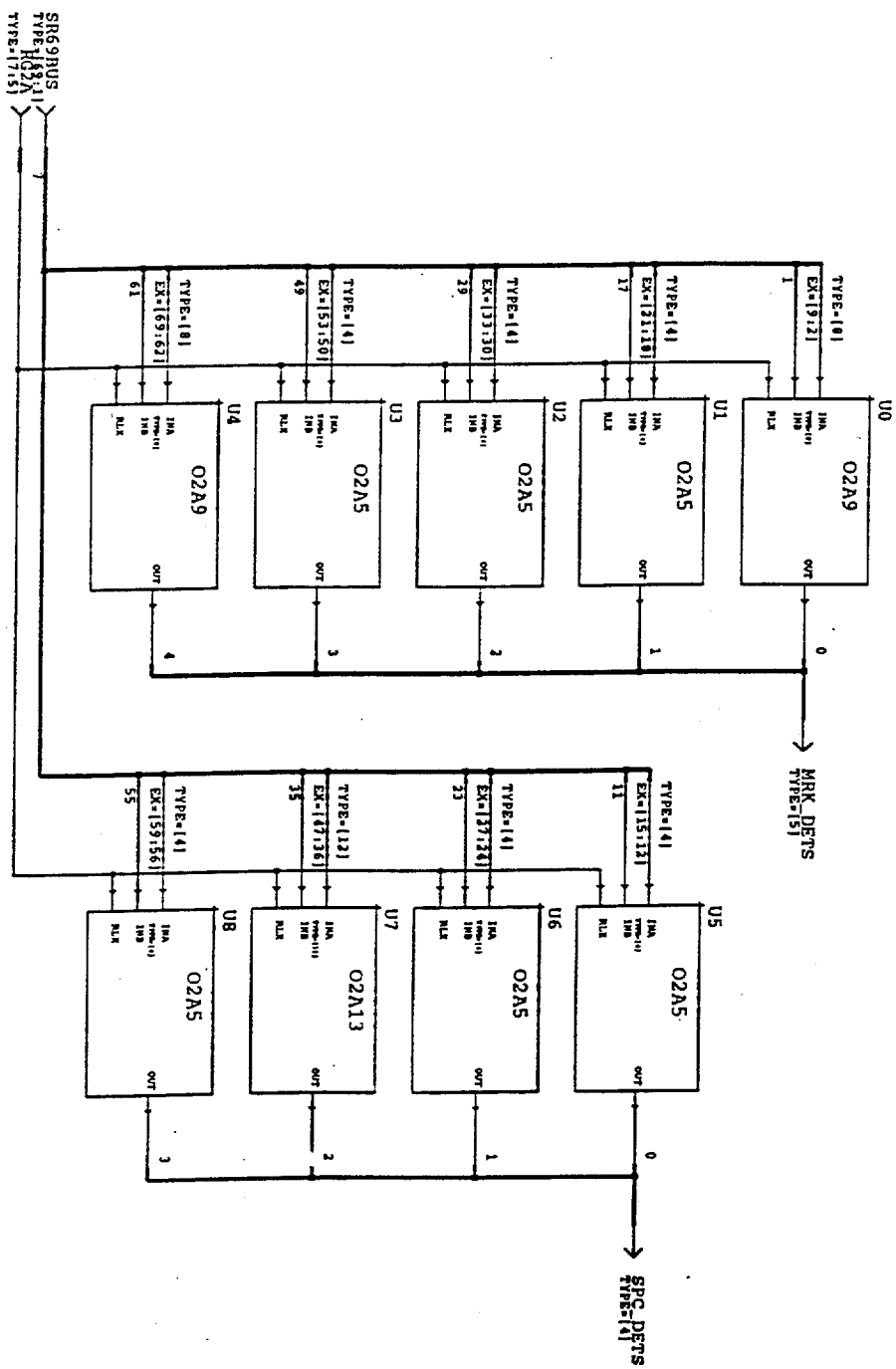

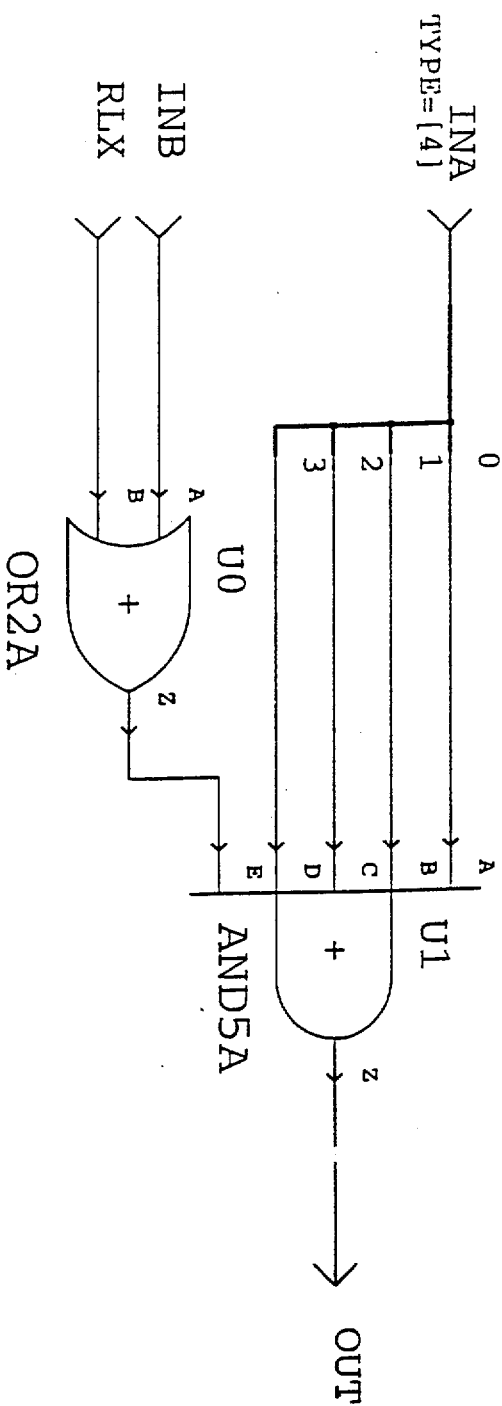

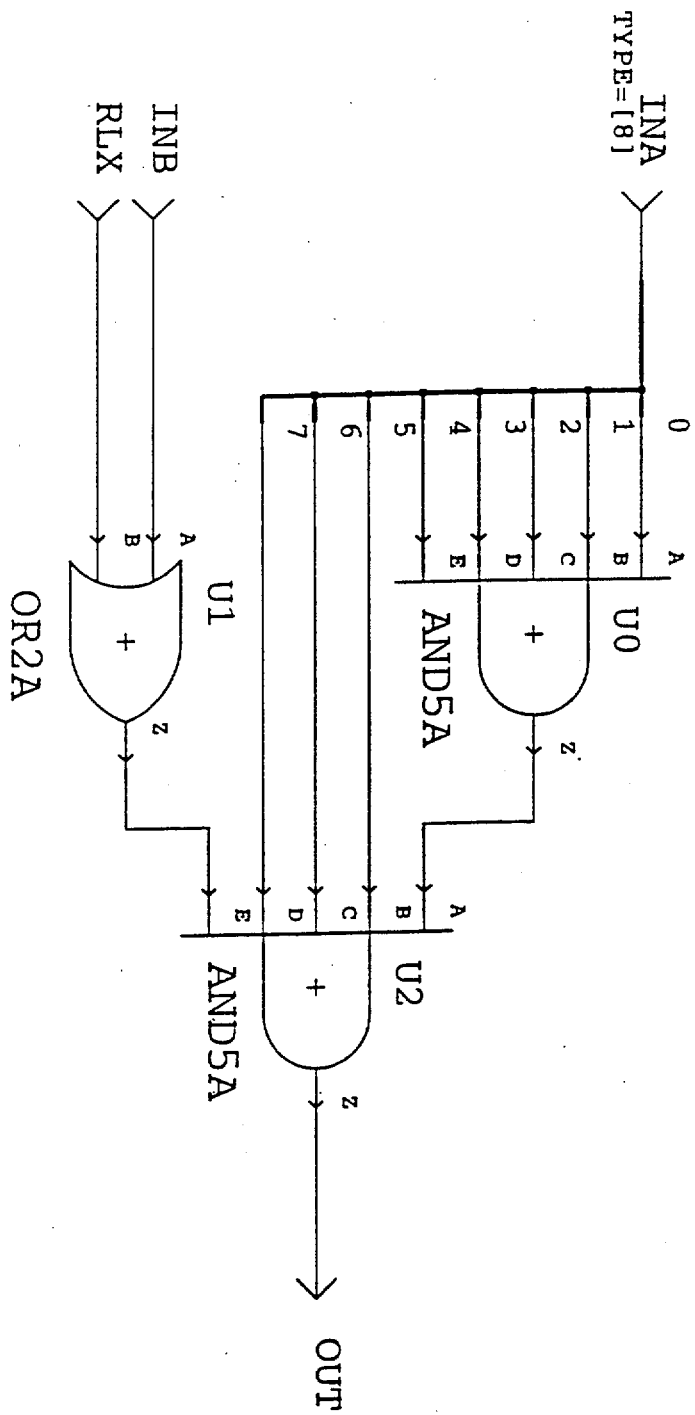

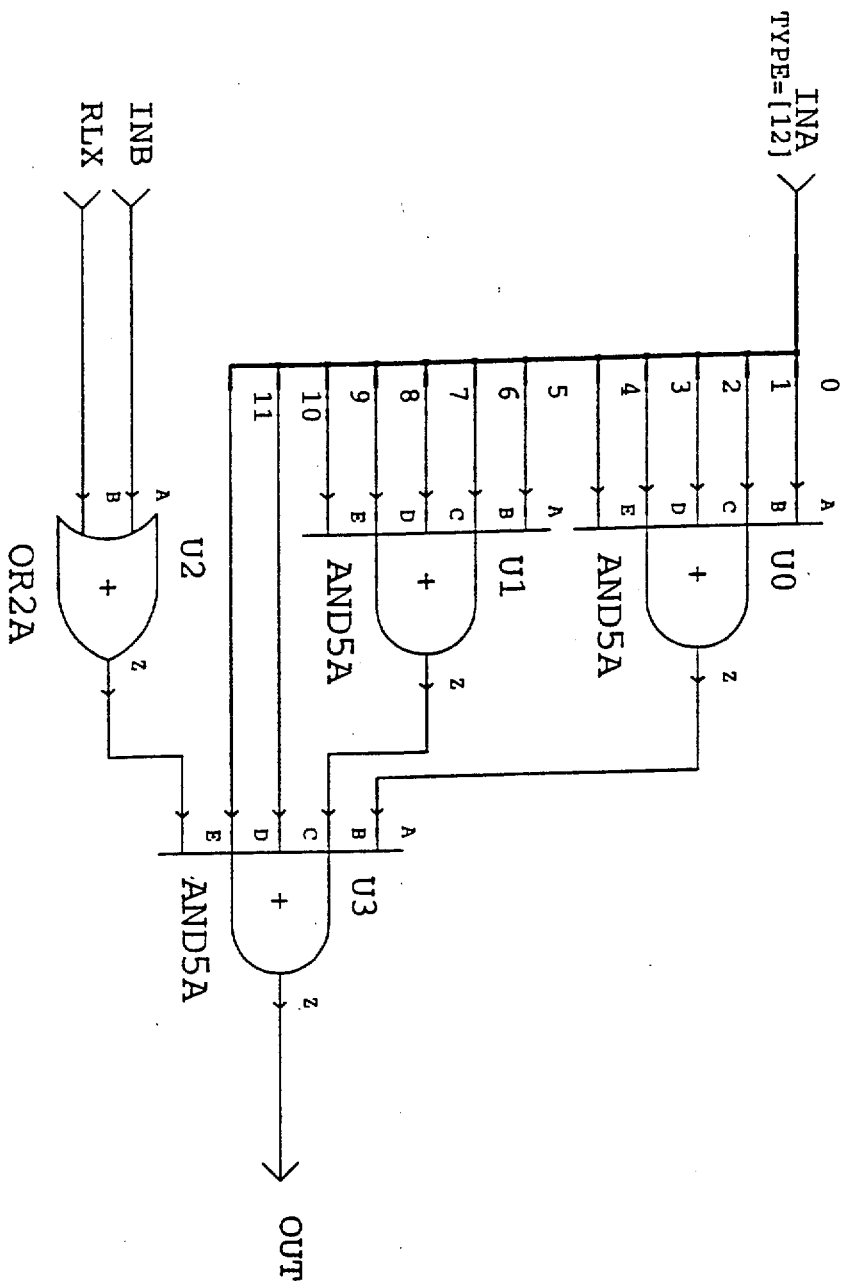

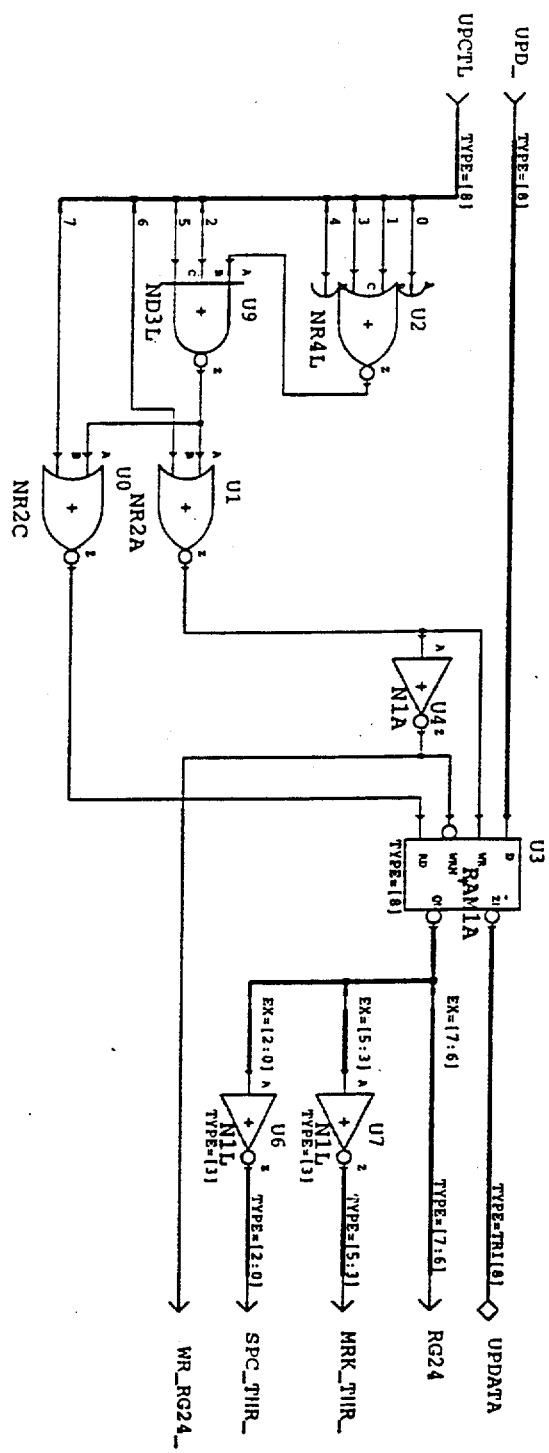

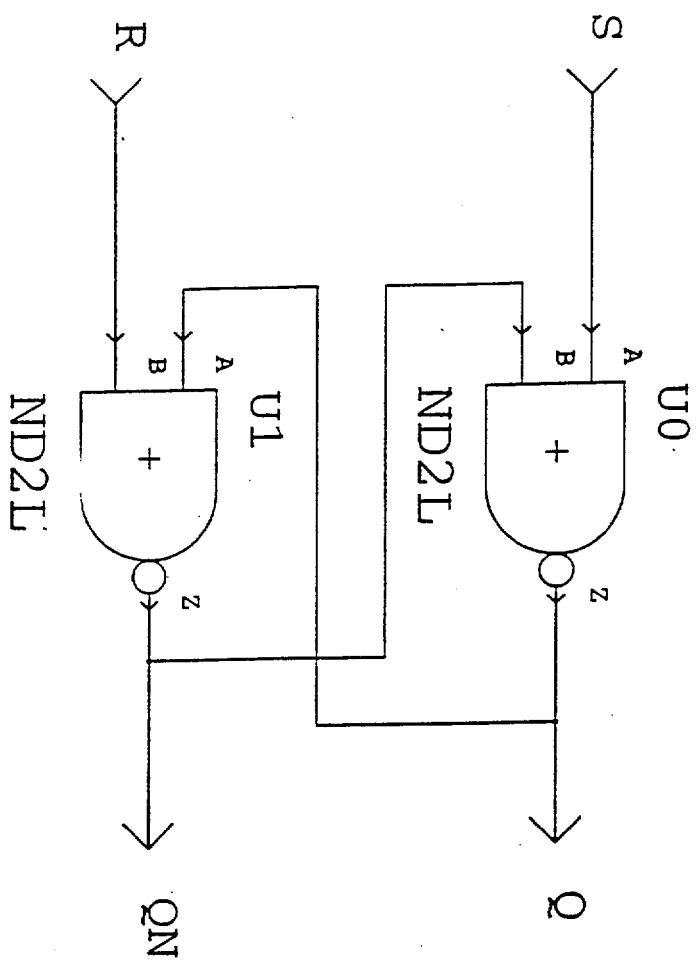

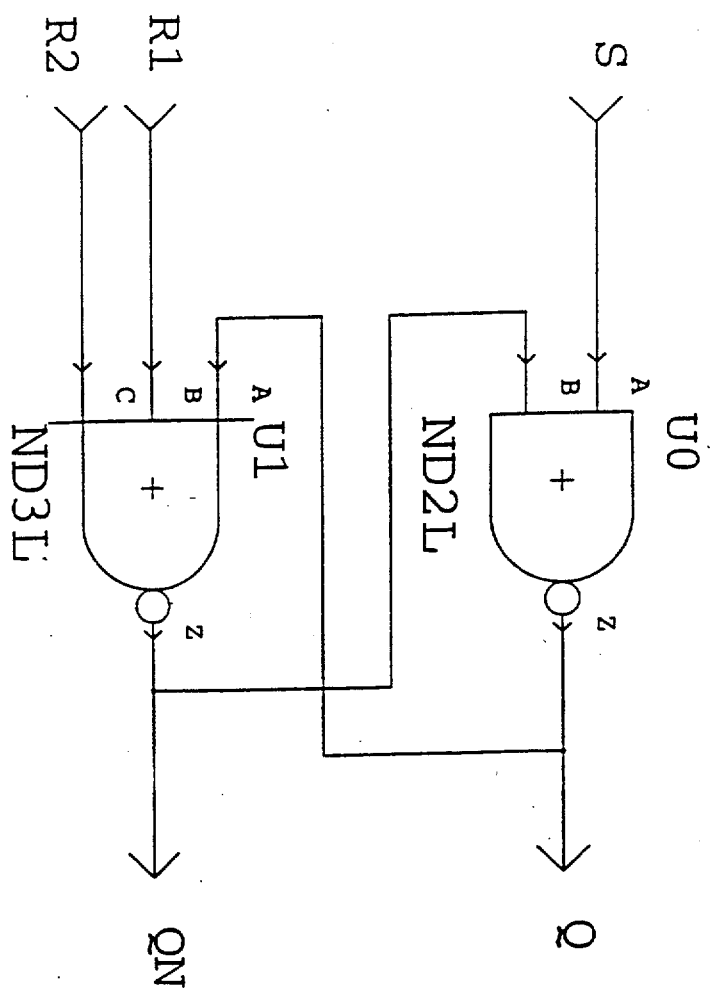

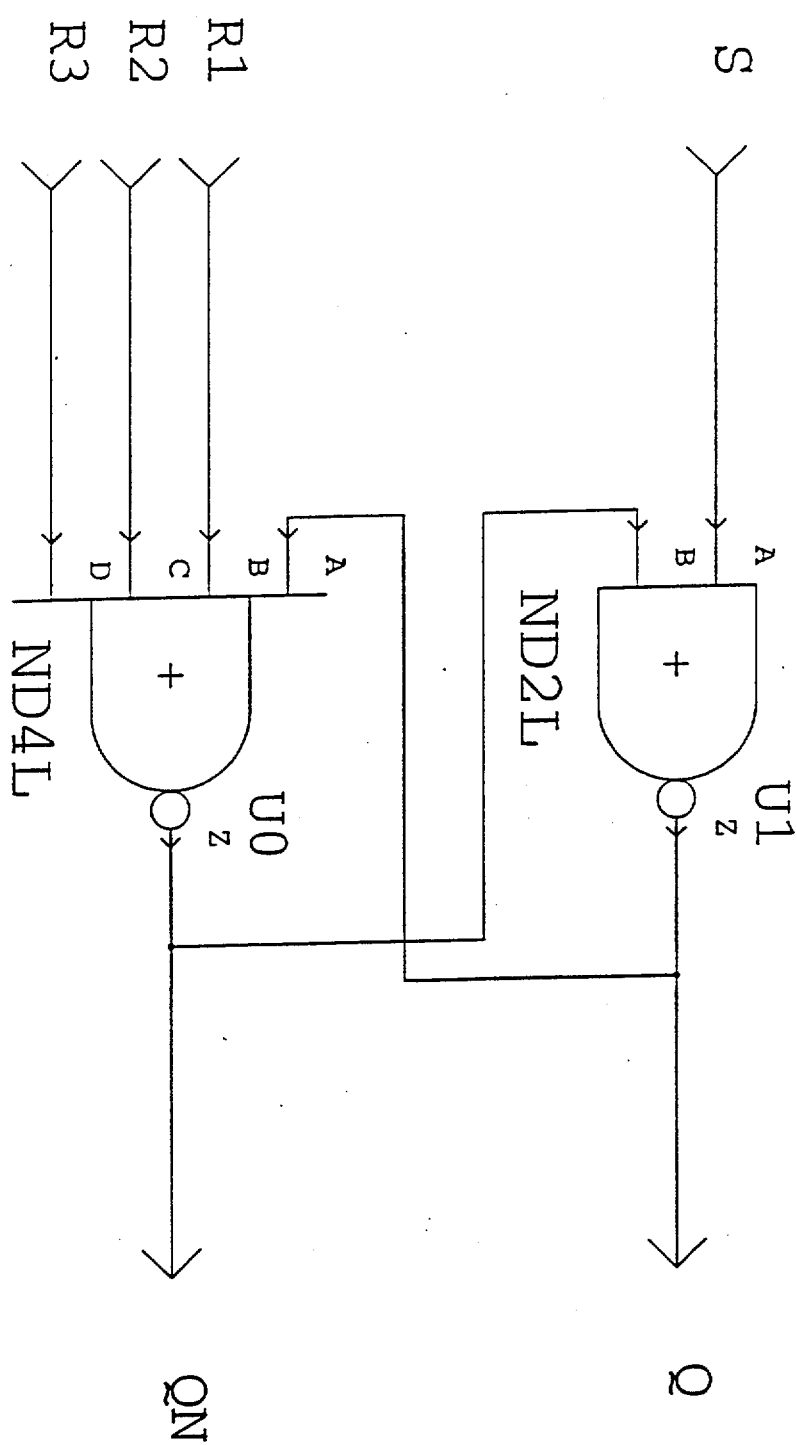

Appendix D

CL-SM330
*Preliminary Data Sheet*

Opucal Disk ENDEC/ECC

FEATURES

*Microcontroller Interface*

- Supports high-speed microcontroller Interfaces (e.g., 16 MHz 80C188, 12 MHz 68HC11, 30 MHz HPC460X3)
- Supports comprehensive masked interrupt and polled structures for firmware flexibility
- Complements and shares address space with companion CL-SM331 SCSI Disk Controller
- Provides single-pin selection of direct compatibility with Intel®-or Motorola®-style microcontrollers

*Optical Format Support*

- Incorporates embedded (2,7) RLL ENDEC
- Fully supports ANSI/ISO standard re-writable, partial ROM, and WORM (Write-Once, Read-Many) optical formats using continuous/composite servoing
- Supports ANSI/ISO standard ECC/CRC codes
- Provides internal programmable voting thresholds for Sector Mark, ID Fields, Data Sync Mark, and Resync Marks
- Provides hardware PLL re-synchronization capability for automatic detection of and recovery from loss of frequency lock

*High Performance*

- Supports up to 24 MHz NRZ data rates

*(cont. next page)*

OVERVIEW

The CL-SM330 Optical Disk ENDEC/ECC is a VLSI component designed to work with the CL-SM331 SCSI Optical Disk Controller to provide the majority of hardware required to implement a Small Computer System Interface (SCSI) optical disk controller. The combination of the CL-SM330 and the CL-SM331 has been designed for embedded optical disk drive applications where minimal real estate, reduced microcontroller intervention, and maximum performance capability are required. The CL-SM330 incorporates a high-speed microcontroller interface, (2,7) RLL Encoder/Decoder, error-correcting code and CRC code generator, full hardware error detection and correction circuitry and additional logic required to support ANSI/ISO standard re-writable and write-once optical drives using continuous/composite servoing.

*(cont. next page)*

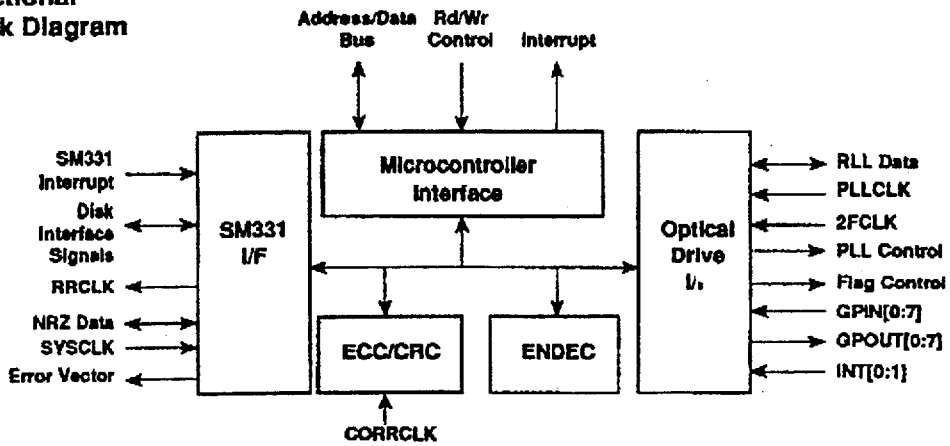

Functional Block Diagram

CL-SM330
Optical Disk ENDEC/ECC

FEATURES (cont.)

- Provides 'on-the-fly' hardware error correction without microcontroller intervention
- Allows multiple-sector transfers without microcontroller intervention

Comprehensive Interface

- Direct connection to companion CL-SM331 SCSI Optical Disk Controller without 'glue' logic
- Provides address-decoded, eight-bit, general-purpose I/O ports and external interrupt sources for drive control requirements

Technology

- 100-pin Quad Flat Pack (QFP) package
- Pinout coordinated with CL-SM331 for optimum board layout efficiency
- Advanced, low-power, double-metal CMOS technology

ADVANTAGES

Unique Features and Benefits

- Pin configurable microcontroller control interface
- Allows direct connection to Intel- or Motorola-style microcontrollers
- 'On-the-fly' error correction is transparent to local microcontroller
- Relieves microcontroller of error-correction overhead
- Sophisticated track-format-related error retry sequences
- Highest error recovery capability
- Automatic bad-sector slipping support
- Avoids loss of disk orientation for known defective sectors
- Proprietary error-correcting code generator and corrector designs
- Minimum gate count
- Diagnostic modes for testing EDAC circuitry without writing to the medium
- High testability

OVERVIEW (cont.)

A local microcontroller sets the initial operating parameters for both the CL-SM330 and CL-SM331. Once initialized, multiple-sector operations may be executed without microcontroller intervention. Features such as auto-incrementing ID registers and fully automated error correction relieve the microcontroller of real-time interaction with disk activity. Virtually all controller functions are programmable by the microcontroller via read/write registers. This provides substantial firmware control over drive operation to allow for unique requirements, various retry methods, etc.

Full ANSI/ISO format support provides for programmable Sector Mark, ID Field, Data Sync Mark, and Resync Mark thresholds, automatic hardware PLL re-synchronization capability, compensation for Sector Mark Asymmetry, and Flag Generation and Detection. Output signals are provided to indicate the position of the Pre-Formatted Data Area, the Track Offset Flag Area and the Automatic Laser Power Control Area. Other output signals are provided for data synchronizer (PLL) control. During either normal phase lock, or if phase lock is lost while reading, these output signals can properly coordinate and control Phase/Frequency or Phase-Only Lock Mode, reference oscillator or data input multiplexing, and wide or narrow PLL loop bandwidth.

The CL-SM330 supports standard 512-byte sectors with five ECC interleaves or 1024-byte sectors with ten ECC interleaves. The absolute address of sector data in the data buffer is tracked by the CL-SM330, thereby allowing the generation of correction vectors for erroneous data. These vectors are transferred to CL-SM331, which corrects the erroneous data in the buffer, without microcontroller intervention. Vendor unique or control pointer data can also be stored in the buffer RAM and be accessible to either the local microcontroller or the SCSI host interface. All but worst-case consecutive sector errors are corrected without loss of disk orientation.

CL-SM330
Optical Disk ENDEC/E...

CIRRUS LOGIC

TABLE OF CONTENTS

| Section | Page |
|---|---|
| 1. PIN INFORMATION | 5 |
| 1.1 Pin Diagram for the 100-pin Quad Flat Pack (QFP) Package | 5 |
| 2. PIN ASSIGNMENTS | 6 |
| 2.1 Microcontroller Interface Pins | 6 |
| 2.2 CL-SM331 Interface Pins | 8 |
| 2.3 Device Interface Pins | 10 |
| 2.4 Power, Ground and Misc. Pins | 12 |
| 3. REGISTER TABLES | 13 |
| 3.1 Configuration Registers | 13 |
| 3.2 Interrupt Registers | 14 |
| 3.3 Mark Detection Control Registers | 14 |
| 3.4 Window Control Registers | 14 |
| 3.5 ECC Control Registers | 15 |
| 3.6 Miscellaneous Registers | 15 |
| 3.7 Register and Bit Table | 16 |
| 4. FUNCTIONAL DESCRIPTION | 22 |
| 4.1 Read Sector Operation | 22 |
| 4.2 Write Sector Operation | 24 |
| 4.3 Read ID Operation | 24 |
| 4.4 Search ID Operation | 25 |
| 4.5 Blank Sector Operations | 25 |
| 4.6 RLL Encode/Decode Circuits | 26 |
| 4.7 Mark Detection | 26 |
| 4.8 Mark Generation | 28 |
| 4.9 Timing Strategy and Window Generation | 28 |
| 4.10 Data Synchronization Functions | 29 |
| 4.11 ID Functions | 33 |
| 4.12 Flag Field Functions | 33 |
| 4.13 Write Prerequisites | 34 |
| 4.14 Erase Considerations | 34 |
| 4.15 ECC Hardware Correction Functions | 34 |
| 4.16 Error Vector Transfer Protocol | 34 |
| 4.17 NRZ CRC Checksum Protocol | 35 |
| 4.18 Erasure Pointers | 35 |

| Section | Page |
|---|---|
| 5. INITIALIZATION CONDITIONS | 36 |
| 5.1 Reset Conditions | 36 |
| 5.2 Register Initialization | 37 |
| 6. CONFIGURATION REGISTERS | 38 |
| 6.1 10H Configuration Register 1 | 38 |
| 6.2 11H Configuration Register 2 | 39 |
| 6.3 12H Configuration Register 3 | 41 |
| 6.4 13H Sectors Per Track | 43 |
| 6.5 14H ID Target Sector | 43 |
| 6.6 15H ID Target Track LSB | 43 |
| 6.7 16H ID Target Track MSB | 44 |
| 6.8 17H ID Compare Sector | 44 |
| 6.9 18H ID Compare Track LSB | 44 |
| 6.10 19H ID Compare Track MSB | 44 |
| 6.11 1AH Sector Transfer Count | 45 |
| 6.12 1BH Sector Correction Count | 45 |
| 6.13 1CH, 57H Data Buffer Address Low | 46 |
| 6.14 1DH, 58H Data Buffer Address Middle | 46 |
| 6.15 1EH, 59H Data Buffer Address High | 47 |
| 6.16 1FH Revision Number | 47 |
| 7. INTERRUPT REGISTERS | 48 |
| 7.1 20H Interrupt Enable Register | 48 |
| 7.2 21H Media Error Enable Register | 49 |
| 7.3 22H Interrupt Status Register | 51 |
| 7.4 23H Media Error Status Register | 54 |
| 8. MARK DETECTION CONTROL REGISTERS | 56 |
| 8.1 24H Sector Mark Control | 56 |
| 8.2 25H Resync Mark Control | 57 |
| 8.3 26H ID Field/Data Sync Control | 58 |
| 8.4 27H ID Error Status (Read Only) | 59 |

CL-SM330
*Optical Disk ENDEC/ECC*

TABLE OF CONTENTS (cont.)

| Section | Page |
|---|---|
| 9. WINDOW CONTROL REGISTERS | 60 |
| 9.1  28H Window Control Register | 60 |
| 9.2  29H TOF Window Control | 62 |
| 9.3  2AH Sector Mark/ALPC Length | 62 |
| 9.4  2BH LFLD Control/ALPC Delay | 63 |
| 9.5  2CH PLL Polarity/Lock Control | 64 |
| 9.6  2DH PLL Relock Control | 64 |
| 9.7  2EH LFLD Window Control | 65 |
| 10. ECC CONTROL REGISTERS | 66 |
| 10.1  30H Error Correction Status | 66 |
| 10.2  31H Error Corrector RAM Address | 67 |
| 10.3  32H Error Corrector RAM Data | 68 |
| 11. MISCELLANEOUS REGISTERS | 70 |
| 11.1  34H Vendor Unique Byte 1 | 70 |
| 11.2  35H Vendor Unique Byte 2 | 70 |

| Section | Page |
|---|---|
| 11.3  36H Vendor Unique Byte 3 | 70 |
| 11.4  37H Vendor Unique Byte 4 | 70 |
| 11.5  38H General Purpose Input | 71 |
| 11.6  39H General Purpose Output | 71 |
| 11.7  2FH, 33H, 3AH-3DH Reserved | 71 |
| 11.8  3EH Set Sector Mark Window | 71 |
| 11.9  3FH Test Register | 72 |
| 12. ELECTRICAL SPECIFICATION | 74 |
| 12.1  Absolute Maximum Ratings | 74 |
| 12.2  DC Characteristics | 75 |
| 12.3  AC Characteristics | 75 |
| 13. TYPICAL APPLICATION | 84 |
| 14. ORDERING INFORMATION | 84 |

APPENDIX A

| Section | Page |
|---|---|
| 1. ANSI/ISO STANDARD TRACK FORMATS | A-2 |
| 1.1.  90 mm Sector Format | A-2 |
| 1.2.  130 mm Sector Format | A-5 |
| 1.3.  Sector Format Description | A-8 |
| 1.4.  Error Correction and Detection Codes | A-10 |

| Figures | Page |
|---|---|
| Figure A-1.  90 mm 512 (1024) Byte Sector Format | A-2 |
| Figure A-2.  512-Byte Sector Data Field Organization | A-3 |
| Figure A-3.  1024-Byte Sector Data Field Organization | A-4 |
| Figure A-4.  130 mm 512 (1024)-Byte Sector Format | A-5 |
| Figure A-5.  512-Byte Sector Data Field Organization | A-6 |
| Figure A-6.  1024-Byte Sector Data Field Organization | A-7 |

CL-SM330
Optical Disk ENDEC/ECC
1. PIN INFORMATION
The CL-SM330 is available in a 100-pin Quad Flat Pack (QFP) package. The pin diagram below shows this package. All unused inputs must be tied to the inactive state, VDD or VSS, as appropriate.
1.1 Pin Diagram for the 100-Pin Quad Flat Pack (QFP) Package
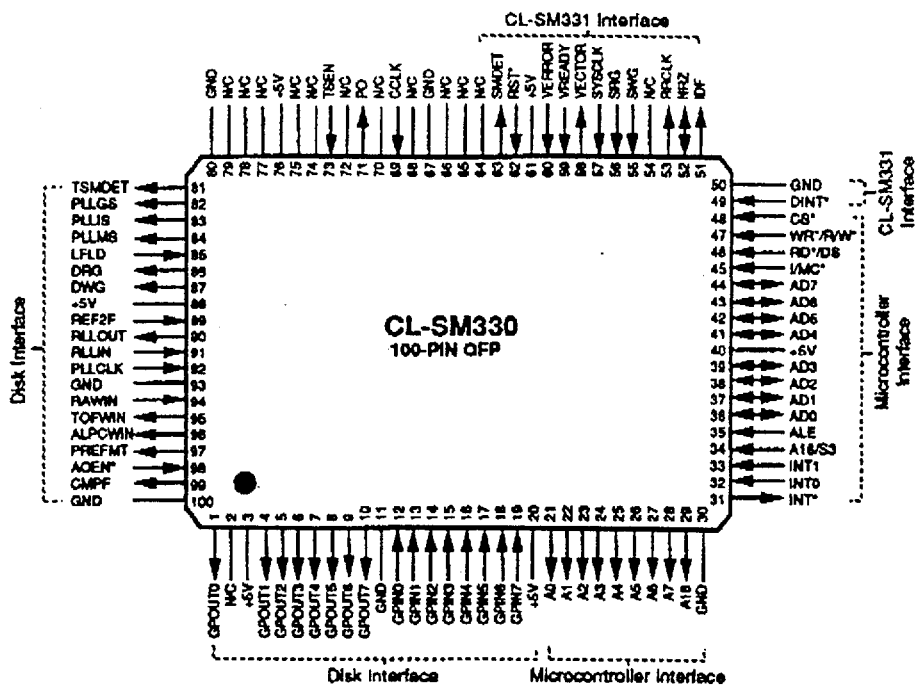

CL-SM330
*Optical Disk ENDEC/ECC*

2. PIN ASSIGNMENTS

The following conventions are used in the pin assignment tables. An asterisk (*) denotes a negative-true (low-active) signal. An input pin is indicated by (I). An output pin is indicated by (O). An open-drain output pin is indicated by (OD). A high-impedance output is indicated by (Z). An input/output pin is indicated by (I/O). All unused inputs must be tied to the inactive state, VDD or VSS, as appropriate.

2.1 Microcontroller Interface Pins

| SYMBOL | PIN | TYPE | DESCRIPTION |
|---|---|---|---|
| INT | 31 | OD/O | INTERRUPT: This signal is an interrupt line to the microcontroller. Its polarity and output driver type (push-pull or open drain) are programmable. |
| CS* | 48 | I | CHIP SELECT: This signal must be asserted for all microcontroller accesses to the CL-SM330 registers. It is low active. |
| WR*/R-W* | 47 | I | WRITE STROBE/READ-WRITE: When the I/MC* input is high, this signal acts as the WR* Signal; when CS* and WR* are asserted, the data on the AD Bus will be written to the specified register. When the I/MC* input is low, this signal acts as the R-W* Signal, that determines the direction of data transfer when accessing the CL-SM330 registers. When CS* and DS are asserted and R-W* is high, a register read operation is in progress. When CS* and DS are asserted and R-W* is low, a register write operation is in progress. |
| RD*/DS | 46 | I | READ STROBE/DATA STROBE: When the I/MC* input is high, this signal acts as the RD* Signal; when CS* and RD* are asserted, the data from the specified register will be driven onto the AD Bus. When the I/MC* input is low, this signal acts as the DS Signal, that determines the data timing of a register access. When CS* is asserted and R-W* is high, the rising edge of DS indicates when the CL-SM330 may start driving data onto the AD Bus. When CS* is asserted and R-W* is low, the trailing edge of DS indicates when the CL-SM330 may latch data from the AD Bus. |

CL-SM330
*Optical Disk ENDEC/ECC*

 CIRRUS LOGIC

2.1 Microcontroller Interface Pins *(cont.)*

| SYMBOL | PIN | TYPE | DESCRIPTION |
|---|---|---|---|
| I/MC* | 45 | I | INTEL/MOTOROLA: This signal selects the microcontroller interface to be used. When this signal is high, it selects the Intel Bus Control Interface. When this signal is low, it selects the Motorola Bus Control Interface. An internal pull up allows this signal to be legally 'floated' to select the default Intel Bus Control Interface. |
| AD[7:0] | 44-41,39-36 | I/O | MICROCONTROLLER ADDRESS/DATA BUS: These eight signals are the tristate Address/Data signals that interface with a multiplexed Microcontroller Address/Data Bus. |
| A16/S3 | 34 | I | MICROCONTROLLER ADDRESS BIT 16: This is the ninth address bit to allow addressing of up to 128K bytes of memory when in the Intel Mode. |
| AOEN* | 98 | I | ADDRESS OUTPUT ENABLE: This signal is the tristate enable control for the A[16,7:0] Latched Address Output buffers. A zero at this input will enable A[16,7:0]. This input must not be allowed to float. |
| ALE | 35 | I | ADDRESS LATCH ENABLE: On the trailing edge of this signal, the CL-SM330 latches the address present on the AD Bus and the A16/S3 input. |
| RST* | 62 | I | RESET: Assertion of this signal halts all operations within the CL-SM330 and deasserts all output signals except A[16,7:0] and the AD Bus. With the exceptions listed above, all input/output signals and the INT Signal are set to the high-impedance state. |
| A[16,7:0] | 29-21 | Z | MICROCONTROLLER LATCHED ADDRESS: This bus presents the nine address bits latched by ALE. These signals are provided for general system use and are always available, regardless of the state of CS*. They are controlled by the AOEN* input. |

CL-SM330
*Optical Disk ENDEC/ECC*

2.2 CL-SM331 Interface Pins

| SYMBOL | PIN | TYPE | DESCRIPTION |
|---|---|---|---|
| SMDET | 63 | O | SECTOR MARK DETECTED: This signal is asserted when a Sector Mark is detected or a Pseudo Sector Mark is generated. |
| IDF | 51 | O | ID FOUND: This signal is connected to the IDF Signal of the CL-SM331. It is asserted after the ODF (Offset Detection Flag, see Appendix A) when a Read, Write, or Blank Sector Operation is in progress. The ID Track and Sector numbers of the current sector match the ID Target registers when the ID Voting Threshold has been met. |
| SRG | 56 | I | SEQUENCER READ GATE: This signal is connected to the Read Gate from the CL-SM331. |
| SWG | 55 | I | SEQUENCER WRITE GATE: This signal is connected to the Write Gate from the CL-SM331. |
| RRCLK | 53 | O | READ REFERENCE CLOCK: This signal clocks the NRZ Data Signal to or from the CL-SM331. |
| NRZ | 52 | I/O | NON RETURN TO ZERO: This signal is the Read Data Output to the CL-SM331 when SRG is asserted. It is the Write Data Input from the CL-SM331 when SWG is asserted. In both cases, it is synchronized to RRCLK. Data transferred over the NRZ line is protected by an eight-bit CRC checksum. The NRZ I/O Buffer has an internal pull-down resistor to prevent the signal from floating when not being driven. |
| DINT* | 49 | I | DISK INTERRUPT INPUT: This signal can be used to combine interrupts from the CL-SM331 with interrupts generated by the CL-SM330. Bits in the Interrupt Enable and Interrupt Status registers are used to enable and distinguish the interrupt sources. If not used, this input must be tied to VDD. |
| SYSCLK | 57 | I | SYSTEM CLOCK: This signal is used to clock the error vector transmission circuitry. It must be the same SYSCLK Signal used by the CL-SM331. |
| CCLK | 69 | I | CORRECTOR CLOCK: This signal is used to clock the error corrector. For optimum performance, this signal should be connected to the fastest clock available, not exceeding 25 MHz. |

CL-SM330
*Optical Disk ENDEC/ECC*

2.2 CL-SM331 Interface Pins *(cont.)*

| SYMBOL | PIN | TYPE | DESCRIPTION |
|---|---|---|---|
| VECTOR | 58 | O | ERROR CORRECTION VECTOR: This signal is used to serially output error addresses and values for correction by the CL-SM331. Information transferred over the VECTOR line is protected by an eight-bit CRC code. |
| VERROR | 60 | I | ERROR CORRECTION ERROR: This signal is asserted by the CL-SM331 to indicate that it detected a vector transfer protocol error or that the error correction process was not successful (e.g., a buffer parity error was detected during error correction). |
| VREADY | 59 | I | ERROR CORRECTION READY: This signal is deasserted by the CL-SM331 after an error correction vector transfer is initiated and reasserted when it is ready to accept another error correction vector. The CL-SM330 will not initiate an error correction vector transfer while this signal is deasserted. |

CL-SM330
Optical Disk ENDEC/ECC

2.3 Device Interface Pins

| SYMBOL | PIN | TYPE | DESCRIPTION |
|---|---|---|---|
| DRG | 86 | O | DEVICE READ GATE: This signal is the Read Gate sent to the device. |
| DWG | 87 | O | DEVICE WRITE GATE: This signal is the Write Gate sent to the device. |
| PLLCLK | 92 | I | PLL CLOCK: This signal is the PLL clock from the data synchronizer in the device (2F - two times NRZ frequency). It is used to clock read data from the RLLIN line. |
| REF2F | 89 | I | 2F REFERENCE CLOCK: This signal is the reference clock from the device (2F - two times NRZ frequency). It is used to clock write data onto the RLLOUT line and to control windowing. |
| RLLIN | 91 | I | RLL DATA IN: This signal is the RLL read data from the device PLL (synchronized to PLLCLK). |
| RLLOUT | 90 | O | RLL DATA OUT: This is the RLL write data sent to the device (synchronized to REF2F). |
| RAWIN | 94 | I | RAW INPUT: This signal is the Raw Read Data Signal used for Sector Mark Detection, and for WORM (Write-Once, Read-Many) applications, Flag Field, and Blank Sector Detection. |
| TOFWIN | 95 | O | TRACK OFFSET FLAG WINDOW: This signal is asserted when the optical head is over the Offset Detection Flag. This signal is not asserted unless the Sector Mark or either ID1 or ID2 is error-free preceding the ODF (see Appendix A). |
| ALPCWIN | 96 | O | ALPC WINDOW: This signal is asserted when the optical head is over the Automatic Laser Power Control Area after a good Sector Mark or Error-Free ID. |
| PREFMT | 97 | O | PRE-FORMAT WINDOW: This signal is always asserted when the optical head is over the Pre-Formatted Area. When the Disable Pre-Format Window Bit in Window Control Register 1 is not set, this signal is deasserted over the Gap and Data Field areas. |

CL-SM330
*Optical Disk ENDEC/ECC*

2.3 Device Interface Pins *(cont.)*

| SYMBOL | PIN | TYPE | DESCRIPTION |
|---|---|---|---|
| PLLIS | 83 | O | PLL INPUT SELECT: This signal is used to control the PLL Input Source. When this signal is deasserted, the reference input to the PLL is selected. When this signal is asserted, the Data Input to the PLL is selected. Use of this signal is optional. |
| PLLMS | 84 | O | PLL MODE SELECT: This signal is used to control the PLL Detection Mode. When this signal is deasserted, the Phase-Frequency Detection Mode is selected. When this signal is asserted, the Phase-Only Detection Mode is selected. Use of this signal is optional. |
| PLLGS | 82 | O | PLL GAIN SELECT: This signal is used to control the PLL Gain Mode. When this signal is deasserted, the PLL is placed in High-Gain Mode. When this signal is asserted, the PLL is placed in Low-Gain Mode. Use of this signal is optional. |
| LFLD | 85 | I | LOSS OF FREQUENCY LOCK DETECTED: This signal is asserted by external circuitry when it detects Loss-Of-Frequency-Lock. Use of this signal is optional. The CL-SM330 has internal circuitry for detection of PLL Loss-Of-Frequency-Lock. If unused, this signal must be tied to VSS. |
| TSMDET | 81 | O | TRUE SECTOR MARK DETECTED: This signal is asserted when a Sector Mark is detected. It is not asserted when a pseudo sector mark is generated. This signal is provided for use by the drive servo system. Use of this signal is optional. |
| CMPF | 99 | O | COMPARE REGISTER FOUND: This signal is asserted when the CL-SM330 determines that it is at the beginning of the sector specified in the compare register. The signal is a pulse of width 32 RRCLK periods. |
| GPIN[7:0] | 19-12 | I | GENERAL-PURPOSE INPUTS: These signals are General-Purpose inputs suitable for device control. They are Schmitt Trigger Inputs. If unused, they must be tied to either VSS or VDD. |
| GPOUT[7:0] | 10-4, 1 | O | GENERAL-PURPOSE OUTPUTS: These signals are General-Purpose outputs suitable for device control. |

CL-SM330
*Optical Disk ENDEC/ECC*

2.3 Device Interface Pins (cont.)

| SYMBOL | PIN | TYPE | DESCRIPTION |
|---|---|---|---|
| INT [1:0] | 33-32 | I | INTERRUPT 1-0: These signals are general-purpose edge-sensitive interrupts with programmable polarity. When disabled by writing a '0' to the appropriate Interrupt Enable Register bits, these inputs may be used in the same manner as the GPIN inputs. If unused, these pins must be tied to VDD or VSS. |

2.4 Power, Ground and Miscellaneous Pins

| SYMBOL | PIN | TYPE | DESCRIPTION |
|---|---|---|---|
| VDD | 3,20, 40,61, 76,88 | N/A | Power Supply (+5 VDC). |
| VSS | 11,30, 50,67, 80,93,100 | N/A | Ground Pins. |
| N/C | 2,54,64-66 68,70,72 74,75,77-79 | N/A | No Connection. |
| TSEN | 73 | I | TRISTATE ENABLE: Must be tied to VDD for proper functioning of the CL-SM330. |
| PO | 71 | O | PARAMETRIC TEST OUTPUT: Do not load. |

CL-SM330
Optical Disk ENDEC/ECC

3. REGISTER TABLES

3.1 Configuration Registers

Convention: xxH indicates a hexadecimal number.

| ADDRESS | TYPE | DESCRIPTION/FUNCTION |
|---|---|---|
| 10H | R/W | Configuration Register 1 |
| 11H | R/W | Configuration Register 2 |
| 12H | R/W | Configuration Register 3 |
| 13H | R/W | Sectors Per Track |
| 14H | R/W | ID Target Sector |
| 15H | R/W | ID Target Track LSB |
| 16H | R/W | ID Target Track MSB |
| 17H | R/W | ID Compare Sector |
| 18H | R/W | ID Compare Track LSB |
| 19H | R/W | ID Compare Track MSB |
| 1AH | R/W | Sector Transfer Count |
| 1BH | R | Sector Correction Count |
| 1CH, 57H | R/W | Data Buffer Address Low |
| 1DH, 58H | R/W | Data Buffer Address Middle |
| 1EH, 59H | R/W | Data Buffer Address High (Bit 7 is read only) |
| 1FH | R | Revision Number |

CL-SM330
*Optical Disk ENDEC/ECC*

3.2 Interrupt Registers

| ADDRESS | TYPE | DESCRIPTION/FUNCTION |
|---|---|---|
| 20H | R/W | Interrupt Enable Register |
| 21H | R/W | Media Error Interrupt Enable Register |
| 22H | R/W | Interrupt Status Register (some bits are read only under certain conditions) |
| 23H | R/W | Media Error Interrupt Status Register |

3.3 Mark Detection Control Registers

| ADDRESS | TYPE | DESCRIPTION/FUNCTION |
|---|---|---|
| 24H | R/W | Sector Mark Control |
| 25H | R/W | Resync Mark Control |
| 26H | R/W | ID Field/Data Sync Control |
| 27H | R | ID Error Status |

3.4 Window Control Registers

| ADDRESS | TYPE | DESCRIPTION/FUNCTION |
|---|---|---|
| 28H | R/W | Window Control Register |
| 29H | R/W | TOF Window Control |
| 2AH | R/W | Sector Mark/ALPC Length |
| 2BH | R/W | LFLD Control/ALPC Delay (some bits are read only under certain conditions) |
| 2CH | R/W | PLL Polarity/Lock Control |
| 2DH | R/W | PLL Relock Control |
| 2EH | R/W | LFLD Window Control |

CL-SM330
*Optical Disk ENDEC/ECC*

3.5 ECC Control Registers

| ADDRESS | TYPE | DESCRIPTION/FUNCTION |
|---------|------|----------------------|
| 30H | R | Error Correction Status |
| 31H | R/W | Error Corrector RAM Address |
| 32H | R/W | Error Corrector RAM Data |

3.6 Miscellaneous Registers

| ADDRESS | TYPE | DESCRIPTION/FUNCTION |
|---------|------|----------------------|
| 34H | R/W | Vendor Unique Byte 1 |
| 35H | R/W | Vendor Unique Byte 2 |
| 36H | R/W | Vendor Unique Byte 3 |
| 37H | R/W | Vendor Unique Byte 4 |
| 38H | R | General-Purpose Input |
| 39H | R/W | General-Purpose Output |
| 2FH, 33H, 3AH-3DH | | Reserved<br>Reserved |
| 3EH | W | Set Sector Mark Window (test purposes only) |
| 3FH | R/W | Test Register (test purposes only) |

CL-SM330
Optical Disk ENDEC/ECC

3.7 Register and Bit Table

| ADDRESS | TYPE | DESCRIPTION/FUNCTION |
|---|---|---|
| 10H | R/W | Configuration Register 1<br>Bit 7: Chip Reset<br>Bit 6: Operation Halt/Chip Busy<br>Bit 5: Error Reset<br>Bit 4: Start Error Corrector/Error Corrector Busy<br>Bit 3: Suppress Correction Vectors<br>Bits 2-0: Operation Mode |
| 11H | R/W | Configuration Register 2<br>Bit 7: Reserved<br>Bit 6: Enable Buffer Segmentation<br>Bit 5: Enable Correction/Transfer of VU/PTR Bytes<br>Bit 4: VU/PTR Source Mode<br>Bit 3: 0.5/1% Speed Tolerance Select<br>Bit 2: Reserved<br>Bit 1: 90/130 mm Mode Select<br>Bit 0: 512/1024-byte Sector Mode Select |
| 12H | R/W | Configuration Register 3<br>Bit 7: Disable INT Output Driver<br>Bit 6: Negative INT Polarity<br>Bit 5: Enable ALPC Window on Read operations<br>Bit 4: Enable DWG and DRG during ALPC<br>Bit 3: Disable Error Correction<br>Bit 2: Enable Erasure Pointer Generation<br>Bit 1: Force RLLOUT High During DWG (Erase)<br>Bit 0: Read Continuously |
| 13H | R/W | Sectors Per Track<br>Bit 7-6: INT1-0 Polarity<br>Bit 5-0: Sectors Per Track |
| 14H | R/W | ID Target Sector<br>Bit 7-6: ID Field Identifier<br>Bit 5-0: ID Target Sector |
| 15H | R/W | ID Target Track LSB<br>Bit 7-0: ID Target Track LSB |
| 16H | R/W | ID Target Track MSB<br>Bit 7-0: ID Target Track MSB |

CL-SM330
Optical Disk ENDEC/ECC

3.7 Register and Bit Table *(cont.)*

| ADDRESS | TYPE | DESCRIPTION/FUNCTION |
|---|---|---|
| 17H | R/W | ID Compare Sector<br>Bit 7-6: Reserved<br>Bit 5-0: ID Compare Sector |
| 18H | R/W | ID Compare Track LSB |
| 19H | R/W | ID Compare Track MSB |
| 1AH | R/W | Sector Transfer Count |
| 1BH | R | Sector Correction Count |
| 1CH, 57H | R/W | Data Buffer Address Low |
| 1DH, 58H | R/W | Data Buffer Address Middle |
| 1EH, 59H | R/W | Data Buffer Address High<br>Bit 7: Data Transfer Active (read only)<br>Bit 6: Reserved<br>Bit 5-0: Data Buffer Address High |
| 1FH | R | Revision Number |
| 20H | R/W | Interrupt Enable Register<br>Bit 7: Enable Media Error Interrupts<br>Bit 6: Enable ECC Error Interrupts<br>Bit 5: Enable General-Purpose Int 1<br>Bit 4: Enable General-Purpose Int 0<br>Bit 3: Enable DINT* Pass-Through<br>Bit 2: Enable ID Compare Register Found Int<br>Bit 1: Enable Sector Transfer Count=0 Int<br>Bit 0: Enable Operation Complete Int |
| 21H | R/W | Media Error Enable Register<br>Bit 7: Enable R/W Attempted After PSM Int<br>Bit 6: Enable Sector Mark Selected Outside Window Int<br>Bit 5: Enable ID Error Int<br>Bit 4: Enable Recovered Data Sync Error Int<br>Bit 3: Enable Fatal Data Sync Error Int<br>Bit 2: Enable Resync Mark Threshold Error Int<br>Bit 1: Enable Operation Attempted After Flag Detected Int<br>Bit 0: Enable Operation Complete |

CL-SM330
*Optical Disk ENDEC/ECC*

3.7 Register and Bit Table *(cont.)*

| ADDRESS | TYPE | DESCRIPTION/FUNCTION |
|---|---|---|
| 22H | R/W | Interrupt Status Register<br>Bit 7: Media Error Pending<br>Bit 6: ECC Error Pending<br>Bit 5: General-Purpose Int 1 Asserted (read only if disabled)<br>Bit 4: General-Purpose Int 0 Asserted (read only if disabled)<br>Bit 3: DINT* Asserted<br>Bit 2: ID Compare Register Found<br>Bit 1: Sector Transfer Count=0<br>Bit 0: Operation Complete |
| 23H | R/W | Media Error Status Register<br>Bit 7: Pseudo Sector Mark Generated<br>Bit 6: Sector Mark Detected Outside Window<br>Bit 5: ID Error<br>Bit 4: Recovered Data Sync Error<br>Bit 3: Fatal Data Sync Error<br>Bit 2: Resync Mark Error Threshold Exceeded<br>Bit 1: Written Flag Field Detected<br>Bit 0: Error Correction Complete/Blank Error Detected |
| 24H | R/W | Sector Mark Control<br>Bit 7-6: Sector Mark, ID Read Gate, ID AM, and Data Sync Window Position<br>Bit 5-3: Sector Mark-Mark Threshold (0-5)<br>Bit 2-0: Sector Mark-Space Threshold (0-4) |
| 25H | R/W | Resync Mark Control<br>Bit 7: Enable False Resync Protection<br>Bit 6: False Resync Protection Mode<br>Bit 5-4: Resync Mark Skip Count (0-3)<br>Bit 3-0: Resync Mark Error Threshold (0-15) |
| 26H | R/W | ID Field/Data Sync Control<br>Bit 7: Enable Modified ID Read Gate<br>Bit 6: Disable Track Autoincrement<br>Bit 5-4: ID Voting Threshold (0-3)<br>Bit 3-0: Data Sync Mark Threshold (0-12) |
| 27H | R | ID Error Status<br>Bit 7: ID Threshold Error<br>Bit 6: ID Greater Than Target<br>Bit 5-3: CRC Error Detected For ID 3-1<br>Bit 2-0: ID AM Not Detected For ID 3-1 |

CL-SM330
Optical Disk ENDEC/ECC

3.7 Register and Bit Table (cont.)

| ADDRESS | TYPE | DESCRIPTION/FUNCTION |
|---|---|---|
| 28H | R/W | Window Control Register<br>Bit 7: Disable Pre-Format Window<br>Bit 6: Disable Sector Mark Window<br>Bit 5: Disable ID AM Window<br>Bit 4: Disable Data Sync Window<br>Bit 3-2: Resync Mark Window Control<br>Bit 1-0: ID Skip Control |
| 29H | R/W | TOF Window Control<br>Bit 7-4: TOF Window Delay<br>Bit 3-0: TOF Window Length |
| 2AH | R/W | Sector Mark/ALPC Length<br>Bit 7: Enable Relaxed Sector Mark Detection<br>Bit 6: Enable Sector Mark Asymmetry Compensation<br>Bit 5: Shorten/Lengthen Sector Marks (if Bit 6 is set)<br>Bit 4-0: ALPC Window Length |
| 2BH | R/W | LFLD Control/ALPC Delay<br>Bit 7: Loss-Of-Frequency-Lock Detected (read only)<br>Bit 6: LFLD Polarity Select<br>Bit 5: Internal/LFLD Input Select<br>Bit 4-0: ALPC Window Delay |
| 2CH | R/W | PLL Polarity/Lock Control<br>Bit 7: PLLIS Polarity Select<br>Bit 6: PLLMS Polarity Select<br>Bit 5: PLLGS Polarity Select<br>Bit 4: PLLMS Lock Delay Enable<br>Bit 3-0: PLL Lock Delay Count |
| 2DH | R/W | PLL Relock Control<br>Bit 7-4: PLL Relock Time Count<br>Bit 3-0: PLL Relock Delay Count |
| 2EH | R/W | LFLD Window Control<br>Bit 7-4: Internal Loss-of-Frequency-Lock Window Count<br>Bit 3-0: Internal Loss-of-Frequency-Lock Tolerance Count |

CL-SM330
*Optical Disk ENDEC/ECC*

3.7 Register and Bit Table *(cont.)*

| ADDRESS | TYPE | DESCRIPTION/FUNCTION |
|---|---|---|
| 30H | R | Error Correction Status <br> Bit 7: Uncorrectable Error Detected by ECC <br> Bit 6: Uncorrectable Error Detected by CRC <br> Bit 5: Error Exceeding Threshold Detected <br> Bit 4: ECC Correction Time Overrun Occurred <br> Bit 3: CL-SM330 Hardware Error Detected <br> Bit 2: VREADY/VERROR Signal Error <br> Bit 1: NRZ CRC Checksum Error <br> Bit 0: Operational Overrun Error |
| 31H | R/W | Error Corrector RAM Address |
| 32H | R/W | Error Corrector RAM Data |
| RAM Addr 00H | | Sector Correction Threshold <br> Bit 7: Reserved <br> Bit 6-0: Maximum Errors/Sector Allowed (0-40 or 0-80) |
| RAM Addr 01H | | Interleave Correction Threshold <br> Bit 7-4: Reserved <br> Bit 3-0: Maximum Errors/Interleave Allowed (0-8) |
| RAM Addr 38H | | Total Sector Error Status <br> Bit 7: Reserved <br> Bit 6-0: Maximum Errors/Sector Detected (0-40, or 0-80) |
| RAM Addr 39H | | Interleave Error Status <br> Bit 7-6: Bits will be set if an uncorrectable ECC error was detected. <br> Bit 5-4: Reserved <br> Bit 3-0: Maximum Errors/Interleave Detected (0-7) |
| 34H | R/W | Vendor Unique Byte 1 |
| 35H | R/W | Vendor Unique Byte 2 |
| 36H | R/W | Vendor Unique Byte 3 |
| 37H | R/W | Vendor Unique Byte 4 |
| 38H | R | General-Purpose Input |
| 39H | R/W | General-Purpose Output |
| 2FH, 33H, 3AH-3DH | | Reserved <br> Reserved |
| 3EH | W | Set Sector Mark Window |

CL-SM330
Optical Disk ENDEC/ECC
3.7 Register and Bit Table (cont.)
| ADDRESS | TYPE | DESCRIPTION/FUNCTION |
|---------|------|----------------------|
| 3FH | R/W | Test Register<br>Bit 7: Reserved<br>Bit 6: Disable DWG<br>Bit 5: Enable Short Sector Test Mode<br>Bit 4: Enable ECC Diagnostic Mode<br>Bit 3-0: Test Mode Bits 3-0 |

CL-SM330
*Optical Disk ENDEC/ECC*

4. FUNCTIONAL DESCRIPTION

The operation of the CL-SM330 is divided into several major functions:

- (2,7) RLL Encoding and Decoding
- Mark Generation and Detection
- ECC Redundancy and Remainder Generation
- Error Correction An overview of the interaction of these functions during Read Sector, Write Sector, Read ID, Search ID, and Blank Sector operations is given below, followed by more detailed description of individual functions.

4.1 Read Sector Operation

At initialization, the microcontroller programs the Writable Control Store of the CL-SM331 and configures the CL-SM330, including the medium size, medium type, and sector size to be employed. The physical track and sector address of the first sector to be read is written to the ID Target registers. The address in the data buffer, where the CL-SM331 will store the first byte of the first sector, is written to the Data Buffer Address registers. When the optical head has been positioned, the microcontroller initiates the Read Sector Operation by writing the Format Sequencer Start Address Register of the CL-SM331 and writing the number of sectors to be read to the Sector Transfer Count Register of the CL-SM330.

The CL-SM331 begins waiting for the CL-SM330 to assert the SMDET Signal. When the CL-SM330 detects a Sector Mark or generates a Pseudo Sector Mark, it asserts SMDET. If a Sector Mark was detected, the CL-SM330 also asserts TSMDET. If a Pseudo Sector Mark was generated, the CL-SM330 also sets the Pseudo Sector Mark Generated Bit. The CL-SM331 begins waiting for assertion of IDF Output of the CL-SM330, within a programmable time-out window. The CL-SM330 asserts DRG and begins reading the ID fields, verifying their contents using the ID CRC check, and comparing them to the ID Target registers. If the value in the ID Target registers is not matched, or if the ID Voting Threshold is not met, the CL-SM330 will not assert IDF and the CL-SM331 will time out and return to wait for the next assertion of SMDET. If the values in the ID Target registers are not matched within two disk revolutions, or if the values in the ID Target registers are matched, but the ID Voting Threshold is not met, or if the values in the ID Target registers are exceeded, the CL-SM330 will halt the Read Sector Operation, set the ID Error and Operation Complete bits, and optionally generate a microcontroller interrupt. Otherwise, it will wait for the Sector Mark of the next sector and repeat the ID Field validation process. If none of the ID fields of a sector are error-free, the sector may be recovered by executing a Read ID Operation for a preceding sector to establish orientation, then setting the ID Voting Threshold to zero, and executing a single-sector Read Sector Operation for the desired sector.

If the value in the ID Target registers is matched and the ID Voting Threshold is met, the target sector has been located. If the Sector Mark was not detected, the CL-SM330 sets the Pseudo Sector Mark Generated Bit; if the Enable R/W Attempted After PSM Int Bit is set, the CL-SM330 halts the Read Sector Operation, sets the Operation Complete Bit, and generates a microcontroller interrupt. Otherwise, the CL-SM330 asserts IDF nominally two bytes after the last ID CRC Bit. The CL-SM331 then begins searching for a 'Valid Data Sync' Byte (hex '0D') on the NRZ line.

The CL-SM330 deasserts DRG and the CL-SM331 waits until the beginning of the Data Field VFO Area before it asserts SRG and begins searching for a 'Valid Data Sync' Byte (hex '0D') on the NRZ line. The CL-SM330 asserts DRG and attempts to detect the Data Sync Mark under its window. If the Data Sync Mark Threshold is met under the Data Sync Mark Window, the CL-SM330 transfers a 'Valid Data Sync' Byte (hex '0D') over the NRZ line to synchronize the NRZ data stream to the CL-SM331. The CL-SM330 then begins decoding the RLL-encoded data and

CL-SM330
*Optical Disk ENDEC/ECC*

serially transferring the decoded NRZ data to the CL-SM331, that de-serializes the NRZ data stream and writes it to the data buffer.

If the Data Sync Mark Threshold is not met under the Data Sync Mark Window, the CL-SM330 attempts to synchronize using the first Resync Mark. It transfers a 'Valid Data Sync' Byte (hex '0D') over the NRZ line to synchronize the NRZ data stream to the CL-SM331, and transfers the appropriate number of dummy data bytes. If the CL-SM330 detects the first Resync Mark under a widened window, it sets the Recovered Data Sync Error Bit, synchronizes the NRZ data stream, continues the Read Sector Operation, and optionally generates a microcontroller interrupt at the end of the sector. If the CL-SM330 cannot detect the first Resync Mark, it aborts the Read Sector Operation, sets the Fatal Data Sync Error Bit, and optionally generates a microcontroller interrupt. The microcontroller may then use the Skip Data Sync Mark Mode in attempt to recover the sector.

When the data transfer begins, the CL-SM330 decrements the Sector Transfer Count. If the Sector Transfer Count is then zero, the CL-SM330 sets the Sector Transfer Count=0 Bit, and optionally generates a microcontroller interrupt. If the microcontroller writes a non-zero value to the Sector Transfer Count Register before the end of the ECC transfer, another Read Sector Operation will begin without loss of disk orientation while correction is completed for the previous Read Sector Operation.

Resync Marks occur every 15 or 20 bytes, depending on the selected sector size. Each time the appropriate number of user data or redundancy bytes have been transferred, the CL-SM330 attempts to find a Resync Mark under its window. If a Resync Mark is detected in the proper position, the CL-SM330 removes the Resync Mark from the data stream by pausing RRCLK, then continues to decode the RLL data and transfer NRZ data to the CL-SM331.

If a Resync Mark is detected in the wrong position, the CL-SM330 reestablishes bit and byte synchronization and continues to decode and transfer data to the CL-SM331 while assuring the correct number of data bits are transferred. If a Resync Mark is not detected, the CL-SM330 continues to decode and transfer data as if a Resync Mark had been detected in the correct position; optionally, the window for the next Resync Mark is made wider and when a valid Resync Mark is detected, the CL-SM330 automatically switches back to the selected initial Resync Mark Window size. If the number of 'used' and 'missing' Resync Marks exceeds the programmed Resync Error Threshold, the CL-SM330 continues the Read Sector Operation and sets the Resync Error Threshold Exceeded Bit and optionally generates a microcontroller interrupt at the end of the sector.

The CL-SM330 decodes the ECC remainder bytes to generate error correction vectors, that the CL-SM331 uses to correct the bytes in error. If the CRC or ECC redundancy bytes read from the medium differ from those calculated for the data bytes read from the medium, an error has been detected. When all redundancy bytes have been read, the CL-SM330 latches the Sector Transfer Count Register into the Sector Correction Count Register; if the Sector Transfer Count Register has decremented to zero, then zero will be loaded into the Sector Correction Count Register at the appropriate time, regardless of whether or not the microcontroller has already written a new transfer count. If an error has been detected, the CL-SM330 begins calculating the locations and patterns of errors while the header and data fields of the next sector, if any, are read. Unless inhibited by setting the Suppress Correction Vectors Bit, the addresses and patterns of errors in data are transferred serially via the VECTOR line to the CL-SM331, that is responsible for correcting the data in the data buffer. When the CL-SM331 is able to accept another error correction vector, it asserts the VREADY Signal. If the CL-SM331 is not able to correct the data byte due to a buffer RAM parity error or some other unforeseen circumstance, it asserts the VERROR Signal. The CL-SM330

stores the CRC residue bytes internally and adjusts them as necessary to account for errors detected in the data and VU/PTR bytes.

After correction is complete, or no error is detected in a sector, the CL-SM330 sets the Error Correction Complete Bit, posts the error correction status and updates the Data Buffer Address registers. If the Enable Error Correction Complete Int Bit is set, a microcontroller interrupt is generated. If any of the status bits in the ECC Error Status Register has been set and the Enable ECC Error Int Bit is set, the CL-SM330 aborts the Read Sector Operation and generates a microcontroller interrupt. If the Sector Correction Count Register went to zero, the CL-SM330 sets the Operation Complete Bit, and if the Enable Operation Complete Int Bit is set, it generates a microcontroller interrupt. Otherwise, the CL-SM330 will begin to correct the next sector, if necessary, as soon as it has been read.

4.2 Write Sector Operation

The configuration, start, Sector Mark, and ID validation processes for a Write Sector Operation are performed in a manner similar to that for a Read Sector Operation.

After locating the target sector, the CL-SM330 asserts IDF at the end of the third ID Field and deasserts DRG. The CL-SM331 waits until the beginning of the Data Field VFO Area before it asserts SWG and transfers 11 bytes of all '1's data followed by one byte of all '0's data over the NRZ line, followed by the three bytes of the NRZ representation of the Data Sync Mark. The CL-SM330 asserts DWG and synthesizes and writes the 12-byte VFO pattern, then encodes and writes the Data Sync Mark. The CL-SM331 then fetches user data from the data buffer and serially transfers it over the NRZ line to the CL-SM330, that encodes and writes it, following the encoded Data Sync Mark.

When data transfer begins, the CL-SM330 decrements the Sector Transfer Count. If the Sector Transfer Count is zero, the CL-SM330 sets the Sector Transfer Count=0 Bit and optionally generates a microcontroller interrupt. If the microcontroller writes a non-zero value to the Sector Transfer Count Register before the end of the ECC transfer, another Write Sector Operation will begin without loss of disk orientation.

Resync Marks occur every 15 or 20 bytes, depending on the selected sector size. Each time the appropriate number of data bytes has been written, the CL-SM330 pauses RRCLK for eight periods, writes the Resync Mark pattern, and continues to transfer, encode, and write the NRZ data from the CL-SM331.

As the CL-SM330 encodes and writes user data and Vendor Unique/Pointer (VU/PTR) bytes, it generates the CRC and ECC redundancy bytes. The CL-SM330 will encode the CRC and ECC redundancy bytes and write them to the disk following the user data and VU/PTR bytes. One or more bytes of padding, as determined by the programming of the Writable Control Store of the CL-SM331, are written after the last ECC Byte. The first byte of padding is written using the Resync Mark Pattern.

4.3 Read ID Operation

The Read ID Operation is provided to allow the microcontroller to determine the current position of the optical head. The microcontroller first selects the Read ID Mode, then writes any non-zero value to the Sector Transfer Count Register. The CL-SM330 reads the next error-free ID Field and stores it in the ID Target registers, sets the Operation Complete Bit, and optionally generates a microcontroller interrupt. If no error-free ID is read within two disk revolutions, the CL-SM330 will abort the Read ID Operation, set the ID Error Bit, and optionally generate a microcontroller interrupt.

CL-SM330
*Optical Disk ENDEC/ECC*

4.4 Search ID Operation

The Search ID Operation is provided to allow the microcontroller to automatically determine when the optical head is at a specified position; typically, the microcontroller will then execute a 'jump-back' sequence for the optical drive. If desired, the microcontroller first determines the current position of the optical head and positions it ahead of the sector for that the CL-SM330 is to search. The microcontroller then writes the ID Track and sector values of the sector for that the CL-SM330 is to search to the ID Compare registers and writes any non-zero value to the Sector Transfer Count Register. The CL-SM330 reads the next error-free ID Field into the ID Target registers. As each succeeding sector mark is encountered, the CL-SM330 increments the ID Target registers until the ID Target registers match or exceed the ID Compare registers. The CL-SM330 then asserts CMPF and sets the ID Compare Register Found Bit and optionally generates a microcontroller interrupt. If Enable ID Error is set and no error-free ID is read within two disk revolutions, the CL-SM330 will abort the Search ID Operation, set the ID Error and Operation Complete bits, and optionally generate a microcontroller interrupt. If Enable ID Error is not set, the ID Search Operation will not terminate due to not finding an ID within two revolutions. ID Search is never terminated due to not meeting the ID voting threshold or because of the ID being greater than the target.

After a 'jump-back' operation has been initiated, the CL-SM330 will continue the search/compare operation until the microcontroller halts the CL-SM330 by writing a '1' to the Operation Halt Bit (Register 10H, Bit 6), or an ID Error causes abnormal termination. After asserting CMPF, the CL-SM330 waits eight sector times before attempting to read an ID. It is advised that the drive complete its 'jump-back' within that eight sector time to avoid false ID detection.

4.5 Blank Sector Operations

The configuration, start, and Sector Mark and ID validation processes for a (Non) Blank Verify Operation are performed in the same manner as for a Read Sector Operation. Because no data is transferred to the buffer, the CL-SM331 is not involved in (Non) Blank Verify operations. The (Non) Blank Verify and Flag Detection features of the CL-SM330 are intended for use in WORM type application; the RAWIN Signal must be valid in the absence of DRG for these functions to work.

After locating the target sector, the CL-SM330 asserts IDF at the end of the third ID Field and deasserts DRG. Blank sectors are detected by counting transitions on the RAWIN Signal line in the Data Field Area and comparing this count to a threshold. If the threshold is not exceeded, the sector is considered to be blank. If the threshold is exceeded, the sector is considered to be non-blank. If a non-blank sector is detected during a Blank Verify Operation or if a blank sector is detected during a Non-Blank Verify Operation, the CL-SM330 will abort the operation, set the Blank Sector Error Bit, and optionally generate a microcontroller interrupt.

The transition counter is designed to support both Pulse-Position and Pulse-Width modulation. If RAWIN is asserted for less than two REF2F clock periods, the counter will be incremented once for each pulse. If RAWIN is asserted for greater than 2 1/2 REF2F periods, the counter will be incremented twice for each pulse. The window used to count for transitions on the RAWIN Signal line are the first 64 NRZ bytes of the sector data field. A count of less than 63 transitions indicates a blank sector. A count of 63 transitions or more indicates a non-blank sector.

CL-SM330
Optical Disk ENDEC/ECC

4.6 RLL Encode/Decode Circuits

The (2,7) RLL encoder circuitry encodes the NRZ Data Bit stream into a run-length-limited code bit stream, in that each pair of '1's is separated by at least two '0's and by, at most, seven '0's.

The (2,7) RLL decoder is designed for minimum error propagation and to produce the most probable output data value when an invalid decode or run-length violation is detected. An optional mode is available in that run-length violations and invalid decodes, 'used' Resync Marks, and Loss-Of-Frequency-Lock are combined to generate erasure pointers for use by extended error-correction algorithms resident in the microcontroller firmware. The run-length violation detection taps are positioned for best erasure pointer accuracy.

4.7 Mark Detection

4.7.1 Sector Mark Detection

A Sector Mark is located at the beginning of each sector. The CL-SM330 and CL-SM331 use the Sector Mark to synchronize with the ID fields and Data fields on the medium.

The ANSI/ISO standards define a Sector Mark composed of long marks and spaces that are readily distinguishable in the RLL-encoded Bit stream. Furthermore, the Sector Mark is designed to be detectable without recourse to phase-locked circuitry. The CL-SM330 uses the reference clock to detect the Sector Mark in the RLL-encoded Bit stream.

The CL-SM330 Sector Mark Detection circuitry employs majority voting on the long marks and spaces with separate voting thresholds. When the number of long marks detected equals or exceeds the Sector Mark-Mark Threshold and the number of spaces detected equals or exceeds the Sector Mark-Space Threshold, the CL-SM330 asserts SMDET, an output to the CL-SM331. The Sector Mark Detection circuitry is designed to achieve a significant degree of tolerance to media defects and read-channel asymmetries. Both the long marks and spaces of the Sector Mark should be decoded; otherwise, overwritten sectors might trigger Sector Mark Detection.

The microcontroller can set the Sector Mark-Mark Detection Threshold to any value between zero and five inclusive, and the Sector Mark-Space Detection Threshold to any value between zero and four inclusive. Threshold values of three may provide adequate performance under normal conditions. Note that lower thresholds can increase the probability of false Sector Mark Detection. Error recovery algorithms should use the highest threshold that will permit the Sector Mark to be reliably detected. Optionally, relaxed Sector Mark Detection circuitry and/or a Dual-Mode Sector Mark asymmetry compensation circuit can be enabled.

To minimize the possibility of false detection, Sector Marks are detected under a window. The initial width of the Sector Mark Window is controlled by the selected maximum speed tolerance (0.5 or 1.0%). After a Sector Mark Reset, Sector Mark Windowing begins after the second detection of an un-windowed Sector Mark. Sector Mark Windowing can also be completely disabled by the microcontroller, that may be useful in sector size determination.

When a Sector Mark is not detected, a Pseudo Sector Mark is generated when the CL-SM330 expected to see the Sector Mark. Writing the Sector Mark Control Register causes the CL-SM330 to block the generation of Pseudo Sector Marks and inhibit Sector Mark windowing until after a Sector Mark is detected. The CL-SM330 can be programmed to abort Read Sector and Write Sector operations if the Sector Mark of a sector is not detected. This option supports the ANSI/ISO recommendation that a sector is not to be used if its Sector Mark is defective.

CL-SM330
*Optical Disk ENDEC/ECC*

4.7.2 ID Address Mark Detection

The detection of ID Address Marks establishes bit and byte synchronization for ID fields. ID Address Marks contain a (2,7) RLL code run-length violation, so they are detected in the RLL channel bit stream. Detection of ID Address Marks is windowed to minimize the probability of false detection.

It is possible for defects in the VFO Area to drive the PLL to a state from that it cannot recover in time to read subsequent ID fields. To aid in recovering from this situation, the CL-SM330 can be programmed to skip the first or first and second ID fields and attempt to acquire frequency and phase lock over the second or third VFO Area, or to skip all three ID fields. The CL-SM330 can be programmed to deassert DRG for one byte time after the last CRC Byte of the first and second ID fields.

4.7.3 Data Sync Mark Detection

The detection of the Data Sync Mark establishes initial bit and byte synchronization for the Data Field. The Data Sync Mark is detected in the RLL channel bit stream; this prevents error propagation by the (2,7) RLL decoder and allows maximum error tolerance. Detection of the Data Sync Mark is windowed to minimize the probability of false detection.

The CL-SM330 detects the Data Sync Mark by dividing the RLL channel bit into 12 four-bit groups and comparing them to the Data Sync Mark pattern. The Data Sync Mark is considered detected when the number of matching groups meets or exceeds the programmed threshold, that can range from 0-12. The recommended majority vote threshold for normal operation is nine; other values may be useful for retry. When the Data Sync Mark Threshold is met under the Data Sync Mark Window, the CL-SM330 sends a synthesized 'Valid Data Sync' Byte (hex '0D') over the NRZ line to the CL-SM331.

When the Data Sync Mark cannot be detected, one of two recovery modes may be used. In the first mode, the CL-SM330 will try to recover 'on-the-fly' by transferring the 'Valid Data Sync' Byte (hex '0D') and a number of dummy data bytes equal to the Resync Mark spacing. Synchronization is attempted on the first Resync Mark. The second mode is used on a separate revolution. The Data Sync Mark and up to three Resync Marks are ignored. After the 'Valid Data Sync' Byte (hex '0D') and the appropriate number of dummy data bytes have been transferred, synchronization is attempted on the next Resync Mark.

4.7.4 Resync Mark Detection

The detection of the Resync Mark is used to re-establish bit and byte synchronization in the Data Field following a loss of synchronization. The Resync Mark is detected in the RLL channel bit stream. Detection of the resync sync mark is windowed to minimize the probability of false detection. The number of data bytes between Resync Marks is established by the standard format selected.

The design of the resync detection circuit can accommodate a significant number of slipped cycles (plus or minus) and still successfully resynchronize. The initial Resync Mark Detection window can be selected as small or large. The Resync Mark can be programmed to be either fixed or progressive (i.e., when a Resync Mark is not detected, the Resync Mark Detection window is progressively enlarged, up to a maximum value, until a subsequent Resync Mark is detected).

The Resync Mark Error count is the number of times within a sector that a Resync Mark is not detected within its window, or is detected within its window and must be used to re-establish synchronization (i.e., the number of PLL data clocks that have been counted since the previous Resync Mark does not equal the resync spacing). The Resync Error Threshold is useful for write verification

CL-SM330
*Optical Disk ENDEC/ECC* and provides part of the sync framing error protection.

4.8 Mark Generation

4.8.1 Data Sync Mark Generation

The Data Sync Mark is generated in the CL-SM331 and encoded by the CL-SM330. The Data Sync Mark pattern is represented in the encoded bit stream by the hex pattern '4 2 4 2 2 2 4 4 8 2 4 8', that is encoded from the hex pattern '89 EA CB' (supplied by the CL-SM331) in the NRZ data stream. Note that the pattern of the Data Sync Mark merges with the preceding VFO3 field without causing run-length violation, and that it ends with a codeword ending.

4.8.2 Resync Mark Generation

The Resync Mark is generated by the CL-SM330 every 15 or 20 bytes, depending on the selected sector size. It is represented in the encoded bit stream by the hex pattern '2 0 2 4'. The Resync Mark pattern is encoded using the rules of the (2,7) RLL code by encoding the hex pattern '72' and suppressing the eighth bit in the resulting code bit stream. Note that the pattern of the Resync Mark does not change based on the preceding data, it merges with any preceding data pattern without causing run-length violation or incorrect decoding, and it ends with a codeword ending.

4.9 Timing Strategy and Window Generation

All windowing is generated from the reference clock and is as tight as the specified timing accuracy and known orientation permits.

4.9.1 Timing Strategy

- Reference initial timing for a sector to the last detected Sector Mark.
- Refine timing if the Sector Mark for the current sector is detected.
- Refine timing each time an error-free ID Field is detected.
- Data Sync Mark Detection refines timing for the first Resync Mark Window, but does not influence timing for the next sector except under exceptional conditions.
- Resync Mark Detection refines timing for the following Resync Mark Window, but does not influence timing for the next sector.
- The most timing uncertainty exists for detecting the Data Sync Mark when the Sector Mark is not detected and all three ID fields are defective. In this case, timing is referenced to the expected position of the Sector Mark of the sector, and the Data Sync Mark Detection window is widened enough to account for the timing error accumulated over a full sector time plus header time, resulting from spindle speed variation, eccentricity, and mechanism oscillation. If in these circumstances the Data Sync Mark is also not detected or is being skipped, then a wider detection window is used for detection of the Resync Mark being used for initial bit and byte synchronization.

4.9.2 Sector Mark Windowing

The length of the Sector Mark Window is determined by the medium size, sector size, and speed tolerance selected. If a Sector Mark is not detected in its window, a Pseudo Sector Mark is generated. The Sector Mark Detection window is progressively widened, but not shifted from the expected position, until a Sector Mark is detected or an ID with good CRC is read or until two consecutive Pseudo Sector Marks have been generated. At that time, a valid Data Sync Mark will be allowed to modify the window timing.

Writing the Sector Mark Control Register will disable Sector Mark Windowing and Pseudo Sector Mark generation until after a true Sector Mark is detected. This is useful following power-up, drive selection, seeking, or other break in orientation. The microcontroller can disable the Sector Mark Window by writing a '1' to the Disable Sector Mark

CL-SM330
*Optical Disk ENDEC/ECC*

Window Bit, in that case the Sector Mark Detection circuitry is continuously active, this may be useful during Search ID operations.

4.9.3 ID AM Windowing

The ID AM Windows are normally as tight as possible. When a Pseudo Sector Mark is generated, the ID Address Mark Window is widened to account for the timing uncertainty accumulated since the last detection of a Sector Mark. The microcontroller can disable the ID AM Windows by writing a '1' to the Disable ID AM Window Bit, in that case the ID AM Detection circuitry is continuously active in the Pre-Formatted Area. This is not intended for normal use.

4.9.4 Data Sync Windowing

The initial timing for the Data Sync Mark Detection window is established by detection of the Sector Mark and refined by detection of each error-free ID. Data Sync Mark Window timing is tightly controlled so that a lower detection threshold can be used for retry without incurring excessive risk of false Data Sync Mark Detection. The microcontroller can disable the Data Sync Window by writing a '1' to the Disable Data Sync Window Bit, in that case the Data Sync Mark Detection circuitry is continuously active in the Data Area until a Data Sync Mark is detected. This is not intended for normal use.

4.9.5 Resync Mark Windowing

The timing for the Resync Mark Detection window is initially established by detection of the Data Sync Mark, and is refined by detection of each successive Resync Mark. Resync Mark Windows must be tightly controlled to prevent false Resync Mark Detection.

If progressive Resync Mark Windows are enabled, Resync Mark Window width is increased each time a Resync Mark is not detected, up to a maximum value. When a subsequent Resync Mark is detected, the Resync Mark Window width is reset to the selected minimum value. If the Skip Data Sync Mark Mode is selected, Resync Mark Window Width is increased for initial Resync Mark Detection.

4.9.6 Pre-Format Window

The PREFMT Signal is asserted during the Pre-Format Window, that begins shortly before the predicted position of the Sector Mark as determined by counting reference clocks from the point of detection of the preceding Sector Mark. The Pre-Format Window ends at the Offset Detection Flag, 47 bytes after the Sector Mark. When the Sector Mark Control Register is written, PREFMT is held asserted until a Sector Mark is detected.

4.9.7 TOF Window

The TOF Window begins at a programmable delay from a point 12 bits before the Offset Detection Flag, that is 47 bytes after the Sector Mark. The length of the TOF window is programmable. The TOFWIN Signal is not asserted unless a Sector Mark is detected, or either ID1 or ID2 is error free.

4.9.8 ALPC Window

The ALPC Window begins at a programmable delay before the start of the Data Field VFO (VFO3). The length and position of the ALPC window is programmable. The ALPCWIN is not asserted unless a Sector Mark is detected or at least one error-free ID is read, and the sector is to be written or the Enable ALPC on reads bit is set. Read or Write Gate may optionally be asserted during the ALPC window.

4.10 Data Synchronization Functions

The CL-SM330 incorporates circuitry for controlling the optical disk drive PLL and for detecting and recovering from defects that drive the PLL Out-Of-Frequency-Lock. The CL-SM330 uses the following five signals to control the data synchronization circuitry in the optical disk drive:

CL-SM330
Optical Disk ENDEC/ECC

| | | | |
|---|---|---|---|
| DRG | - Device Read Gate | PLLIS | - Phase Locked Loop Input Select |
| PLLMS | - Phase Locked Loop Mode Select | PLLGS | - Phase Locked Loop Gain Select |
| LFLD | - Loss-of-Frequency-Lock Detect | | |

The two data synchronization operations controlled by the CL-SM330 are initial PLL synchronization and Loss-Of-Frequency-Lock recovery.

When entering a VFO field to acquire initial Frequency and Phase Lock, DRG and PLLIS are asserted to achieve initial frequency lock over the VFO Area using Data Input, Phase-Frequency Detection, and high gain. After a programmable Lock Delay, PLLGS and PLLMS are asserted to achieve Phase Lock using Data Input, Phase-Only Detection, and low gain. Optionally, PLLMS may be programmed to follow DRG during initial PLL synchronization.

If the CL-SM330 detects a PLL Out-Of-Frequency-Lock condition while reading a Data Field, it can be programmed to manipulate the PLL Control signals to rapidly reacquire frequency and Phase Lock. While holding DRG asserted, PLLIS, PLLMS, and PLLGS are all deasserted to reacquire frequency lock using reference clock input, Phase-Frequency Detection, and high gain. After a programmable Relock Time, PLLIS and PLLMS are asserted to achieve Phase Lock using Data Input, Phase-Only Detection, and high gain. After a programmable Relock Delay, PLLGS is reasserted to return to normal PLL Operation.

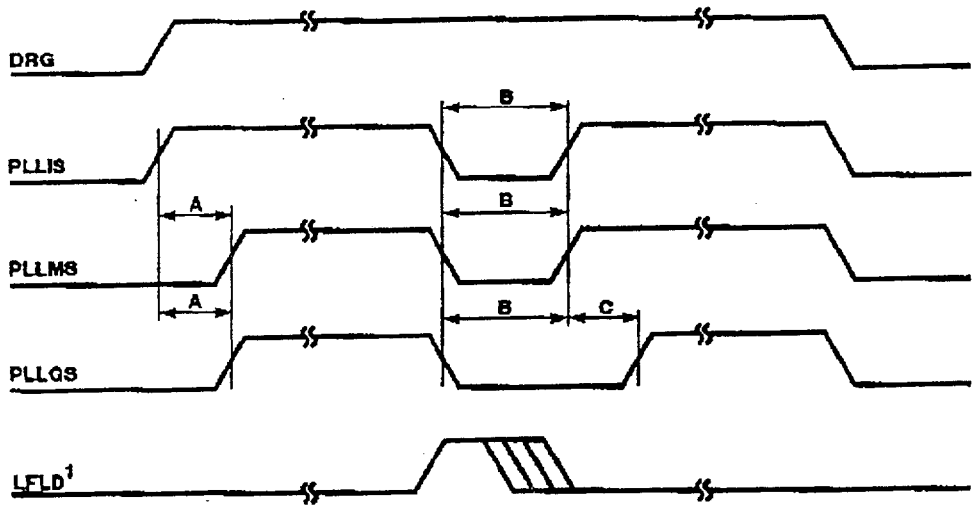

NOTE 1:
If the Internal/LFLD Input Select Bit in the Loss-of-Frequency-Lock Control Register is set, the external LFLD Signal is used. If this bit is reset, the internal Loss-Of-Frequency-Lock detection circuitry is used.

| Initial PLL Synchronization | Loss-Of-Frequency-Lock Recovery |
|---|---|
| A = LOCK DELAY | B = RELOCK TIME |
| | C = RELOCK DELAY |
| | B + C = LOCK RECOVERY TIME |

CL-SM330
*Optical Disk ENDEC/ECC*

4.10.1 Operation Of DRG

The CL-SM330 asserts DRG (Device Read Gate) in two major media areas: the Pre-Format Area and the Data Area. DRG is sourced both internally, depending on the configuration of the CL-SM330, and externally by assertion of SRG from the CL-SM331. These two sources are OR'ed together to form the DRG Signal to the drive.

Generally, the CL-SM331 controls DRG via SRG in the Data field, while the CL-SM330 controls DRG during Pre-Format and ALPC Window.

During Pre-Format, DRG is asserted at the beginning of the VFO field for the first ID to be read. It is normally deasserted after the end of the post amble byte following the last ID field. If Enable Modified ID Read Gate is set (Register 26H, Bit 7), DRG will pulse low for one NRZ Byte time at the beginning of the VFO fields following ID1 and ID2.

If any ID is skipped, DRG will not be asserted during these fields. If all ID fields are skipped, DRG is not asserted during the Pre-Format Area.

If Enable, DRG and DWG during ALPC window is set (Register 12H, Bit 4), and Enable ALPC on reads (Register 12H, Bit 5), then DRG will be asserted during the ALPC window. If the ALPC window length and delay are configured such that the window does not extend until the CL-SM331 asserts SRG, then DRG will be deasserted before being reasserted due to SRG.

The timing of DRG during the Data Field is completely determined by the Writable Control Store of the CL-SM331.

4.10.2 Operation Of PLLIS

PLLIS (Phase Locked Loop Input Select) tells the PLL whether to attempt to synchronize with the reference clock or with the RLL-encoded data stream. After acquiring initial Frequency and Phase Lock while the drive is reading, the PLL must lock to the RLL-encoded data stream unless the CL-SM330 is attempting to recover from a Loss-Of-Frequency-Lock condition. While the drive is writing or idling, the PLL must lock to the reference clock so that the VFO will be very close to the correct frequency when the next read operation begins.

The action of PLLIS is identical to that of DRG except while the CL-SM330 is attempting to recover from a Loss-Of-Frequency-Lock condition.

4.10.3 Operation of PLLMS

PLLMS (Phase Locked Loop Mode Select) tells the PLL whether to operate in Phase-Frequency Mode or Phase-Only Mode. While the PLL is attempting to synchronize with the reference clock, the phase detector operates in Phase-Frequency Mode to eliminate the possibility of subharmonic false lock. While the PLL is attempting to synchronize with the RLL-encoded data coming from the drive, the phase detector operates in Phase-Only Mode, because random data has no fundamental frequency.

While the PLL is in the process of locking to a VFO sync field, the phase detector can operate in either Phase-Frequency Mode or Phase-Only Mode. The microcontroller can program PLLMS to remain in Phase-Frequency Mode for a programmable period following the leading edge of DRG by writing a '1' to the PLLMS Lock Delay Enable Bit and a non-zero value to the PLL Lock Delay Count in the PLL Polarity Select/PLL Lock Delay Register. The value in the register represents the delay time in units of NRZ nibbles. This delay function is disabled by writing a '0' to either or both of the PLLMS Lock Delay Enable Bit and the PLL Lock Delay Count.

4.10.4 Operation of PLLGS

PLLGS (Phase Locked Loop Gains Select) tells the PLL whether to operate high or low gain. In a typical application, this alters the amount of current delivered by the phase detector charge pumps. Low gain is used to 'flywheel' through ran-

dom data. High Gain is used when the PLL is locked to the reference clock.

While the PLL is in the process of locking to a VFO sync field, the phase detector typically operates in High Gain Mode. The microcontroller can program PLLGS to remain in high gain for a programmable period following the leading edge of DRG by writing a non-zero value to the PLL Lock Delay Count in the PLL Polarity Select/PLL Lock Delay Register. This value represents the delay time in units of NRZ nibbles. This function is disabled by writing a '0' to the PLL Lock Delay Count.

4.10.5 Loss-Of-Frequency-Lock Recovery

Very long defects can disrupt the operation of the synchronization circuitry. If the CL-SM330 determines that the VFO has lost frequency synchronization with the RLL-encoded data stream, it can initiate a Loss-Of-Frequency-Lock Recovery Operation. The microcontroller enables this function by writing a non-zero value to the PLL Relock Time Count in the Relock Control Register. This value represents the length of the resynchronization period in units of 2F clock cycles. The Loss-Of-Frequency-Lock recovery function is disabled by writing a '0' to the PLL Relock Time Count.

To recover from a Loss-Of-Frequency-Lock condition, the CL-SM330 uses the PLLIS Signal to switch the input of the phase detector to the reference clock. At the same time, it uses the PLLMS Signal to place the phase detector in Phase-Frequency Mode (to recover from subharmonic false lock, if necessary), and it uses the PLLGS Signal to place the phase detector in High Gain Mode. After a period of time determined by the PLL Relock Time Count in the Relock Control Register, the CL-SM330 will switch the input of the phase detector back to the RLL-encoded data stream and simultaneously switch the phase detector into Phase-Only Mode. The CL-SM330 will leave the phase detector in high gain for a period of time determined by the PLL Relock Delay Count in the Relock Control Register. This value represents the delay time in units of 2F clock cycles. Relock delay is disabled by writing a '0' to the PLL Relock Delay Count.

4.10.6 Internal Loss-of-Frequency-Lock Detection

When internal Loss-Of-Frequency-Lock detection is enabled by writing a '0' to the Internal/LFLD Input Select Bit in the LFLD Control/ALPC Window Length Register, the CL-SM330 detects the Loss-Of-Frequency-Lock condition by comparing the number of PLL clocks that occur within a programmable period to the number of 2F clocks that occur within that period. The length of the comparison period, in increments of 16 2F clock periods, is determined by the value written to the Internal Loss-Of-Frequency-Lock Window Count field in the Internal Loss-Of-Frequency-Lock Control Register.

If the absolute difference between the number of 2F clocks that comprise the comparison period and the number of RLL clocks that occur within the comparison period exceeds the value written to the Internal Loss-of-Frequency-Lock Tolerance Count in the Internal Loss-Of-Frequency-Lock Control Register, the CL-SM330 will initiate a Loss-Of-Frequency-Lock Recovery Operation, provided that the PLL Relock Time Count in the Relock Time Register is non-zero.

4.10.7 External Loss-of-Frequency-Lock Detection

The drives that provide external Loss-Of-Frequency-Lock circuitry can use the CL-SM330 Loss-Of-Frequency-Lock recovery operation by writing a '1' to the Internal/LFLD Input Select Bit of the Loss-Of-Frequency-Lock Control Register. When this bit is set, the Loss-Of-Frequency-Lock Recovery Operation is initiated by an active signal on LFLD (Pin 85), provided that the PLL Relock Time Count in the Relock Time Register is non-zero. For proper operation, the LFLD Signal must remain asserted for at least two 2F clock periods. If LFLD remains asserted after the Loss-Of-Fre-

CL-SM330
*Optical Disk ENDEC/ECC*

quency-Lock Recovery Sequence is completed, another such sequence will begin.

4.11 ID Functions

4.11.1 ID CRC Functions

The ID CRC uses the standard CRC-CCITT polynomial, $$x^{16} + x^{12} + x^5 + 1$$

and shift-register seed of all ones. ID CRC redundancy is not inverted on the medium. The ID Address Mark is not included in the ID CRC redundancy calculation. ID CRC error is detected by any mis-comparison between the redundancy read from the medium and the redundancy calculated for the track and sector bytes read from the medium.

4.11.2 ID Voting Functions

The track and sector bytes of each ID Field that passes the ID CRC check must satisfy byte-for-byte comparison with the target ID (after adjusting for the ID number field in the sector byte). If the number of valid and matching ID fields satisfies the programmed ID Voting Threshold, IDF is asserted at the end of the third ID Field. If the ID Voting Threshold is not satisfied, error information is posted to the ID Error Status Register, and optionally an interrupt is generated to the microcontroller. To aid in recovery from defects in the VFO Area, retry modes are available in that the first ID or both the first and second ID fields are skipped and recovery of the remaining ID(s) is attempted, or all three ID fields may be skipped.

The CL-SM330 automatically increments the target sector number, rolling over to zero when the sector number exceeds the programmed number of sectors per track, at the end of each sector during an operation and also increments the target track number when the sector number rolls over to zero. The latter feature can be disabled if a non-standard, concentrically formatted medium is to be used.

To simplify the task of seek verification, the Read ID operating mode of the CL-SM330 can be used to read an error-free ID Field of a sector without the supervision or intervention of the CL-SM331.

4.12 Flag Field Functions

4.12.1 Flag Field Detection

For WORM media, the Flag Field can be used to prevent overwriting of already-written sectors during normal Read, Write and Blank Sector operations. The CL-SM330 counts transitions on the RAWIN Signal under a nominal five-byte long Flag Field Detection window. When the number of transitions exceeds a threshold of 12 transitions, the Written Flag Field Detected Bit is set. If this occurs during a Write Sector Operation for that the Enable Write Attempted After Flag Detected Int Bit is set, DWG is held deasserted, the operation is aborted, and a microcontroller interrupt is generated.

The transition counter is designed to support both Pulse-Position and Pulse-Width modulation. If RAWIN is asserted for less than two REF2F clock periods, the counter will be incremented once for each pulse. If RAWIN is asserted for greater than 2 1/2 REF2F periods, the counter will be incremented twice for each pulse.

4.12.2 Flag Field Generation

For WORM media, the CL-SM330 can be programmed to write the Flag Field without requiring the supervision or intervention of the CL-SM331. When Flag Field generation is enabled by selecting Operation Mode 100 or 101, after the header of the target sector is read and meets the ID Voting Threshold, the CL-SM330 asserts DWG and writes the five-byte Flag Field pattern in the Flag Field Area, transparent to the CL-SM331. The following Data Field is read or written in a normal fashion.

CL-SM330
*Optical Disk ENDEC/ECC*

The timing for the Flag Field is referenced to the last error-free ID of the current sector. The generation of a Pseudo Sector Mark does not interfere with timing for the Flag Field if the ID Voting Threshold is met.

4.13 Write Prerequisites

To achieve high data integrity, the following conditions can be required before DWG is asserted:

- Sector Mark Detection Thresholds met
- ID Voting Threshold met
- Flag Field not written
  (Intended for WORM applications only)

4.14 Erase Considerations

Erase operations are treated by the CL-SM331 and CL-SM330 in largely the same manner as write operations. The CL-SM331 should be programmed to assert SWG earlier and to deassert SWG later than during Write Sector operations in order to assure full medium erasure while accounting for spindle speed variation tolerance.

4.15 ECC Hardware Correction Functions

The ECC Hardware Correction function performs high-speed correction of errors and relieves the microcontroller of this task. Use of the ECC Hardware Correction function does not affect the correction or detection capabilities of the ANSI/ISO error-correcting and CRC codes in any way.

The ECC Hardware Correction circuitry is designed to complete the correction of any sector with up to four errors in each interleave before the last data byte of the next sector is read. If a sector has more than four errors in one or more interleaves, a Corrector Overrun may occur.

When the ECC Hardware Correction function is enabled, the CL-SM330 corrects each sector one interleave at a time. After the location and pattern of each byte in error is computed, an error-correction vector is transferred via a serial link to the CL-SM331, that corrects the data in the buffer. Each error-correction vector is protected by an eight-bit checksum.

4.16 Error Vector Transfer Protocol

Error correction information is sent to the CL-SM331 on the VECTOR Signal in a 42-bit packet using the following format. All information is sent MSB first.

| SYNC | ADDRESS | PATTERN | CHECKSUM |
|---|---|---|---|
| 1101 | A21 ... A0 | D7 ... D0 | C7 ... C0 |
| 4 Bits | 22 Bits | 8 Bits | 8 Bits |

SYNC PATTERN: The first four bits in the error vector packet consist of a fixed sync pattern (hex 'D').

ERROR ADDRESS: The error address comprises 22 bits defining the absolute address in the data buffer of the byte to be corrected.

ERROR PATTERN: The error pattern is the eight-bit value to be EXCLUSIVE-ORed to the byte at the error address.

CHECKSUM: The checksum is calculated over the sync pattern, error address, and error pattern using the eight-bit polynomial:

$$x^8 + x^7 + x^2 + 1$$

The checksum-generating shift register is initialized to all '1's.

The CL-SM331 deasserts VREADY when it has received and detected the sync pattern and reasserts it when the byte in the data buffer has been corrected. If VREADY remains asserted after the sync pattern has been transmitted, the CL-SM330 detects that a vector transmission synchronization error has occurred: the CL-SM331 did not receive or detect the sync pattern. The CL-SM330 will halt the Read Sector Operation and set the VREADY/VERROR Error Bit.

If the CL-SM331 detects a transfer protocol error after receiving the sync pattern (e.g., a checksum

CL-SM330
*Optical Disk ENDEC/ECC*

error), or it cannot correct the byte in error due to hardware failure (e.g., a buffer parity error), it will assert VERROR and not reassert VREADY. The CL-SM330 will halt the Read Sector Operation and set the VREADY/VERROR Error Bit.

4.17 NRZ CRC Checksum Protocol

All information transferred over the NRZ line is protected by an eight-bit CRC checksum.

During Read Sector operations, CRC checksum generation begins with and includes the 'Valid Data Sync' Byte (hex '0D'). The CL-SM330 transfers all user data bytes, VU/PTR bytes, and ECC/CRC redundancy bytes read from the device over the NRZ line and includes them in its NRZ CRC checksum calculation. The CL-SM331 must be programmed to calculate its NRZ checksum over the same bytes and compare it to that sent by the CL-SM330 at the end of the sector, but the CL-SM331 can be programmed to store in the data buffer the user data bytes only, the user data bytes plus VU/PTR bytes, or the user data bytes plus VU/PTR bytes plus CRC/ECC redundancy bytes, as desired. The CL-SM331 can be programmed to generate a microcontroller interrupt if the NRZ CRC checksum that it calculates differs from that it receives from the CL-SM330.

During Write Sector operations, CRC checksum generation begins with and includes the three-byte NRZ representation of the Data Sync Mark. The CL-SM331 transfers and includes in its NRZ CRC checksum calculation the 512 or 1024 user data bytes plus either the actual VU/PTR bytes and CRC/ECC redundancy bytes (for a write-long operation) or an equal number of dummy bytes (for a normal write operation) or a combination of both (for a write operation in which the VU/PTR bytes are transferred from the data buffer). The CL-SM330 calculates its NRZ CRC checksum over all bytes transferred, whether or not they are dummy bytes, and compares it to that sent by the CL-SM331 at the end of the sector. The CL-SM330 can be programmed to generate a micro-controller interrupt if the NRZ CRC checksum that it calculates differs from that it receives from the CL-SM331.

The NRZ CRC checksum is calculated using the same eight-bit polynomial as for the error-correction vector checksum:

$$x^8 + x^7 + x^2 + 1$$

The checksum-generating shift register is initialized to all '1's.

4.18 Erasure Pointers

When information about the likely locations of errors, called erasure pointers, is available, the correction power of the error-correcting code is increased. In many cases, a sector that contains errors that exceed the guaranteed correction power of the error-correcting code may be recoverable if erasure pointers are available.

The CL-SM330 can be programmed to provide erasure pointers derived from run-length violations and invalid decodes, from use of Resync Marks for resynchronization, and from detection of Loss-Of-Frequency-Lock. The erasure pointers are transferred to the data buffer instead of the data bytes and CRC and ECC redundancy bytes.

NOTE:

Erasure pointers are NOT used by the Error Correction Hardware function in the CL-SM330. An extended error-correction algorithm resident in the microcontroller firmware is required if erasure pointers are to be used.

CL-SM330
Optical Dis.. ENDEC/ECC

5. INITIALIZATION CONDITIONS

5.1 Reset Conditions

5.1.1 Hardware Reset

A Hardware Reset is caused by assertion of RST*. Hardware Reset causes the Software Reset Bit (Register 10H, Bit 7) to be set. In addition to the actions of the Software Reset, the Hardware Reset causes the following:

- The PLLIS, PLLMS, and PLLGS polarity are forced to positive-true.
- PLLIS, PLLMS, and PLLGS are forced to zero.
- RRCLK is stopped.
- The INT polarity is forced to negative-true, the output configuration for INT is forced to Open Drain and the INT Signal is deasserted.
- Register 10H Bits 7-5, Register 12H Bits 7-6, and Register 2CH 7-5 are all forced to one.

5.1.2 Software Reset

A Software Reset is initiated by setting Register 10, Bit 7 to a '1', or by asserting RST*. In addition to the actions of Operation Halt and Error Reset, Software Reset causes the following to occur:

Deasserts all outputs:

PREFMT = 0, ALPCWIN = 0, TOFWIN = 0, RLLOUT =0, DWG = 0, DRG = 0,

PLLMS = INACTIVE, PLLIS = INACTIVE, PLLGS = INACTIVE, TSMDET = 0, SMDET = 0,

VECTOR = 0, NRZ = (3-STATE or 0), IDF = 0, INT = INACTIVE.

5.1.3 Error Reset

An Error Reset is initiated by writing a '1' to the Error Reset Bit in Configuration Register 1. In addition to the action of Halt, all ENDEC and EDAC error status bits and counter latches are reset. Error Reset is a self-clearing bit, it clears all interrupts as well as causes the following actions to occur:

Register 20H, 21H, 23H, 30H & 3FH = 00H.

Register 22H = 00xx x000.

Register 27H = 3FH.

Register 39H = F0H.

5.1.4 Operation Halt

An Operation Halt is initiated by writing a '1' to the Operation Halt Bit in Configuration Register 1. The current operation, if any, is aborted and DRG and DWG are deasserted. This bit is self-clearing.

5.1.5 Sector Mark Reset

A Sector Mark Reset is initiated by writing the Sector Mark Control Register. Sector Mark Windowing and Pseudo Sector Mark generation are disabled until a Sector Mark is detected. Also, the PREFMT Signal is forced high until a Sector Mark is detected.

CL-SM330
Optical Disk ENDEC/ECC

5.2 Register Initialization

To enhance functionality and testability, most registers and bits that can be written by the microcontroller are also readable.

The following describes the recommended reset procedure for the CL-SM330:

- Assert RST* or write E0 (hex) to Register 10 hex.
- Initialize all registers *except* the following registers:
  - Configuration Register 3 (Register 12 hex)
  - Sector Transfer Count Register (Register 1A hex)
  - Data Buffer Address (Registers 1C hex to 1E hex)
  - Interrupt Enable registers (Registers 20 hex to 23 hex)
  - PLL Control (Register 2C hex)
  - General-Purpose Output (Register 39 hex)
- Remove chip reset.
- Initialize Register 10 hex and write with 000x xxxx (binary).
- Initialize Corrector RAM. Addresses 00 hex to 01 hex, 0F hex to 16 hex, and 20 hex to 27 hex.
- Initialize Configuration Register 3 (Register 12 hex).
- Initialize Data Buffer Address (Registers 1C hex to 1E hex).
- Reset all Interrupts (Registers 22 hex to 23 hex).
- Initialize Interrupt Enable registers (Registers 20 hex to 21 hex).
- Initialize PLL Control (Register 2C hex).
- Initialize General-Purpose Output Register (Register 39 hex).
- Start operation by writing a non-zero value to the Sector Transfer Count Register (Register 1A hex).

CL-SM330
*Optical Disk ENDEC/ECC*

6. CONFIGURATION REGISTERS

6.1 10H Configuration Register 1

| | |
|---|---|
| Bit 7 | Chip Reset: This bit is set by assertion of the RST* input or by the microcontroller writing a '1' to this bit. In either case, the CL-SM330 is held in a reset state, in which all output signals are held deasserted, until the microcontroller writes zero to this bit. |
| Bit 6 | Operation Halt/Chip Busy: writing a '1' to this bit will halt any current operation and place the CL-SM330 in an idle state. This bit is reset when the CL-SM330 goes into the idle state. Reading a '1' here indicates that the CL-SM330 is busy. |
| Bit 5 | Error Reset: writing a '1' to this bit clears all ENDEC and EDAC error status bits, interrupts and counter latches. This bit is always read as zero. |
| Bit 4 | Start Error Corrector/Error Corrector Busy: writing a '1' to this bit will initiate correction using the current contents of the Error Corrector RAM. This feature is intended to be used only for self-test and diagnostic purposes. This bit will be read as '1' whenever the Error Corrector is busy. |
| Bit 3 | Suppress Correction Vectors:<br>0: Error correction vectors generated by the Error Corrector will be transferred to the CL-SM331. This mode is used for normal Read Sector operations.<br>1: Error correction vectors generated by the Error Corrector will not be transferred to the CL-SM331. This mode is useful when performing a Read Sector Operation for write verification; ECC correctability and threshold information are desired, but actual data correction is not necessary. |
| Bits 2-0 | Operation Mode:<br>000: Select Normal Read Sector Operation Mode.<br>001: Select Normal Write Sector Operation Mode.<br>010: Select Read ID Operation Mode.<br>011: Select Search ID Operation Mode ('Jump-Back' Mode).<br>100: Select Write Flag/Read Sector Operation Mode.<br>101: Select Write Flag/Write Sector Operation Mode.<br>110: Select Blank Verify Operation Mode.<br>111: Select Non-Blank Verify Operation Mode.<br>When the Operation Mode is 100 or 101, Flag Generation is enabled. If the ID Target registers are matched and the ID Voting Threshold is met, the Flag Field will be written before the sector is read or written. These operation modes are normally not used when the CL-SM330 is configured for re-writable media. |

CL-SM330
*Optical Disk ENDEC/ECC*

6.2  11H Configuration Register 2

| Bit | | |
|---|---|---|
| Bit 7 | Reserved. | |
| Bit 6 | Enable Buffer Segmentation: | |
| | 0: | The Error Corrector treats the data buffer as a single 4 Mbyte address space. |
| | 1: | The Error Corrector treats the data buffer as 64 separate, 64K byte address spaces. When computing error locations during error correction and when the Data Buffer Address registers are updated after each sector is corrected, carry out of Bit 15 is inhibited. |
| Bit 5 | Enable Correction/Transfer of VU/PTR Bytes: | |
| | 0: | During a Read Sector Operation, error correction vectors will be generated for user data bytes, but not for the VU/PTR bytes or for the CRC/ECC redundancy bytes. During a Write Sector Operation, the VU/PTR bytes will not be transferred over the NRZ line from the CL-SM331, but will be sourced by the CL-SM330 as determined by the VU/PTR Source Mode Bit. |
| | 1: | During a Read Sector Operation, error correction vectors will be generated for user data bytes, and for the VU/PTR bytes but not for the CRC/ECC redundancy bytes. During a Write Sector Operation, the VU/PTR bytes will be transferred over the NRZ line from the CL-SM331. The number of VU/PTR bytes for that error correction vectors will be generated (read) or that will be transferred (write) is determined by the selected form factor and sector size: |

|      | 90 mm | 130 mm |
|------|-------|--------|
| 512  | 4     | 14     |
| 1024 | 12    | 12     |

CL-SM330
*Optical Disk ENDEC/ECC*

6.2 11H Configuration Register 2 *(cont.)*

| Bit 4 | VU/PTR Source Mode: | | |
|---|---|---|---|
| | 0: Re-writable Mode: The Vendor Unique bytes will be sourced by the CL-SM330 during a write operation as determined by the selected form factor and sector size: | | |
| | | 90 mm | 130 mm |
| | 512 | 1-4: VU1-4 Reg | 1-4: VU1-4 Reg |
| | | | 5-14: Constant FFh |
| | 1024 | 1-4: VU1-4 Reg | 1-4: VU1-4 Reg |
| | | 5-12: Constant FFh | 5-12: Constant FFh |
| | 1: WORM Mode: The Pointer bytes will be sourced by the CL-SM330 during a write operation as determined by the selected form factor and sector size: | | |
| | | 90 mm | 130 mm |
| | 512 | 1-4: ID Target Reg | 1-4: ID Target Reg |
| | | | 5-8: VU1-4 Reg |
| | | | 9-12: VU1-4 Reg |
| | | | 13-14: constant FFh |
| | 1024 | 1-4: ID Target Reg | 1-4: ID Target Reg |
| | | 5-12: Constant FFh | 5-8: VU1-4 Reg |
| | | | 9-12: VU1-4 Reg |

| Bit 3 | 0.5/1.0% Speed Tolerance Select: |
|---|---|
| | 0: Select 0.5% speed tolerance. |
| | 1: Select 1.0% speed tolerance. |

| Bit 2 | Reserved. |
|---|---|

| Bit 1 | 90/130 mm Mode Select: |
|---|---|
| | 0: Select 90 mm Mode. |
| | 1: Select 130 mm Mode. |

| Bit 0 | 512/1024-byte Sector Mode Select: |
|---|---|
| | 0: Select 512-byte Sector Mode. |
| | 1: Select 1024-byte Sector Mode. |

CL-SM330
*Optical Disk ENDEC/ECC*

6.3  12H Configuration Register 3

| | |
|---|---|
| Bit 7 | Disable INT Output Driver: After a hardware reset, this bit is set. It also may be written by the microcontroller.<br>0: The output driver on the INT Signal is always enabled. INT acts as a push-pull output.<br>1: The output driver on the INT Signal is disabled when INT is not asserted. INT acts as an open-drain output. This is intended to support system-level, multiple-interrupt sources. |
| Bit 6 | Negative INT Polarity:<br>0: The polarity of the Microprocessor Interrupt Signal is positive-true. The output will be configured as a push-pull driver regardless of the value of the Disable INT Output Driver Configuration Bit.<br>1: The polarity of the Microprocessor Interrupt Signal is negative-true. |
| Bit 5 | Enable ALPC Window on Read Operations:<br>0: ALPC windows will only occur on write operations.<br>1: When this bit is set, the CL-SM330 will generate the ALPC Window Signal on both read and write operations. |
| Bit 4 | Enable DWG and DRG during ALPC:<br>0: DWG and DRG are asserted as programmed by the CL-SM331 during non-preformat times.<br>1: DWG and DRG are asserted as programmed by the CL-SM331 WCS and during ALPC window as determined by the ALPC Window Length and Delay. If the Length and Delay are set such that there is a gap between when ALPC falls and when DWG/DRG would normally rise, then DWG/DRG will return to zero for that period of time. |
| Bit 3 | Disable Error Correction:<br>0: The Error Corrector is enabled.<br>1: The Error Corrector is disabled unless started by the microcontroller writing a '1' to Start Corrector (Register 10H, Bit 4). |
| Bit 2 | Enable Erasure Pointer Generation:<br>0: Decoded data bits will be transferred to the CL-SM331 over the NRZ line.<br>1: Erasure pointer bits will be transferred to the CL-SM331 over the NRZ line. The format of the erasure pointer bits is as follows: The first bit of each data frame (15 or 20 bytes, depending on selected sector size) except the first will be set if the preceding Resync Mark was used to re-establish bit and byte synchronization. The second bit and each subsequent even bit will be set if a RLL run-length violation or invalid decode was detected. The third bit and each second subsequent odd bit will be set if Loss-Of-Frequency-Lock was detected. |

CL-SM330
Optical Disk ENDEC/ECC

6.3  12H Configuration Register 3 *(cont.)*

Erasure Pointer Definition

|            | 7  | 6  | 5  | 4  | 3  | 2  | 1  | 0  |
|------------|----|----|----|----|----|----|----|----|
| Byte 0     | LL | RV | LL | RV | LL | RV | LL | RV |
| ⋮          | ⋮  | ⋮  | ⋮  | ⋮  | ⋮  | ⋮  | ⋮  | ⋮  |
| Byte 15(20)| RU | RV | LL | RV | LL | RV | LL | RV |
| Byte 16(21)| LL | RV | LL | RV | LL | RV | LL | RV |
| ⋮          | ⋮  | ⋮  | ⋮  | ⋮  | ⋮  | ⋮  | ⋮  | ⋮  |

RU = Resync Used    RV = Run Length Violation    LL = Loss of Lock

| Bit 1 | Force RLLOUT High During DWG: |
|---|---|
| | 0: RLLOUT is the encoded NRZ data for normal write operation. |
| | 1: RLLOUT is forced high while DWG is active. This feature is intended for ERASE operations. |

| Bit 0 | Read Continuously: |
|---|---|
| | 0: Read Sector operations will halt on fatal data sync error, uncorrectable error, error exceeding threshold, or correction time overrun. If a fatal data sync error, uncorrectable error, or error exceeding threshold is detected, reading will halt. If a correction time overrun occurs, reading will halt and correction of the previous sector will be completed. |
| | 1: Read Sector operations will not halt on fatal data sync error, uncorrectable error, error exceeding threshold, or correction time overrun. If error correction is not completed before the first CRC remainder byte of the current sector is read, correction of the previous sector will be aborted, reading of the current sector will continue, and correction of the current sector will begin when its last ECC remainder byte has been read. This option is provided to support the SCSI Read Continuous Mode. |

CL-SM330
*Optical Disk ENDEC/ECC*

6.4　13H Sectors Per Track

| Bits 7-6 | INT1-0 Polarity:<br>0:　Rising-edge triggered interrupt, positive polarity input signal when not enabled.<br>1:　Falling-edge triggered interrupt, negative polarity input signal when not enabled. |
|---|---|
| Bits 5-0 | Sectors Per Track: This value to be written here is one less than the desired number of sectors per track. Nominal values are 24(12) to specify the standard 25(13) sectors per track for 512(1024) byte sectors on 90 mm media and 30(16) to specify the standard 31(17) sectors per track for 512(1024) byte sectors on 130 mm media. For current standard track formats, Bit 5 is reserved. An extraneous interrupt may occur if this register is written while the CL-SM330 is not in a reset state. |

6.5　14H ID Target Sector

The values written to the ID Target registers determine the first sector for which the next operation is to be performed. The values read from the ID Target registers after a successful Read ID Operation identifies the first sector for which an error-free ID Field was read. The values read from the ID Target registers after any other operation identifies the last sector for which the operation was attempted. After the initial target sector is found, the low six bits of ID Target Sector Register are automatically incremented at the end of each sector, rolling over to zero at the end of each track when the programmed number of sectors per track is exceeded, until the operation is completed or aborted. Unless disabled by setting the Disable Track Autoincrement Bit, the ID Target Track LSB Register is automatically incremented when the ID Target Sector Register rolls over to zero. The ID Target Track MSB Register is incremented when the ID Target Track LSB Register increments to zero.

| Bits 7-6 | ID Field Identifier: When writing this register, these bits are ignored. When reading this register after a successful Read ID Operation, these bits identify which ID Field was read. |
|---|---|
| Bits 5-0 | ID Target Sector: This field identifies the sector number. |

6.6　15H ID Target Track LSB

| Bits 7-0 | ID Target Track LSB: This register identifies the low eight bits of the track number. Refer to the ID Target Sector Register description above. |
|---|---|

CL-SM330
Optical Disk ENDEC/ECC

6.7 16H ID Target Track MSB

| | |
|---|---|
| Bits 7-0 | ID Target Track MSB: This register identifies the high eight bits of the track number. Refer to the ID Target Sector Register description above. |

6.8 17H ID Compare Sector

Prior to beginning any Read, Write, or Blank Sector Operation, the microcontroller should insure that the ID Compare registers contain the physical track and sector address of the next sector to be slipped. When the ID Target registers are equal to the ID Compare registers, the ID Compare Register Found Bit is set. If the Enable ID Compare Register Found Int Bit is set, the current operation is suspended for one sector and a microcontroller interrupt is generated. The microcontroller should update the ID Compare registers before the Sector Mark of the next sector is reached, because the next sector could be the next sector to be slipped. The ID Compare registers are ignored during Read ID operations.

| | |
|---|---|
| Bits 7-6 | Reserved. |
| Bits 5-0 | ID Compare Sector: This register contains the sector number of the next sector to be slipped for the next operation (excluding Read ID operations). |

6.9 18H ID Compare Track LSB

| | |
|---|---|
| Bits 7-0 | ID Compare Track LSB: This register contains the low eight bits of the track number of the next sector to be slipped for the next operation (excluding Read ID operations). Refer to the ID Compare Sector description above. |

6.10 19H ID Compare Track MSB

| | |
|---|---|
| Bits 7-0 | ID Compare Track MSB: This register contains the high eight bits of the track number of the next sector to be slipped for the next operation (excluding Read ID operations). Refer to the ID Compare Sector description above. |

CL-SM330
*Optical Disk ENDEC/ECC*

6.11  1AH Sector Transfer Count

| | |
|---|---|
| Bits 7-0 | Sector Transfer Count: Writing any non-zero value to this register starts the operation currently selected by Bits 2-0 of Configuration Register 1. For Read ID and Search ID operations, the value written here is ignored and not altered during execution of the operation. For Read Sector, Write Sector, and (Non-)Blank Verify operations, the value written here determines the number of sectors to be processed. When this register decrements to zero, the Sector Transfer Count=0 Bit will be set, and if enabled, the Sector Transfer Count=0 Interrupt will be generated. If any value is written to this register before the end of redundancy transfer for the last sector of the operation, another operation will begin without loss of disk orientation. This register must not be written while the CL-SM330 is executing any operation unless the Sector Transfer Count=0 Bit is set and the Sector Transfer Count contains zero.<br><br>The value read from this register is valid only when the Operation Complete Bit is set and the microcontroller has not written this register after initiating an operation, but before detecting Operation Complete. For Read ID and Search ID operations, the value read is the same as that written to initiate the operation. For Read Sector and Write Sector operations, the value read is the number of sectors for which data transfer was not begun during an aborted operation. For Blank Verify and Non-Blank Verify operations, the value read is the number of sectors for which blank detection was not begun during an aborted operation.<br><br>Note that if zero is written to this register, the Sector Transfer Count=0 status will be set immediately, and if enabled, a microcontroller interrupt will be generated. |

6.12  1BH Sector Correction Count

| | |
|---|---|
| Bits 7-0 | Sector Correction Count (read only): This register is valid only when the Operation Complete Bit is set after any Read Sector Operation or a Write Sector Operation, for which the ECC Diagnostic Mode Bit was set. The value read is the number of sectors for which correction was not attempted during the just-completed operation. |

CL-SM330
Optical Disk ENDEC/ECC

6.13  1CH, 57H Data Buffer Address Low

When a common chip select is used for the CL-SM331 and the CL-SM330, writing to addresses 57H-59H, writes to both the CL-SM331 Disk Address Pointer registers and the CL-SM330 Data Buffer Address registers. Reading addresses 57H-59H reads from the CL-SM331 Disk Address Pointer registers, while reading or writing addresses 1CH-1EH accesses the CL-SM330 Data Buffer Address registers. If the CL-SM330 Data Buffer Address is to be the same as the CL-SM331 Disk Address Pointer, as will usually be the case, the microcontroller need only write addresses 57H-59H. In order to write the Data Buffer Address, Chip Reset and Operation Halt (Register 10H, Bits 7-6) must be reset. If it is desired that the CL-SM330 Data Buffer Address differ from the CL-SM331 Disk Address Pointer, addresses 57H-59H should be written first, then addresses 1CH-1EH should be written.

Before a Read Sector Operation is initiated, the CL-SM331 Disk Address Pointer registers and the CL-SM330 Data Buffer Address registers must be written with the address in the data buffer of the first data byte of the first sector for the operation. Subsequent Read Sector operations may be initiated without writing the CL-SM331 Disk Address Pointer registers or the CL-SM330 Data Buffer Address registers if the Data Buffer Area to be used for the next Read Sector Operation is contiguous with that of the current Read Sector Operation. When it is necessary to change the CL-SM331 Disk Address Pointer registers and the CL-SM330 Data Buffer Address registers, they must be changed when data transfer has been completed for the last sector of the current Read Sector Operation, but before data transfer begins for the first sector of the next Read Sector Operation. If the microcontroller writes any of the Data Buffer Address registers when data transfer is occurring, the CL-SM330 will abort the operation, set the Operational Overrun and ECC Error Pending bits, and if the Enable ECC Error Interrupts Bit is set, generate a microcontroller interrupt. The microcontroller may determine when data transfer is occurring by examining Register 1EH, Bit 7 of the CL-SM330 or the current address of the Writable Control Store in the CL-SM331.

After a Read Sector Operation is completed or aborted, the Data Buffer Address registers contain the address of the first byte of the sector following the last sector for which correction was attempted.

| Bits 7-0 | Data Buffer Address Low: This register contains Bits 7-0 of the data buffer address. |
|---|---|

6.14  1DH, 58H Data Buffer Address Middle

| Bits 7-0 | Data Buffer Address Middle: This register contains the Bits 15-8 of the data buffer address. |
|---|---|

CL-SM330
*Optical Disk ENDEC/ECC*

6.15 1EH, 59H Data Buffer Address High

| | |
|---|---|
| Bit 7 | Data Transfer Active (read only):<br>0: Data Transfer is not occurring. Registers 1Ch, 1Dh, 1Eh may be written.<br>1: Data Transfer is occurring (i.e., user data or VU/PTR bytes are being transferred). Registers 1Ch, 1Dh, 1Eh may not be written. |
| Bit 6 | Reserved. |
| Bits 5-0 | Data Buffer Address High: These six bits are Bits 21-16 of the data buffer address. |

6.16 1FH Revision Number

| | |
|---|---|
| Bits 7-0 | CL-SM330 Revision Number (read only). Initial revision number is FFh. |

CL-SM330
Optical Disk ENDEC/ECC

7. INTERRUPT REGISTERS

7.1  20H Interrupt Enable Register

| | |
|---|---|
| Bit 7 | Enable Media Error Interrupts: When this bit is set, an interrupt will be generated when any enabled Media Error Interrupt occurs. |
| Bit 6 | Enable ECC Error Interrupts: When this bit is set, an interrupt will be generated when any ECC Error occurs. |
| Bit 5 | Enable General-Purpose Int 1:<br>0:  Masks any transitions on the INT1 Input from causing an interrupt. In this mode, the INT1 Input acts like a GPIN Input.<br>1:  When this bit is set, an interrupt will be generated when a transition of the programmed polarity is detected on the INT1 pin. |
| Bit 4 | Enable General-Purpose Int 0:<br>0:  Masks any transitions on the INT0 Input from causing an interrupt. In this mode, the INT0 Input acts like a GPIN Input.<br>1:  When this bit is set, an interrupt will be generated when a transition of the programmed polarity is detected on the INT0 pin. |
| Bit 3 | **Enable DINT\* Pass-Through:** When this bit is set, an interrupt will be generated when the DINT\* pin is asserted. |
| Bit 2 | Enable ID Compare Register Found Int: When this bit is set, an interrupt will be generated when the ID Target Register is equal to the ID Compare Register. During a Read Sector or Write Sector Operation, the CL-SM330 will suspend the current operation for the current sector and not decrement the Sector Transfer Count Register. The microcontroller should immediately update the ID Compare Register with the address of the next defective sector, because the next defective sector might be the very next sector. If this bit is reset, the current operation will not be suspended if the ID Target Register is equal to the ID Compare Register. |
| Bit 1 | Enable Sector Transfer Count=0 Int: When this bit is set, an interrupt will be generated when the Sector Transfer Count Register is decremented to zero. |
| Bit 0 | Enable Operation Complete Int: When this bit is set, an interrupt will be generated when requested operation has been completed or halted. |

CL-SM330
*Optical Disk ENDEC/ECC*

7.2  21H Media Error Enable Register

Each Media Error Interrupt source can be individually enabled or disabled, but all Media Error Interrupt sources are disabled when the Enable Media Error Interrupts Bit in the Interrupt Enable Register is reset.

| | |
|---|---|
| Bit 7 | Enable R/W Attempted After PSM Int: When this bit is set, an interrupt will be generated when a Pseudo Sector Mark is generated for a sector that was to be read or written. The sector for which the Pseudo Sector Mark was generated will not be read or written and the operation will be aborted. |
| Bit 6 | Enable Sector Mark Detected Outside Window Int: When this bit is set, an interrupt will be generated when a Sector Mark is detected, and when the Sector Mark Window is enabled but not active. The current operation, if any, will continue. |
| Bit 5 | Enable ID Error Int: When this bit is set, an interrupt will be generated and the operation will be aborted when one of the following conditions occurs, except during a Search ID Operation during which only condition (i) will cause an interrupt.<br>i) No error-free ID Field is read within two revolutions.<br>ii) The target sector is not found within two revolutions.<br>iii) The target sector is found, but the ID Voting Threshold was not met.<br>iv) An error-free ID Field is read that is greater than the ID Target registers. |
| Bit 4 | Enable Recovered Data Sync Error Int: When this bit is set, an interrupt will be generated after reading is completed for a sector for which the Data Sync Mark is not detected within its window, but for which data synchronization is accomplished using the first Resync Mark. The Read Sector Operation will continue. |
| Bit 3 | Enable Fatal Data Sync Error Int: When this bit is set, an interrupt will be generated when the target sector is found and data synchronization cannot be accomplished either from the Data Sync Mark or one of the initial Resync Marks. The Read Sector Operation will be aborted. |
| Bit 2 | Enable Resync Mark Threshold Error Int: When this bit is set, an interrupt will be generated after reading is completed for a sector for which the Resync Mark Error Threshold is exceeded by the total count of the following events. The Read Sector Operation will continue.<br>i) A Resync Mark is not detected in the Resync Mark Window.<br>ii) A Resync Mark is detected in the Resync Mark Window and the decoder was not in bit sync. |
| Bit 1 | Enable Operation Attempted After Flag Detected Int: When this bit is set, an interrupt will be generated when a written Flag Field is detected in a sector that was to be read or written. The sector will not be read or written and the operation will be aborted. |

7.2 21H Media Error Enable Register (cont.)

| | |
|---|---|
| Bit 0 | The meaning of this bit depends on the Operation Mode.<br>i) Read Sector Operation: Enable Error Correction Complete Int.<br>When this bit is set, an interrupt will be generated when correction is complete for each sector. The microcontroller must reset the Error Correction Complete Bit before correction is complete for the second following sector.<br>ii) (Non-)Blank Verify Operation: Enable Blank Sector Error Int.<br>When this bit is set, an interrupt will be generated and the operation will be aborted when a non-blank sector has been detected during a Blank Verify Operation or when a blank sector has been detected during a Non-Blank Verify Operation. |

CL-SM330
*Optical Disk ENDEC/ECC*

7.3 22H Interrupt Status Register

Each interrupt source (except DINT*), can be individually reset by writing a '1' to its bit in this register.

| | |
|---|---|
| Bit 7 | Media Error Pending: This bit is set when any of the bits in the Media Error Status Register (Register 23H) is set. Writing a '1' to this bit resets all bits in the Media Error Status Register. |
| Bit 6 | ECC Error Pending: This bit is set when any of the bits in the ECC Error Status Register (Register 30H) is set. Writing a '1' to this bit resets all bits in the ECC Error Status Register. |
| Bit 5 | General-Purpose Int 1 Asserted: If enabled (Bit 5 of Register 20H set), this bit is set when a transition of the programmed polarity is detected on the INT1 pin. If not enabled, this bit reflects the state of the INT1 Input Signal and is read only. |
| Bit 4 | General-Purpose Int 0 Asserted: If enabled (Bit 4 of Register 20H set), this bit is set when a transition of the programmed polarity is detected on the INT0 pin. If not enabled, this bit reflects the state of the INT0 Input Signal and is read only. |
| Bit 3 | **DINT* Asserted:** This bit is asserted when the DINT* Signal from the CL-SM331 is asserted. This allows the CL-SM331 and CL-SM330 to constitute a single interrupt source without external logic. This signal is not latched and is read only. |
| Bit 2 | ID Compare Register Found: This bit is set when the ID Target Register is equal to the ID Compare Register. During a Read, Write, or Blank Sector Operation, if the Enable ID Compare Register Found Int Bit is set, the CL-SM330 will suspend the current operation for the current sector and not decrement the Sector Transfer Count Register. The microcontroller should immediately update the ID Compare Register with the address of the next defective sector, because the next defective sector might be the very next sector. If the ID Compare Register Found interrupt is not enabled, the current operation will not be suspended. During a Search ID Operation, this bit will be set when the ID Target registers equal or exceed the ID Compare registers. |
| Bit 1 | Sector Transfer Count=0: The Sector Transfer Count Register is decremented at the beginning of data transfer for each sector. This bit will be asserted when the Sector Transfer Count Register is decremented to zero. |

CL-SM330
Optical Disk ENDEC/ECC

7.3   22H Interrupt Status Register (cont.)

| | |
|---|---|
| Bit 0 | Operation Complete: This bit is set when the requested operation has been completed or halted. |
| | i) Read Sector Operation: Error correction has ceased for the previous Read Sector Operation. The Sector Transfer Count Register contains the number of sectors for which data transfer was not begun. The Sector Correction Count Register contains the number of sectors for which error correction was not attempted. |
| | (a) The ECC Error Pending Bit is not set and the only bit set in the Media Error Status Register is the Error Correction Complete Bit. All sectors specified by the initial Sector Transfer Count have been successfully read and corrected. The Sector Transfer Count Register and the Sector Correction Count Register are zero. This is the error-free case. |
| | (b) The ECC Error Pending Bit is set. An ECC error has occurred that caused the CL-SM330 to abort the Read Sector Operation. If Bit 7, Bit 6, or Bit 2 of the ECC Error Status Register is set, the number of sectors successfully read and corrected is equal to one less than the difference between the initial value written to the Sector Transfer Count Register and the value read from the Sector Correction Count Register. If Bit 5 or Bit 4 of the ECC Error Status Register is set, the number of sectors successfully read and corrected is equal to the difference between the initial value written to the Sector Transfer Count Register and the value read from the Sector Correction Count Register. If Bit 3 of the ECC Error Status Register is set, a CL-SM330 hardware error is indicated. If Bit 0 of the ECC Error Status Register is set, a microcontroller firmware error is indicated. |
| | (c) The ECC Error Pending Bit is not set, but the Media Error Pending Bit is set indicating that at least on bit in the Media Error Status Register is set. A media error has occurred that caused the CL-SM330 to abort the Read Sector Operation. The number of sectors successfully read and corrected is equal to the difference between the initial value written to the Sector Transfer Count Register and the value read from the Sector Correction Count Register. The number of sectors for which data transfer was begun is equal to the difference between the initial value written to the Sector Transfer Count Register and the value read from the Sector Transfer Count Register. The reason the Read Sector Operation was aborted may be determined by examining the Media Error Status Register. |

CL-SM330
*Optical Disk ENDEC/ECC*

7.3 22H Interrupt Status Register *(cont.)*

--- ii) Write Sector Operation: Writing has ceased for the previous Write Sector Operation. The Sector Transfer Count Register contains the number of sectors for which data transfer was not begun.

(a)    The ECC Error Pending Bit and the Media Error Pending Bit are not set. All sectors specified by the initial Sector Transfer Count have been successfully transferred and written. The Sector Transfer Count Register is zero.

(b)    The ECC Error Pending Bit is set. An ECC error has occurred that caused the CL-SM330 to abort the Write Sector Operation. If Bit 1 of the ECC Error Status Register is set, the number of sectors for which data transfer was begun is equal to one less than the difference between the initial value written to the Sector Transfer Count Register and the value read from the Sector Transfer Count Register. If Bit 3 of the ECC Error Status Register is set, a CL-SM330 hardware error is indicated. If Bit 0 of the ECC Error Status Register is set, a microcontroller firmware error is indicated.

(c)    The ECC Error Pending Bit is not set and the Media Error Pending Bit is set. A media error has occurred that caused the CL-SM330 to abort the Write Sector Operation. The number of sectors for which data transfer was begun is equal to the difference between the initial value written to the Sector Transfer Count Register and the value read from the Sector Transfer Count Register. The reason the Write Sector Operation was aborted may be determined by examining the Media Error Status Register.

iii) Read ID Operation: Reading of ID fields has ceased for the previous Read ID Operation.

(a)    The Media Error Pending Bit is not set. An error-free ID Field has been read into the ID Target registers.

(b)    The Media Error Pending Bit is set. The Read ID Operation was halted because no error-free ID Field was read within two revolutions. The ID Error Bit is set.

iv) Search ID Operation: Searching for ID has ceased for the previous Search ID Operation. The Media Error Pending Bit and the ID Error Bit are set. No error free ID was read within two revolutions. The ID Search Operation is aborted. Note that the Operation Complete Interrupt is only issued if the Search ID Operation has failed. If an error free ID can be read, the operation will continue until halted.

CL-SM330
*Optical Disk ENDEC/ECC*

7.3 22H Interrupt Status Register *(cont.)* v) (Non-)Blank Verify Operation: Blank detection has ceased for the previous operation. The Sector Transfer Count Register contains the number of sectors for which blank detection was not performed.

(a) The Media Error Pending Bit is not set. All sectors specified by the initial Sector Transfer Count have been successfully verified as (non-)blank. The Sector Transfer Count Register is zero.

(b) The Blank Sector Error Bit is set. The number of sectors successfully verified as (non-)blank is equal to the one less than the difference between the initial value written to the Sector Transfer Count Register and the value read from the Sector Transfer Count Register.

(c) Any of Bits 7-1 in the Media Error Status Register is set. The number of sectors successfully verified as (non-)blank is equal to the difference between the initial value written to the Sector Transfer Count Register and the value read from the Sector Transfer Count Register. The reason the (Non-)Blank Verify Operation was aborted may be determined by examining the Media Error Status Register.

7.4 23H Media Error Status Register

Each Media Error Interrupt source can be individually reset by writing a '1' to its bit in this register. All Media Error Interrupt sources are reset when '1' is written to the Media Error Pending Bit in the Interrupt Status Register (Bit 7 of Register 22H).

| | |
|---|---|
| Bit 7 | Pseudo Sector Mark Generated: This bit is set when the Sector Mark has not been detected and a Pseudo Sector Mark has been generated for a sector that was to be read or written. It is reset when the microcontroller writes a '1' to this location. |
| Bit 6 | Sector Mark Detected Outside Window: This bit is set when a Sector Mark is detected and the Sector Mark Window was enabled but not active. This can occur when a Sector Mark is falsely detected, or when a true Sector Mark is detected while DRG is still active because a medium error has caused loss of orientation. |
| Bit 5 | ID Error: When performing an ID Search Operation, this bit is set only when no error-free ID was read within two revolutions. For all other operations, it is set under the following conditions:<br>i) The target sector was not found within two revolutions.<br>ii) The target sector was found, but the ID Voting Threshold was not met.<br>iii) An error-free ID was read that was greater than the ID Target Register. The cause of the ID Error can be determined by examining the ID Error Status Register. |

CL-SM330
*Optical Disk ENDEC/ECC*

7.4  23H Media Error Status Register *(cont.)*

| | |
|---|---|
| Bit 4 | Recovered Data Sync Error: This bit is set when the target sector is found, the Data Sync Mark is not detected within its window, but data synchronization is accomplished using the first Resync Mark. |
| Bit 3 | Fatal Data Sync Error: This bit is set when the target sector is found and data synchronization cannot be accomplished either from the Data Sync Mark or one of the initial Resync Marks. |
| Bit 2 | Resync Mark Error Threshold Exceeded: This bit is set when the Resync Mark Error Threshold is exceeded by the total count of the following events:<br>i) A Resync Mark is not detected in the Resync Mark Window.<br>ii) A Resync Mark is detected in the Resync Mark Window and the decoder was not in bit sync. |
| Bit 1 | Written Flag Field Detected: This bit is set when a written Flag Field is detected. It is invalid when the CL-SM330 is programmed for 512-byte sectors on 90 mm medium. The contribution of this bit to Media Error Pending (Register 22H, Bit 7) is blocked unless the Enable Operation Attempted After Flag Detected (Register 21H, Bit 1) is set. Written Flag Field Detected is reset when the microcontroller writes a '1' to this bit. |
| Bit 0 | Error Correction Complete/Blank Error Detected:<br>The meaning of this bit depends on the Operation Mode.<br>i) Read Sector Operations: Error Correction Complete.<br>For each sector, this bit is set when error correction is complete. If the Enable Correction Complete Int Bit is set, a microcontroller interrupt is generated. The CL-SM330 can 'stack' two Error Correction Complete interrupts before the microcontroller is required to clear this bit. This feature accommodates the case where a sector with errors is followed by a sector without errors and the first sector correction extends into the next sector time. When this occurs, the microcontroller must clear the first Correction Complete Interrupt before a third interrupt is pushed onto the stack. Any pending Correction Complete Interrupt is asserted immediately after the microcontroller clears the current one. If the Correction Complete Interrupt is not enabled, this bit is reset for each sector when all redundancy bytes have been read for the next sector.<br>ii) (Non-)Blank Verify Operation: Blank Sector Error Detected.<br>This bit is set when a non-blank sector has been detected during a Blank Verify Operation or when a blank sector has been detected during a Non-Blank Verify Operation. This bit is reset when the microcontroller writes a one to this location. |

8. MARK DETECTION CONTROL REGISTERS

8.1 24H Sector Mark Control

| | |
|---|---|
| Bits 7-6 | Sector Mark, ID Read Gate, ID AM, and Data Sync Window Position: These two bits determine the initial window timing for each sector. As soon as a Sector Mark or error-free ID is detected, timing is referenced to that detection and these bits are ignored until the next sector.<br>00: The Window is positioned nominally.<br>01: The Window is delayed by the percentage selected by the 0.5/1.0% Speed Tolerance Select Bit in Configuration Register 2 (i.e., the disk is assumed to be spinning slow). This is the recommended normal operating mode.<br>10: The Window is advanced by the percentage selected by the 0.5/1.0% Speed Tolerance Select Bit in Configuration Register 2 (i.e., the disk is assumed to be spinning fast).<br>11: Reserved. |
| Bits 6-3 | Sector Mark-Mark Threshold (0-5): This value specifies the minimum number of long marks that must be correctly detected in qualifying the Sector Mark. A typical value is three. |
| Bits 2-0 | Sector Mark-Space Threshold (0-4): This value specifies the minimum number of long spaces that must be correctly detected in qualifying the Sector Mark. A typical value is three. |

CL-SM330
Optical Disk ENDEC/ECC

8.2  25H Resync Mark Control

| Bit 7 | Enable False Resync Protection: |
|---|---|
| | 0: Normal Resync Mark action is selected. Each Resync Mark detected within its window will reset the RLL (2,7) decoder, and reset the position and width of the next Resync Mark Window. |
| | 1: The False Resync Protection Mode selected by Bit 6 of this register is enabled. False Resync Protection is intended for use in retry only. |
| Bit 6 | False Resync Protection Mode: This bit is ignored unless Bit 7 of this register is set. |
| | 0: Each Resync Mark detected within its window will reset the RLL (2,7) decoder, but when a Resync Mark is detected away from its expected position, the position and width of the next Resync Mark Window will not be reset until a subsequent Resync Mark is detected. |
| | 1: When a Resync Mark is detected away from its expected position, neither the RLL (2,7) decoder nor the position and width of the next Resync Mark Window will be reset until a subsequent Resync Mark is detected. |
| Bits 5-4 | Resync Mark Skip Count (0-3): This specifies the number of Resync Marks that will be skipped if enabled. This feature is enabled by setting the Data Sync Mark Threshold (Register 26, Bits 3-0) to zero. |
| Bits 3-0 | Resync Mark Error Threshold (0-15): This value specifies the number of 'missing' or 'used' Resync Marks that must be exceeded before the Resync Mark Threshold Error Bit is set. |

CL-SM330
Optical Disk ENDEC/ECC

8.3  26H ID Field/Data Sync Control

| Bit 7 | Enable Modified ID Read Gate: |
|---|---|
| | 0: DRG is asserted at the beginning of the VFO1 field (unless modified by skipping ID) and deasserted at the end of the Pre-Format Area. |
| | 1: DRG is asserted normally except that it is deasserted for one NRZ byte time after ID1 and ID2. |

| Bit 6 | Disable Track Autoincrement: |
|---|---|
| | 0: The ID Target Track registers will be automatically incremented when the ID Target Sector Register exceeds the programmed number of sectors per track and is reset to zero. |
| | 1: The ID Target Track registers will not be incremented when the ID Target Sector Register exceeds the programmed number of sectors per track and is reset to zero. |

| Bits 5-4 | ID Voting Threshold (0-3): The voting threshold is not used during Search ID or Read ID operations. |
|---|---|
| | 00: Zero error-free ID fields must be read. This is intended as an error recovery mode only. The disk must be oriented exactly before the operation is initiated; the operation will be executed for the very next sector. |
| | 01: One error-free ID field must be read. |
| | 10: Two error-free ID fields must be read. |
| | 11: Three error-free ID fields must be read. |

| Bits 3-0 | Data Sync Mark Threshold (0-12): This value specifies the minimum number of four-code-bit groups that must be correctly detected in qualifying the Data Sync Mark. A typical value is nine. |
|---|---|
| | A value of zero means that the Skip Data Sync Mark Mode is activated, during which the CL-SM330 will not attempt to detect the Data Sync Mark nor the number of Resync Marks specified by the Resync Mark Skip Count. Instead, the 'Valid Data Sync' byte (hex '0D') and an appropriate number of dummy data bytes will be transferred and synchronization will be attempted on the selected Resync Mark. |

CL-SM330
*Optical Disk ENDEC/ECC*

8.4  27H ID Error Status (read only)

Bits 7-6 of this register are cleared at the beginning of each sector when the CL-SM330 is executing an operation.

| | |
|---|---|
| Bit 7 | ID Threshold Error: This bit is set when an error-free ID Field is read that matches the ID Target registers but the ID Voting Threshold is not met. |
| Bit 6 | ID Greater Than Target: This bit is set when an error-free ID Field is read that exceeds the ID Target registers. |
| Bits 5-3 | CRC Error Detected For ID 3-1: The meaning of these bits is modified by the ID Voting Threshold. Only ID that is required (to meet threshold) has accurate status. At the beginning of each sector, Bits 5-3 are set. As each ID is read, each corresponding bit is reset if the Address Mark was found and the CRC indicated no error. |
| Bits 2-0 | ID AM Not Detected For ID 3-1: The meaning of these bits is modified by the ID Voting Threshold. Only ID that is required (to meet threshold) has accurate status. At the beginning of each sector, Bits 2-0 are set. As each ID is read, each corresponding bit is reset if the Address Mark was found. In order to meet threshold, both the ID AM must be found and the ID CRC be error-free. Therefore, it is possible to have more ID AM found than error-free ID CRC. |

9. WINDOW CONTROL REGISTERS

9.1 28H Window Control Register

| | | |
|---|---|---|
| Bit 7 | Disable Pre-Format Window | |
| | 0: | The PREFMT Signal will be deasserted 47 bytes after the detected or expected position of the previous Sector Mark and reasserted before the expected position of the next Sector Mark. The delay in byte-times between the rising edge of PREFMT and the nominal position of the Sector Mark is determined by the speed tolerance and selected sector size: |
| | | Tolerance  512   1024 |
| | | 0.5%       4     8 |
| | | 1.0%       8     16 |
| | 1: | The PREFMT Signal will be continuously asserted. This mode may be used for WORM media and the ROM Area of Partial ROM re-writable media. |
| Bit 6 | Disable Sector Mark Window: | |
| | 0: | Sector Mark detection is windowed. |
| | 1: | Sector Mark detection circuitry is continuously active. |
| Bit 5 | Disable ID AM Window: | |
| | 0: | ID AM detection is windowed. |
| | 1: | ID AM detection is active throughout the Pre-Formatted Area. |
| Bit 4 | Disable Data Sync Window: | |
| | 0: | Data Sync Mark detection is windowed. |
| | 1: | Data Sync Mark detection is active in the Data Field Area until a Data Sync Mark is detected. |

CL-SM330
Optical Disk ENDEC/ECC

9.1  28H Window Control Register *(cont.)*

| | | |
|---|---|---|
| Bits 3-2 | \multicolumn{2}{l}{Resync Mark Window Control: This field controls the size and growth of the Resync Mark Window. The x(y) values describe the width in 2F clock periods of the Resync Mark Window for the 512(1024)-byte Sector Mode.} |

Bits 3-2  Resync Mark Window Control: This field controls the size and growth of the Resync Mark Window. The x(y) values describe the width in 2F clock periods of the Resync Mark Window for the 512(1024)-byte Sector Mode.

- 00: Small Progressive Resync Mark Window

| Number of Missed Resync Marks | Resync Mark Window Width |
  |---|---|
  | 0 | 9(11) |
  | 1 | 15(17) |
  | 2 | 19(25) |
  | 3 or more | 25(31) |

- 01: Large Progressive Resync Mark Window

| Number of Missed Resync Marks | Resync Mark Window Width |
  |---|---|
  | 0 | 15(17) |
  | 1 | 25(31) |
  | 2 | 35(45) |
  | 3 or more | 45(57) |

- 10: Small Fixed Resync Mark Window: The Resync Mark Window is fixed at 19 2F clock periods and does not grow when a Resync Mark is not detected in the Resync Mark Window.
- 11: Large Fixed Resync Mark Window: The Resync Mark Window is fixed at 35 2F clock periods and does not grow when a Resync Mark is not detected in the Resync Mark Window.

Bits 1-0  ID Skip Control: DRG will not be asserted until the selected number of ID fields has been skipped.
- 00: Normal ID Detection Mode
- 01: Skip first ID Field
- 10: Skip first and second ID fields
- 11: Skip all three ID fields

CL-SM330
*Optical Disk ENDEC/ECC*

9.2 29H TOF Window Control

| | |
|---|---|
| Bits 7-4 | TOF Window Delay: This value specifies the delay, in increments of two 2F clock periods, between a fixed position one byte before the expected position of the ODF and the assertion of the TOFWIN Signal when a true Sector Mark has been detected. Nominal value is eight. |
| Bits 3-0 | TOF Window Length: This value specifies the length of time, in increments of two 2F clock periods, that the TOFWIN Signal will be asserted when a true Sector mark is detected. Nominal value is eight. A value of zero means that TOFWIN will not be asserted. |

9.3 2AH Sector Mark/ALPC Length

| | |
|---|---|
| Bit 7 | Enable Relaxed Sector Mark Detection<br>0: Mark/Space lengths must be +0/-1 2F bit.<br>1: Mark/Space lengths must be +0/-2 2F bits. |
| Bit 6 | Enable Sector Mark Asymmetry Compensation<br>0: Sector Mark Asymmetry circuitry is disabled.<br>1: Sector Mark Asymmetry circuitry is enabled. |
| Bit 5 | Shorten/Lengthen Sector Marks (if Bit 6 is set)<br>0: Marks are shortened by one-half of one 2F clock period.<br>1: Marks are lengthened by one-half of one 2F clock period. |
| Bits 4-0 | ALPC Window Length: This value specifies the length of time (in increments of two 2F clock periods) that the ALPCWIN Signal will be asserted when a true Sector Mark has been detected and the sector is to be written or when the Enable ALPC on reads bit is set and a Read Operation is active. The nominal value is 16. A value of zero means that ALPCWIN will not be asserted. Note that two 2F clocks equals one NRZ Bit time. |

CL-SM330
Optical Disk DEC/ECC

9.4  2BH LFLD Control/ALPC Delay

| | |
|---|---|
| Bit 7 | Loss-Of-Frequency-Lock Detected (read only): This bit is set when LFLD is asserted (if the Internal/LFLD Select Bit is set) or when the internal Loss-Of-Frequency-Lock circuitry detects Loss-Of-Frequency-Lock (if the Internal/LFLD Select Bit is not set). This bit is reset when the microcontroller reads this register. |
| Bit 6 | LFLD Polarity Select<br>0: Negative true.<br>1: Positive true. |
| Bit 5 | Internal/LFLD Input Select<br>0: Select internal Loss-Of-Frequency-Lock detection to initiate PLL Relock Sequence.<br>1: Select LFLD Input to initiate PLL Relock Sequence. |
| Bits 4-0 | ALPC Window Delay<br>Reference Figures A-1 and A-4. This value specifies the delay, in increments of two 2F clock periods, from a fixed position four bytes before the expected position of the VFO3 field to the leading edge of the ALPCWIN Signal. The nominal value is 16. Note that two 2F clocks equals one NRZ Bit time. |

9.5 2CH PLL Polarity/Lock Control

| Bit 7 | PLLIS Polarity Select<br>0: Negative true.<br>1: Positive true. |
|---|---|
| Bit 6 | PLLMS Polarity Select<br>0: Negative true.<br>1: Positive true. |
| Bit 5 | PLLGS Polarity Select<br>0: Negative true.<br>1: Positive true. |
| Bit 4 | PLLMS Lock Delay Enable<br>0: PLLMS follows DRG during initial PLL lock.<br>1: PLLMS follows PLLGS during initial PLL lock. In either case, PLLMS follow PLLIS during PLL relock. |
| Bits 3-0 | PLL Lock Delay Count: This value specifies the delay, in increments of eight 2F clock periods, from the assertion of DRG and PLLIS to the assertion of PLLGS, and PLLIS if Bit 4 of this register is set, when acquiring initial PLL synchronization over a VFO Area. |

9.6 2DH PLL Relock Control

If this register is zero, no Loss-Of-Frequency-Lock Recovery Operation will be initiated by the CL-SM330, regardless of whether internal or external detection of Loss-Of-Frequency-Lock is selected, but detection of Loss-Of-Frequency-Lock by the selected source will still be latched into the Loss-Of-Frequency-Lock Detected Bit.

| Bits 7-4 | PLL Relock Time Count: This value specifies the delay, in increments of eight 2F clock periods, from the deassertion to the reassertion of PLLIS and PLLMS when re-acquiring PLL synchronization over data. |
|---|---|
| Bits 3-0 | PLL Relock Delay Count: This value specifies the delay, in increments of eight 2F clock periods, from the reassertion of PLLIS and PLLMS to the reassertion of PLLGS when re-acquiring PLL synchronization over data. |

CL-SM330
*Optical Disk ENDEC/ECC*

9.7 2EH LFLD Window Control

| | |
|---|---|
| Bits 7-4 | Internal Loss-of-Frequency-Lock Window Count: This value specifies the length, in increments of 16 2F clock periods, of the window under which data clocks are counted and compared. |
| Bits 3-0 | Internal Loss-of-Frequency-Lock Tolerance Count: This value specifies the maximum number of clocks (+/-) by which the reference clock count and the data clock count may differ before Loss-Of-Frequency-Lock is detected. |

CL-SM330
*Optical Disk ENDEC/ECC*

10. ECC CONTROL REGISTERS

10.1 30H Error Correction Status (read only)

When an error condition causes any of the bits in this register to be set, the CL-SM330 will set the ECC Error Pending Bit. If the Enable ECC Error Interrupts Bit is set, it will halt the operation and generate a microcontroller interrupt. Bits 7-0 of this register are cleared when the microcontroller writes '1' to the ECC Error Pending Bit in the Interrupt Status Register. During a Read Sector Operation for which the Read Continuously Bit is set, Bits 7-4 of this register do not cause the ECC Error Pending Bit to be set nor a microcontroller interrupt to be generated. These Bits (7-4) are cleared each time the Error Corrector begins correcting a sector.

| | |
|---|---|
| Bit 7 | Uncorrectable Error Detected by ECC: This bit is set if an uncorrectable error is detected by the error-correcting code. |
| Bit 6 | Uncorrectable Error Detected by CRC: This bit is set if the adjusted Reed-Solomon CRC residue is not zero after error correction was complete, and no uncorrectable error was detected by the error-correcting code. This indicates that ECC miscorrection of an uncorrectable error occurred. |
| Bit 5 | Error Exceeding Threshold Detected: This bit is set if an error is detected that exceeds the Sector Correction Threshold or the Interleave Correction Threshold. The Sector Correction Status and Interleave Correction Status registers in the Error Corrector RAM may be examined to determine which threshold was exceeded, or whether both were exceeded. |
| Bit 4 | ECC Correction Time Overrun Occurred: This bit is set if correction of a sector has not been completed before the first CRC redundancy byte of the following sector is read. When error correction of the sector has been completed, the Read Sector Operation for the following sector and any remaining sectors must be restarted after disk orientation has been reestablished. |
| Bit 3 | CL-SM330 Hardware Error Detected: This bit is set if a hardware error within the CL-SM330 is detected (e.g., a shift-register parity error). |
| Bit 2 | VREADY/VERROR Signal Error: This bit is set if an error correction vector synchronization error is detected (i.e., if the CL-SM331 does not deassert VREADY during an error correction vector transfer). This bit is also set whenever the CL-SM331 asserts VERROR. |
| Bit 1 | NRZ CRC Checksum Error: This bit is set if the 8-bit CRC checksum received from the CL-SM331 differs from that calculated by the CL-SM330 over the received user data, VU/PTR, and CRC/ECC redundancy bytes during a Write Sector Operation. |

CL-SM330
Optical Disk ENDEC/ECC

10.1  30H Error Correction Status (read only) *(cont.)*

| | |
|---|---|
| Bit 0 | Operational Overrun Error: This bit is set when any of the following conditions occurs: |
| | i) It is permissible for the microcontroller to write the Data Buffer Address registers for a second operation after data transfer for the first operation is complete, but before the Operation Complete Bit is set for the first operation. This bit is set if the microcontroller attempts to write any of the Data Buffer Address registers (addresses 1CH-1EH or 57H-59H) while data transfer is active. |
| | ii) It is permissible for the CL-SM330 to complete error correction for a second sector before the microcontroller has reset the Error Correction Complete Bit for the previous sector. This bit is set if the Enable Error Correction Complete Int Bit is set and the CL-SM330 completes error correction for a third sector before the microcontroller resets the Error Correction Complete Bit for the first sector. If the Enable Error Correction Complete Bit is reset, the microcontroller need not reset the Error Correction Complete Bit for every sector. |
| | iii) When performing consecutive single-sector operations, it is permissible for the CL-SM330 to complete a second operation before the microcontroller has reset the Operation Complete Bit for the previous operation. This bit is set if the CL-SM330 completes a third operation before the microcontroller resets the Operation Complete Bit for the first operation. |

10.2  31H Error Corrector RAM Address

| | |
|---|---|
| Bit 7-0 | Error Corrector RAM Address: When this register is written, the value written determines the address at which the next access to the Error Corrector RAM through the Error Corrector RAM Access Register will be performed. Subsequent Error Corrector RAM accesses will be at successive sequential addresses. Microcontroller access to the Error Corrector RAM is not allowed while the CL-SM330 is executing any Read Sector Operation, or while executing a Write Sector Operation for which the ECC Diagnostic Mode Bit is set, or while the Error Corrector is busy. |

CL-SM330
*Optical Disk ENDEC/ECC*

10.3 32H Error Corrector RAM Data

| | |
|---|---|
| Bit 7-0 | Error Corrector RAM Byte: Reading or writing this location will read from or write to the internal Error Corrector RAM. Following any Read Sector Operation, or a Write Sector Operation for which the ECC Diagnostic Mode Bit is set, the CRC residue/ECC remainder buffer portion of the Error Corrector RAM (RAM addresses 3EH through 91H (E1H) for 512 (1024) byte sectors) contains the CRC residue/ECC redundancy bytes generated. A minimum of four CCLK periods is required between writing the Error Corrector RAM Address and accessing the Error Corrector RAM Data Register, or between successive accesses to the Corrector RAM Data Register.<br><br>At power-up initialization, the microcontroller must write zero to Error Corrector RAM addresses 0FH through 16H and 20H through 27H. Prior to a Read Sector Operation, the microcontroller must initialize the Sector Correction Threshold (RAM address 00H) and the Interleave Correction Threshold (RAM address 01H). After a Read Sector Operation, the Sector Error Status (RAM address 38H), and Interleave Correction Status (RAM address 39H) are valid for the last sector, in which an error was detected and error correction was attempted. |

10.3.1 RAM Addr 00H Sector Correction Threshold

| | |
|---|---|
| Bit 7 | Reserved. This bit must be reset. |
| Bits 6-0: | Maximum Errors/Sector Allowed (0-40 or 0-80): If the Error Corrector detects a total number of errors in a sector exceeding the value written here, the CL-SM330 will set the ECC Error Exceeding Threshold Detected Bit and halt the Read Sector Operation after correction for that sector is completed. A value of 40(80) or greater means that no sector correction threshold is imposed in the 512(1024)-byte Sector Mode. |

CL-SM330
*Optical Disk ENDEC/ECC*

10.3.2 RAM Addr 01H Interleave Correction Threshold

If the Error Corrector detects a number of errors in one interleave exceeding the value written here, the CL-SM330 will set the ECC Error Exceeding Threshold Detected Bit and halt the Read Sector Operation after correction for that sector is completed. A value of eight or greater means that no interleave correction threshold is imposed.

| | |
|---|---|
| Bits 7-4 | Reserved. These bits must be reset. |
| Bits 3-0 | Maximum Errors/Interleave Allowed (0-8). |

10.3.3 RAM Addr 38H Total Sector Error Status

This location is cleared each time the Error Corrector begins correcting a sector.

| | |
|---|---|
| Bit 7 | Reserved. |
| Bits 6-0 | Total Errors/Sector Detected (0-40 or 0-80): The value read here is the total number of bytes in error detected while correcting the previous sector. |

10.3.4 RAM Addr 39H Interleave Error Status

This location is cleared each time the Error Corrector begins correcting a sector.

| | |
|---|---|
| Bits 7-6 | These bits will be set if an uncorrectable ECC error was detected. |
| Bits 5-4 | Reserved. |
| Bits 3-0 | Maximum Errors/Interleave Detected (0-8): The value read here is the maximum number of bytes in error in any one interleave detected while correcting the previous sector, provided no uncorrectable ECC error was detected. |

11. MISCELLANEOUS REGISTERS

11.1 34H Vendor Unique Byte 1

| | |
|---|---|
| Bits 7-0 | During a Write Sector Operation with Bit 5 of Configuration Register 2 reset, this value will be the first Vendor Unique Byte used, as determined by the VU/PTR Source Mode Bit and the selected form factor and sector size. |

11.2 35H Vendor Unique Byte 2

| | |
|---|---|
| Bits 7-0 | During a Write Sector Operation with Bit 5 of Configuration Register 2 reset, this value will be the second Vendor Unique Byte used, as determined by the VU/PTR Source Mode Bit and the selected form factor and sector size. |

11.3 36H Vendor Unique Byte 3

| | |
|---|---|
| Bits 7-0 | During a Write Sector Operation with Bit 5 of Configuration Register 2 reset, this value will be the third Vendor Unique Byte used, as determined by the VU/PTR Source Mode Bit and the selected form factor and sector size. |

11.4 37H Vendor Unique Byte 4

| | |
|---|---|
| Bits 7-0 | During a Write Sector Operation with Bit 5 of Configuration Register 2 reset, this value will be the fourth Vendor Unique Byte used, as determined by the VU/PTR Source Mode Bit and the selected form factor and sector size. |

CL-SM330
*Optical Disk ENDEC/ECC*

 CIRRUS LOGIC

11.5 38H General-Purpose Input (read only)

| | |
|---|---|
| Bits 7-0: | General-Purpose Input 7-0: When read, these bits reflect the current state of GPIN[7:0]. |

11.6 39H General-Purpose Output

| | |
|---|---|
| Bits 7-0 | General-Purpose Output 7-0: When written, these bits set the state of GPOUT[7:0]. When read, these bits reflect the current state of GPOUT[7:0]. |

11.7 2FH, 33H, 3AH-3DH Reserved

These register addresses are reserved.

11.8 3EH Set Sector Mark Window

Writing to this address causes the internal Sector Mark Window Signal to be set. This register is to be used for test purposes only.

11.9 3FH Test Register

| Bit 7 | Reserved. |
|---|---|
| Bit 6 | Disable DWG:<br>0: Normal operation.<br>1: When this bit is set, the CL-SM330 will not assert DWG. This bit may be set during self-testing and diagnostic operations to allow testing of the ECC write redundancy generation circuitry without writing to the medium. This bit must be reset for normal operation. |
| Bit 5 | Enable Short Sector Test Mode:<br>0: Normal operation.<br>1: When this bit is set, the CL-SM330 uses 90/100/180-byte sectors instead of the standard 600/610/1200-byte sectors. This bit must be reset for normal operation. |
| Bit 4 | Enable ECC Diagnostic Mode:<br>0: (Normal operation) During a Read Sector Operation, user data bytes, Vendor Unique or Pointer (VU/PTR) bytes, and CRC/ECC redundancy bytes read from the medium are transferred over the NRZ line to the CL-SM331. Following the last such byte, an eight-bit CRC checksum is transferred by the CL-SM330 to be checked by the CL-SM331. Error correction vectors will be generated only for user data bytes (and VU/PTR bytes, if Bit 5 of Configuration Register 2 is set), unless the Suppress Correction Vectors Bit is set, in which case no correction vectors will be sent.<br><br>During a Write Sector Operation, user data bytes are transferred over the NRZ line from the CL-SM331 after being fetched from the data buffer. VU/PTR bytes are sourced as determined by Bits 5 and 4 of Configuration Register 2. The user data bytes, VU/PTR bytes, and the CRC/ECC redundancy bytes generated by the CL-SM330 are written to the disk, if the Disable DWG Bit is reset. The CL-SM331 also sends dummy VU/PTR bytes and/or CRC/ECC redundancy bytes that are discarded by the CL-SM330, but which are covered along with the user data bytes by an eight-bit CRC checksum that is checked by the CL-SM330. |

CL-SM330
*Optical Disk ENDEC/ECC*

 CIRRUS LOGIC

11.9 3FH Test Register *(cont.)*

| | |
|---|---|
| Bit 4 | Enable ECC Diagnostic Mode:<br>1: During a Read Sector Operation, user data bytes, Vendor Unique or Pointer (VU/PTR) bytes, and CRC/ECC redundancy bytes read from the medium are transferred over the NRZ line to the CL-SM331. Following the last such byte, an eight-bit CRC checksum is transferred by the CL-SM330 to be checked by the CL-SM331. Error correction vectors will be generated for all user data bytes, VU/PTR bytes, and CRC/ECC redundancy bytes (Ignoring the state of Bit 5 of Configuration Register 2), unless the Suppress Correction Vectors Bit is set, in that case no correction vectors will be sent.<br><br>During a Write Sector Operation, user data bytes, VU/PTR bytes, and CRC/ECC redundancy bytes are transferred over the NRZ line from the CL-SM331 after being fetched from the data buffer, and if the Disable DWG Bit is reset, written to the disk. Following the last such byte, an eight-bit CRC checksum is transferred by the CL-SM331 and checked by the CL-SM330. The ECC generator is in Read Mode and compares its generated redundancy bytes to those coming from the data buffer, storing the remainders so formed into the Error Corrector RAM and attempting to correct the sector after all the redundancy bytes have been written. |
| Bits 3-0 | Test Mode Bits 3-0: These four bits must all be zero in order for the CL-SM330 to operate normally. |

CL-SM330
*Optical Disk ENDEC/ECC*

12. ELECTRICAL SPECIFICATION

12.1 Absolute Maximum Ratings

| Parameter | Minimum | Maximum | Units |
|---|---|---|---|
| Ambient Temperature Under Bias | 0 | 70 | °C |
| Storage Temperature | -65 | 150 | °C |
| Voltage On Any Pin | -0.3 | $V_{DD}$ + 0.3 | Volts |
| Power Dissipation |  | 0.500 | Watt |
| Power Supply Voltage | -0.3 | 7.0 | Volts |

NOTE:

Stresses above those listed may cause permanent damage to the device. This is a stress rating only, and functional operation of the device at these conditions, or any conditions outside those indicated in the operational sections of this specification, is not implied. Exposure to absolute maximum rating conditions for extended periods may affect device reliability.

CL-SM330
Optical Disk ENDEC/ECC

12.2 DC Characteristics

| Symbol | Parameter | Minimum | Maximum | Units |
|---|---|---|---|---|
| $V_{DD}$ | Supply High Voltage | 4.75 | 5.25 | Volts |
| $V_{IL}$ | Input Low Voltage | -0.3 | 0.8 | Volts |
| $V_{IH}$ | Input High Voltage | 2.0 | $V_{CC}$ + 0.3 | Volts |
| $V_{ILs}$ | Schmitt $V_{il}$ | -0.3 | 0.7 | Volts |
| $V_{IHs}$ | Schmitt $V_{ih}$ | 2.1 | $V_{CC}$ + 0.3 | Volts |
| $V_{OL}$ | Output Low Voltage |  | 0.4 | Volts @ $I_{OL}$ = 2.0 mA |
| $V_{OH}$ | Output High Voltage | 2.4 |  | Volts @ $I_{OH}$ = -400 uA |
| $I_{DD}$ | Supply Current |  | 150 | mAmps |
| $I_L$ | Input Leakage Current | -10 | +10 | uAmps |
| $C_{IN}$ | Input Capacitance |  | 10 | pFarads |
| $C_{OUT}$ | Output Capacitance |  | 10 | pFarads |

12.3 AC Characteristics

NOTE:

All clocks are 60/40 percent duty cycle. Rise and fall times should not exceed 15% of the clock period. All AC timings are specified at 50 pF plus one TTL load.

12.3.1 Microcontroller Interface Timing Parameters

| Symbol | Parameter | Min | Max | Units |
|---|---|---|---|---|
| tA | ALE width | 20 | | ns |
| tAW | ALE ↓ to WR* ↓ or DS ↑ | 20 | | ns |
| tAR | ALE ↓ to RD* ↓ or DS ↑ | 10 | | ns |
| tW | WR* width | 30 | | ns |
| tR | RD* width | 50 | | ns |
| AS | Address valid to ALE ↓ | 10 | | ns |
| AH | ALE ↓ to address invalid | 10 | | ns |
| CS | CS* ↓ to RD* ↓, WR* ↓ or DS ↑ | 10 | | ns |
| CH | RD* ↑, WR* ↑ or DS ↓ to CS* ↑ | 10 | | ns |
| WDS | Write data valid to WR* ↑ or to DS ↓ | 30 | | ns |
| WDH | WR* ↑ or DS ↓ to Write data invalid | 10 | | ns |
| tDA | RD* ↓ or DS ↑ to Read data valid | | 35 | ns |
| tDH | RD* ↑ or DS ↓ to Read data invalid | 5 | | ns |
| tDZ | RD* ↑ or DS ↓ to Read data un-driven | | 30 | ns |
| tDS | DS width | 50 | | ns |
| tSRW | R/W* valid to DS ↑ | 20 | | ns |
| tHRW | DS ↓ to R/W* invalid | 20 | | ns |

CL-SM330
Optical Disk ENDEC/ECC
12.3.1.1 Register Read Operation in Intel Mode
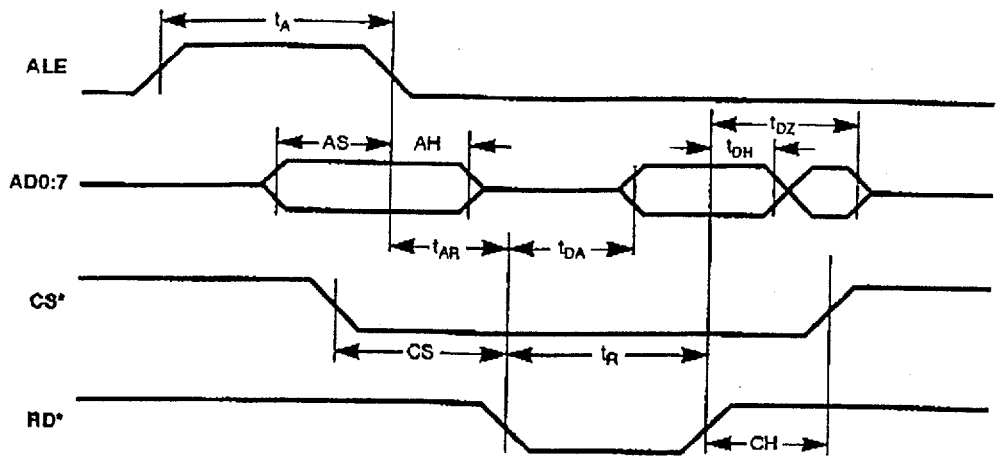
12.3.1.2 Register Read Operation in Motorola Mode
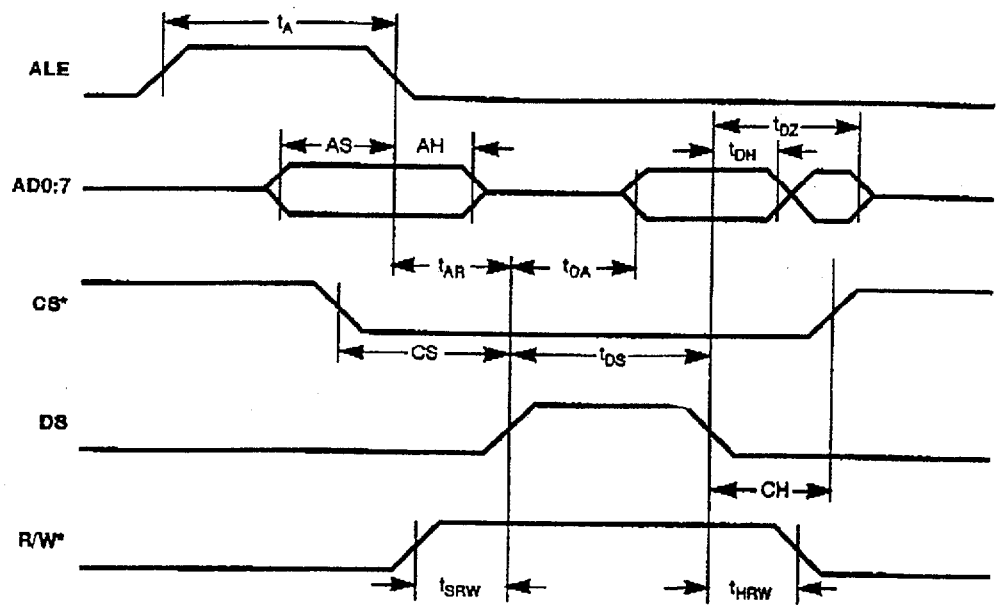

12.3.1.3 Register Write Operation in Intel Mode
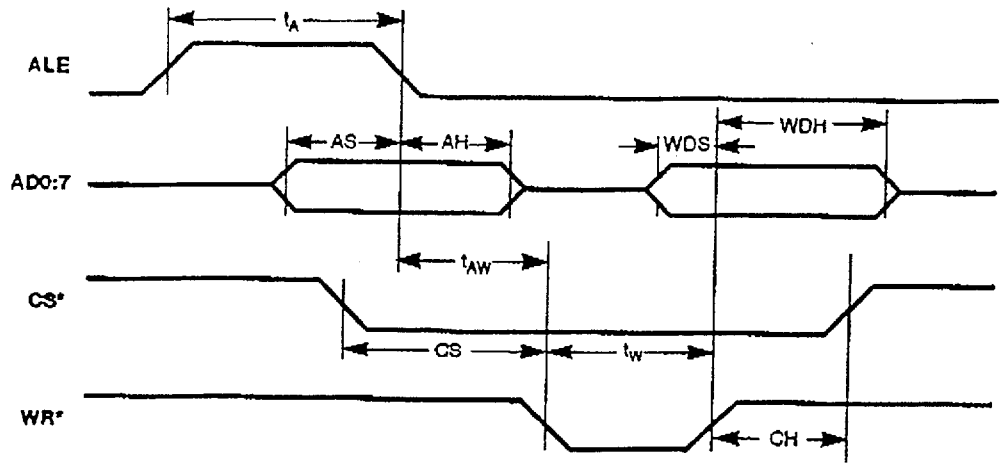
12.3.1.4 Register Write Operation in Motorola Mode
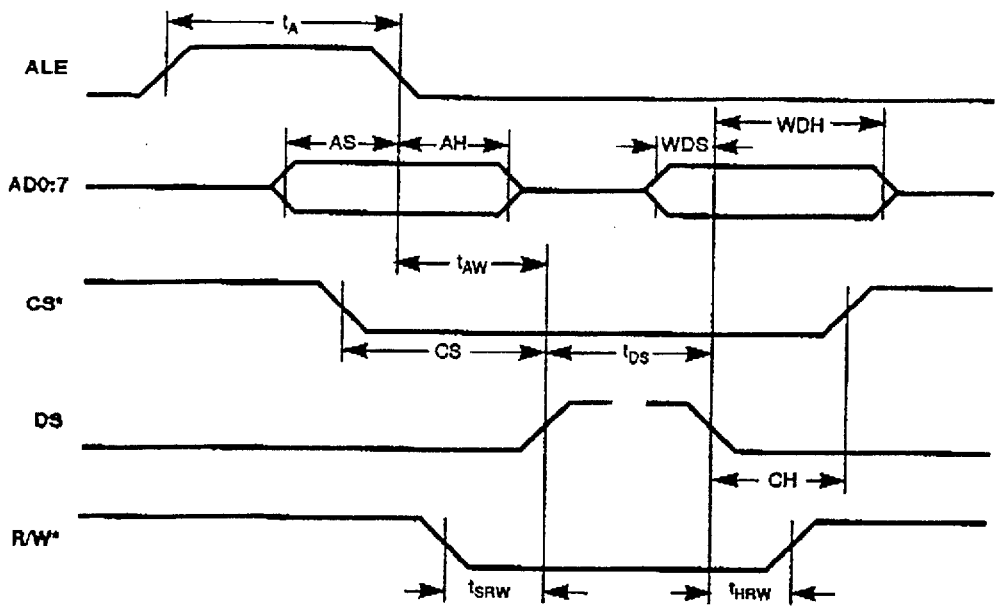

CL-SM330
*Optical Disk ENDEC/ECC*

12.3.2 Device Interface Timing Parameters

| Symbol | Parameter | Minimum | Maximum | Units |
|---|---|---|---|---|
| $PLL_t$ | PLLCLK period | 20.5 | | ns |
| $PLL_{t/2}$ | PLLCLK high/low time | 8 | | ns |
| $RLLD_s$ | RLLIN valid to PLLCLK ↑ | 10 | | ns |
| $RLLD_h$ | PLLCLK ↑ to RLLIN invalid | 5 | | ns |
| $REF_t$ | REF2F period | 20.5 | | ns |
| $REF_{t/2}$ | REF2F high/low time | 8 | | ns |
| $RLLD_v$ | REF2F ↑ to RLLOUT valid | | 25 | ns |
| $RAW_{tp}$ | RAWIN data pulse width | 10 | | ns |
| $RAW_{tr}$ | RAWIN rise time | | 5 | ns |
| $RAW_{tf}$ | RAWIN fall time | | 5 | ns |

12.3.2.1 Device Interface Timing
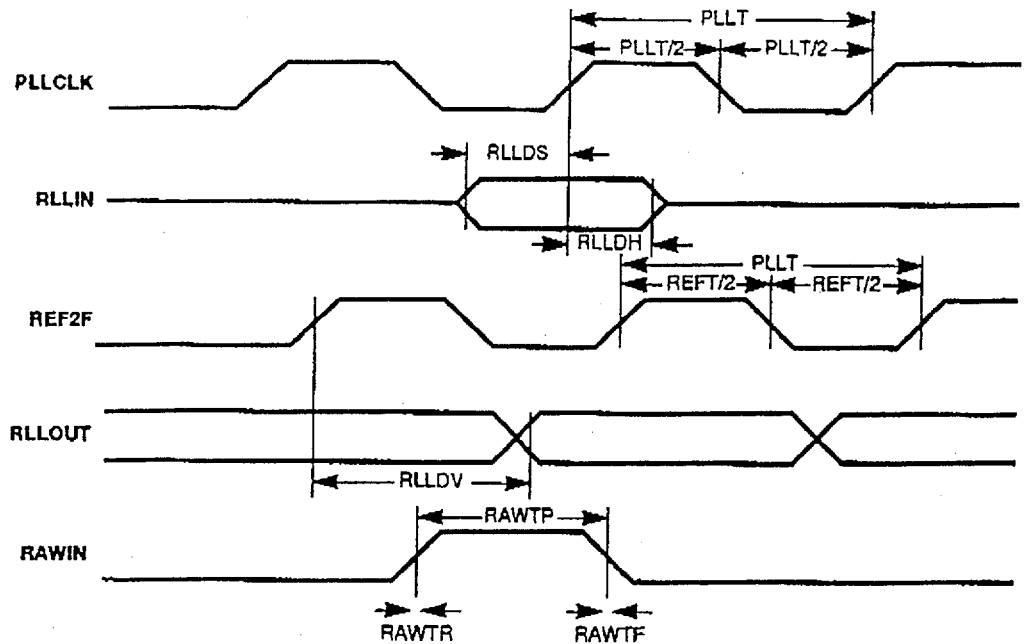

CL-SM330
*Optical Disk ENDEC/ECC*

12.3.3 CL-SM331 Interface Timing Parameters

| Symbol | Parameter | Minimum | Maximum | Units |
|---|---|---|---|---|
| $RR_t$ | RRCLK period | 41 | | ns |
| $RR_{t/2}$ | RRCLK high/low time | 16 | | ns |
| $NRZ_s$ | NRZ valid to RRCLK ↑ | 10 | | ns |
| $NRZ_h$ | RRCLK ↑ to NRZ invalid | 5 | | ns |
| $NRZ_v$ | RRCLK ↑ to NRZ valid | 5 | 25 | ns |
| t | SYSCLK period | 40 | | ns |
| t/2 | SYSCLK high/low time | 16 | | ns |
| $VCTR_v$ | SYSCLK ↑ to VECTOR valid | 5 | 25 | ns |
| $VRDY_s$ | VREADY valid to SYSCLK ↑ | 10 | | ns |
| $VRDY_h$ | SYSCLK ↑ to VREADY invalid | 5 | | ns |
| $VERR_s$ | VERROR valid to SYSCLK ↑ | 10 | | ns |
| $VERR_h$ | SYSCLK ↑ to VERROR invalid | 5 | | ns |
| C | CCLK period | 40 | | ns |
| C/2 | CCLK high/low time | 16 | | ns |

12.3.3.1 RRCLK/NRZ Timing
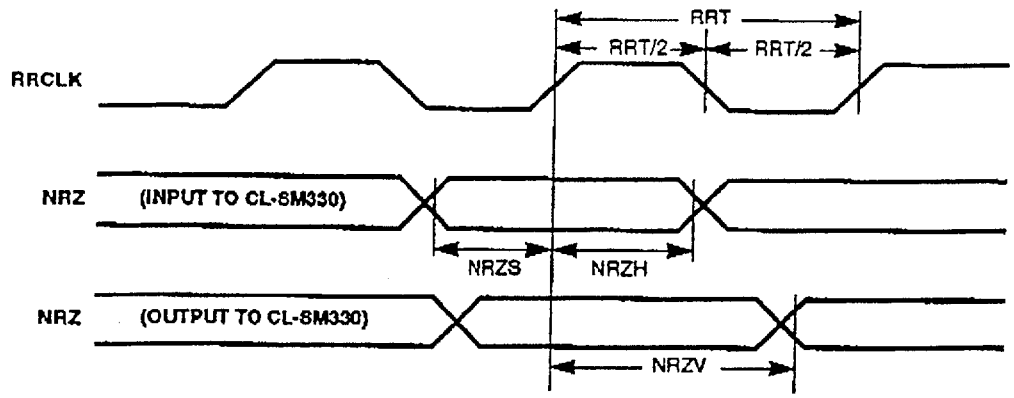
12.3.3.2 Corrector/Error Vector Transmission Timing
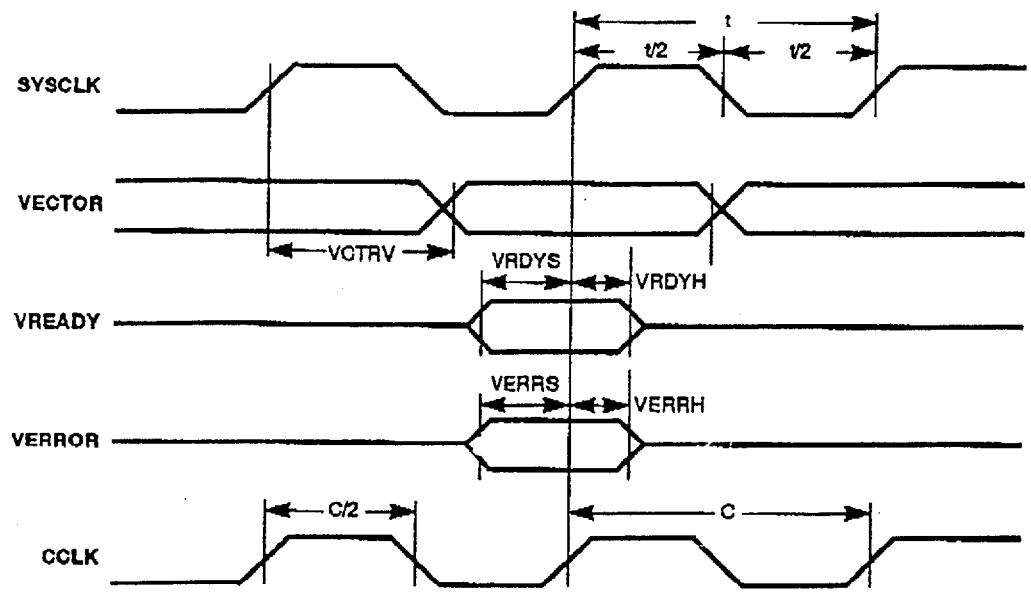

CL-SM330
*Optical Disk ENDEC/ECC*
12.3.4 Mark Detection Timing Parameters
| Symbol | Parameter | Minimum | Maximum | Units |
|---|---|---|---|---|
| $SMD_t$ | SMDET high time | $3*RR_t$ | | |
| $IDF_d$ | Last bit of CRC3 to IDF ↑[1] | $13*RR_t$ | $21*RR_t$ | |
| $IDF_t$ | IDF high time | $4*RR_t$ | | |
NOTE:
Provided Sector Mark is detected and at least one error-free ID field is read.
12.3.4.1 Sector Mark Detect Timing
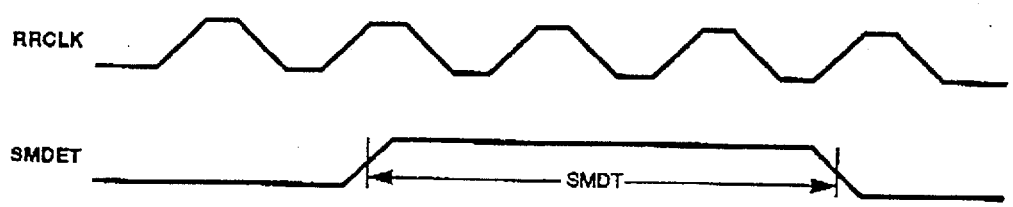
12.3.4.2 ID Found Timing
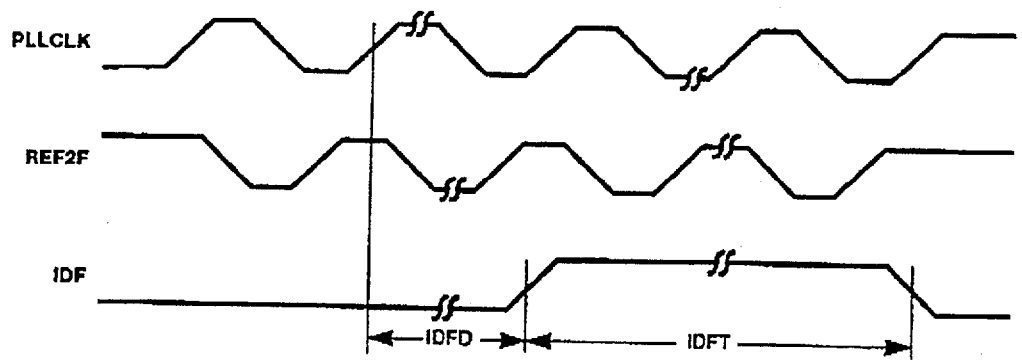

CL-SM330
Optical Disk ENDEC/ECC
13. TYPICAL APPLICATION
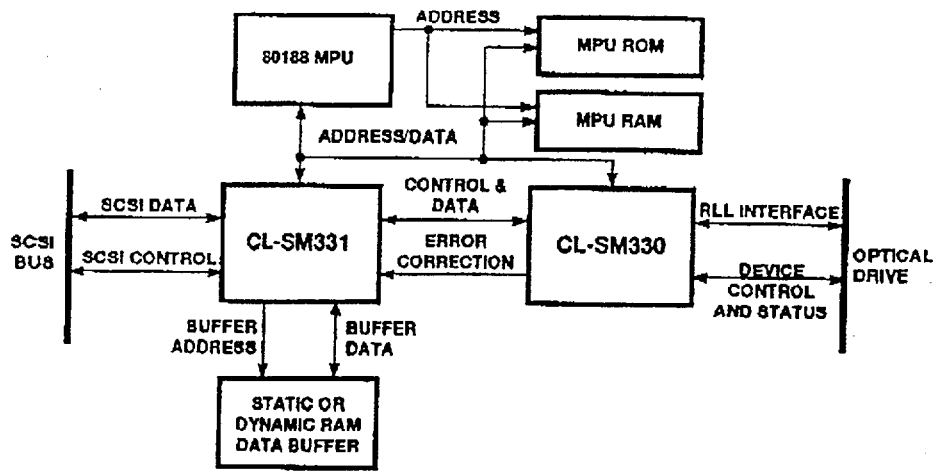
14. ORDERING INFORMATION
Numbering Guide
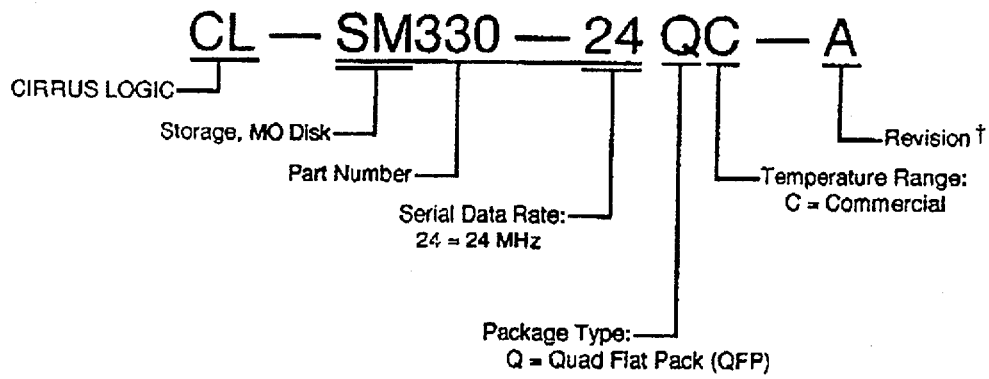
† Contact CIRRUS LOGIC for up-to-date information on revisions.

CL-SM330
*Optical Disk ENDEC/ECC*
Appendix A
ANSI/ISO Standard Track Formats

CL-SM330
*Optical Disk ENDEC/ECC*
1. ANSI/ISO STANDARD TRACK FORMATS
1.1 90 mm Sector Format
The overall layouts for the 90 mm re-writable sector formats are shown below. There is no standard format for 90 mm write-once media. Parenthesized numbers refer to the 1024-byte Sector Format.
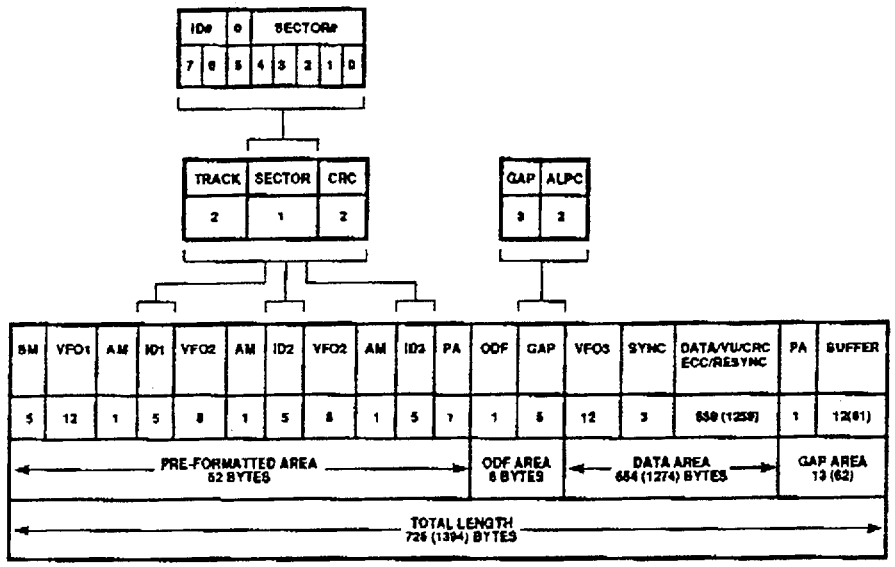
Figure A-1. 90 mm 512(1024)-Byte Sector Format

CL-SM330
Optical Disk ENDEC/ECC

1.1.1  90 mm 512-Byte Data Field

The organization of the 90 mm 512-byte Data Field is shown below. It comprises 512 bytes of user data, four bytes of vendor unique information, four bytes of CRC redundancy, and 80 bytes of ECC redundancy, all preceded by the three-byte Data Sync Mark and interspersed at 15-byte intervals with 39 Resync Mark bytes. If the vendor unique information is not used, it is to be set to hex 'FF'.

| SB1 | SB2 | SB3 | D1 | D2 | D3 | D4 | D5 |
|---|---|---|---|---|---|---|---|
| | | | D6 | D7 | D8 | D9 | D10 |
| | | | D11 | D12 | D13 | D14 | D15 |
| | | RS1 | D16 | D17 | D18 | D19 | D20 |
| | | | D21 | D22 | D23 | D24 | D25 |
| | | | .. | .. | .. | .. | .. |
| | | | D506 | D507 | D508 | D509 | D510 |
| | | RS34 | D511 | D512 | VU1 | VU2 | VU3 |
| | | | VU4 | CRC1 | CRC2 | CRC3 | CRC4 |
| | | | E1,1 | E2,1 | E3,1 | E4,1 | E5,1 |
| | | RS35 | E1,2 | E2,2 | E3,2 | E4,2 | E5,2 |
| | | | E1,3 | E2,3 | E3,3 | E4,3 | E5,3 |
| | | | E1,4 | E2,4 | E3,4 | E4,4 | E5,4 |
| | | | .. | .. | .. | .. | .. |
| | | RS39 | E1,14 | E2,14 | E3,14 | E4,14 | E5,14 |
| | | | E1,15 | E2,15 | E3,15 | E4,15 | E5,15 |
| | | | E1,16 | E2,16 | E3,16 | E4,16 | E5,16 |

Figure A-2. 512-Byte Sector Data Field Organization

CL-SM330
Optical Disk ENDEC/ECC

1.1.2 90 mm 1024-Byte Data Field

The organization of the 90 mm 1024-byte Data Field is shown below. It comprises 1024 bytes of user data, four bytes of vendor unique information, eight reserved (hex 'FF') bytes, four bytes of CRC redundancy, and 160 bytes of ECC redundancy, all preceded by the three-byte Data Sync Mark and interspersed at 20-byte intervals with 59 Resync Mark bytes. If the vendor unique information is not used, it is to be set to hex 'FF'.

| SB1 | SB2 | SB3 | D1 | D2 | D3 | D4 | D5 | D6 | D7 | D8 | D9 | D10 |
|---|---|---|---|---|---|---|---|---|---|---|---|---|
| | | | D11 | D12 | D13 | D14 | D15 | D16 | D17 | D18 | D19 | D20 |
| | | RS1 | D21 | D22 | D23 | D24 | D25 | D26 | D27 | D28 | D29 | D30 |
| | | | .. | .. | .. | .. | .. | .. | .. | .. | .. | .. |
| | | | D1011 | D1012 | D1013 | D1014 | D1015 | D1016 | D1017 | D1018 | D1019 | D1020 |
| | | RS51 | D1021 | D1022 | D1023 | D1024 | VU1 | VU2 | VU3 | VU4 | FFh | FFh |
| | | | FFh | FFh | FFh | FFh | FFh | FFh | CRC1 | CRC2 | CRC3 | CRC4 |
| | | RS52 | E1,1 | E2,1 | E3,1 | E4,1 | E5,1 | E6,1 | E7,1 | E8,1 | E9,1 | E10,1 |
| | | | .. | .. | .. | .. | .. | .. | .. | .. | .. | .. |
| | | | E1,14 | E2,14 | E3,14 | E4,14 | E5,14 | E6,14 | E7,14 | E8,14 | E9,14 | E10,14 |
| | | RS59 | E1,15 | E2,15 | E3,15 | E4,15 | E5,15 | E6,15 | E7,15 | E8,15 | E9,15 | E10,15 |
| | | | E1,16 | E2,16 | E3,16 | E4,16 | E5,16 | E6,16 | E7,16 | E8,16 | E9,16 | E10,16 |

Figure A-3. 1024-Byte Sector Data Field Organization

CL-SM330
*Optical Disk ENDEC/ECC*
1.2 130 mm Sector Format
The overall layouts for the 130 mm re-writable and write-once sector formats are shown below. Parenthesized numbers refer to the 1024-byte sector format.
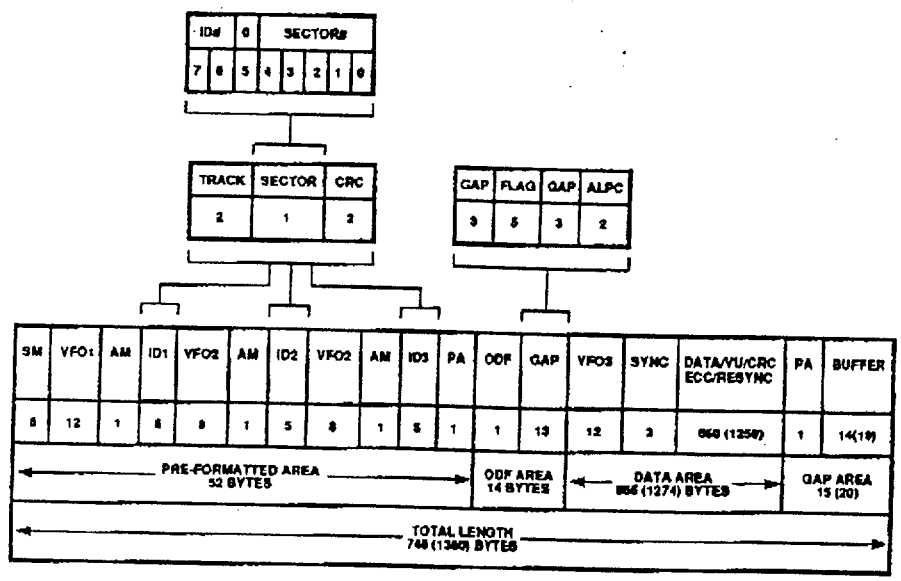
Figure A-4. 130 mm 512(1024)-Byte Sector Format

CL-SM330
Optical Disk ENDEC/ECC

1.2.1  130 mm 512-Byte Data Field

The organization of the 130 mm 512-byte Data Field is shown below. It comprises 512 bytes of user data, 12 bytes of control-pointer information, two reserved (hex 'FF') bytes, four bytes of CRC redundancy, and 80 bytes of ECC redundancy, all preceded by the three-byte Data Sync Mark and interspersed at 15-byte intervals with 40 Resync Mark bytes.

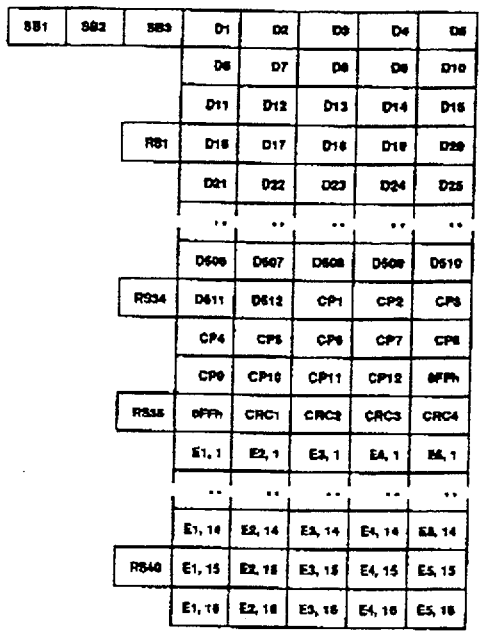

Figure A-5. 512-Byte Sector Data Field Organization

CL-SM330
Optical Disk ENDEC/ECC

1.2.2  130 mm 1024-Byte Data Field

The organization of the 130 mm 1024-byte Data Field is shown below. It comprises 1024 bytes of user data, 12 bytes of control-pointer information, four bytes of CRC redundancy, and 160 bytes of ECC redundancy, all preceded by the three-byte Data Sync Mark and interspersed at 20-byte intervals with 59 Resync Mark bytes.

| SB1 | SB2 | SB3 | D1 | D2 | D3 | D4 | D5 | D6 | D7 | D8 | D9 | D10 |
|---|---|---|---|---|---|---|---|---|---|---|---|---|
|  |  |  | D11 | D12 | D13 | D14 | D15 | D16 | D17 | D18 | D19 | D20 |
|  |  | RS1 | D21 | D22 | D23 | D24 | D25 | D26 | D27 | D28 | D29 | D30 |
|  |  |  | .. | .. | .. | .. | .. | .. | .. | .. | .. | .. |
|  |  |  | D1011 | D1012 | D1013 | D1014 | D1015 | D1016 | D1017 | D1018 | D1019 | D1020 |
|  |  | RS51 | D1021 | D1022 | D1023 | D1024 | CP1 | CP2 | CP3 | CP4 | CP5 | CP6 |
|  |  |  | CP7 | CP8 | CP9 | CP10 | CP11 | CP12 | CRC1 | CRC2 | CRC3 | CRC4 |
|  |  | RS52 | E1,1 | E2,1 | E3,1 | E4,1 | E5,1 | E6,1 | E7,1 | E8,1 | E9,1 | E10,1 |
|  |  |  | .. | .. | .. | .. | .. | .. | .. | .. | .. | .. |
|  |  |  | E1,14 | E2,14 | E3,14 | E4,14 | E5,14 | E6,14 | E7,14 | E8,14 | E9,14 | E10,14 |
|  |  | RS59 | E1,15 | E2,15 | E3,15 | E4,15 | E5,15 | E6,15 | E7,15 | E8,15 | E9,15 | E10,15 |
|  |  |  | E1,16 | E2,16 | E3,16 | E4,16 | E5,16 | E6,16 | E7,16 | E8,16 | E9,16 | E10,16 |

Figure A-6. 1024-Byte Sector Data Field Organization

CL-SM330
Optical Disk ENDEC/ECC

1.3 Sector Format Description

All information in the pre-formatted and data areas (except the 'Mark') is encoded in the run-length-limited code known as (2,7) RLL. The encoding table is shown below.

| NRZ | RLL |
|---|---|
| 000 | 000100 |
| 10 | 0100 |
| 010 | 100100 |
| 0010 | 00100100 |
| 11 | 1000 |
| 011 | 001000 |
| 0011 | 00001000 |

1.3.1 Pre-Formatted Area

The Pre-Formatted (header) area is nominally 52 bytes in length and includes the Sector Mark (SM), Variable Frequency Oscillator (VFO) fields, ID Address marks (ID AM), ID and CRC bytes, and a Postamble (PA) Byte.

The header format contains three ID fields. Each ID Field contains identical information except for the two ID Field identifier bits within the sector byte. In addition, a number of special marks are used for specific detection purposes. Each field used in the Pre-Formatted Area is defined below.

1.3.1.1 Sector Mark

The Sector Mark (SM) Field is a five-byte-long field identifying the beginning of a sector header. The SM Field is composed of two parts. The first part is a sequence of long mark and space patterns. The second part is a high-frequency pattern which effects byte closure on the long mark pattern and provides a smooth transition into the following VFO1 Field. The bit position denoted by 'x' indicates a mark which is optional for some standard formats. The presence or absence of this mark does not affect the operation of the CL-SM330 in any way.

1111 1111 1100 0000 1111 1100 0000 0000 0000 1111

1100 0000 1111 1100 0000 1111 1111 1100 x001 0010

1.3.1.2 ID VFO Areas

The ID VFO fields are either 12 or 8 bytes in length and serve as high-frequency patterns which synchronize the Variable Frequency Oscillator (VFO) Phase Locked Loop (PLL) with the read data signal. The VFO patterns are shown below. Note that VFO2 varies as needed to complete the encoding of the preceding ID CRC byte.

VFO1: 0100 1001 0010 01... 01 0010
VFO2: 1001 0010 0100 10... 01 0010
or    0001 0010 0100 10... 01 0010

1.3.1.3 ID Address Mark

The ID Address Mark is a special one-byte pattern which indicates the beginning of an ID Field. The ID Address Mark contains a run-length violation of the (2,7) RLL code. The ID Address Mark pattern is shown below:

0100 1000 0000 0100

1.3.1.4 ID/CRC Field

An ID Field consists of five bytes, including two bytes of track address and one byte of sector address covered by two bytes of CRC redundancy calculated using the standard CRC-CCITT polynomial:

$$x^{16} + x^{12} + x^5 + 1$$

The ID CRC calculation is begun with the shift-register preset to all ones. Input and output sequences use the MSB first.

1.3.1.5 Postamble

The last portion of the Pre-Formatted Area consists of a one byte postamble on the third ID Field. Due to the use of the variable-length (2,7) RLL en-

CL-SM330
*Optical Disk ENDEC/ECC*

coding scheme, the encoding of the last ID CRC byte in the last ID Field is uncertain within a few bit times. The postamble allows the last ID CRC byte to achieve closure and permits the ID Field to always end in a predictable manner.

1.3.2 ODF Area

The ODF area includes the ODF/Mirror Mark, Gap Field, and ALPC Field. WORM formats also include a Flag Field and another Gap Field. Each field used in the ODF area is defined as follows.

1.3.2.1 ODF/Mirror Mark

The Offset Detection Flag or Mirror Mark is a field with no grooves or pre-formatted data. The purpose of this field is to allow tracking offset detection within the drive.

1.3.2.2 Gap Field

The Gap Area consists of an unformatted splice area located after the ODF. The purpose of this field is to allow time for hardware to complete processing of the previous ID Field, to allow for the transition from Read to Write (when writing or erasing), and to allow for drive-dependent operations prior to writing the Data Area.

1.3.2.3 Flag Field

The optional Flag Field in WORM formats is provided to prevent inadvertent Write Sector Operations over previously written sectors. If used, the Flag Field is normally written immediately before a verification-read of the Data Area is performed, after the Data Area has been written on a separate revolution. The CL-SM330 can be programmed to write the Flag Field in the same revolution as that in which the Data Field is either read or written. The Flag Field pattern is five bytes of 3T pattern as shown below:

1001 0010 0100...

1.3.2.4 ALPC Field

The ALPC Field is designated as a test zone for calibration of laser power levels by the drive.

1.3.3 Data Area

The Data Area consists of a Data VFO Field, the Data Sync Mark, user data, control-pointer or vendor unique, CRC, and ECC bytes interspersed with Resync Marks.

1.3.3.1 Data VFO Field

The Data VFO Field is 12 bytes in length and serves as a high-frequency pattern which synchronizes the PLL with the read data signal. This pattern is identical to the VFO1 pattern as shown below:

VFO3: 0100 1001 0010 01... 01 0010

1.3.3.2 Data Sync Mark

The Data Sync Mark is a special three-byte pattern which indicates the beginning of the user data. The Data Sync Mark pattern is shown below:

0100 0010 0100 0010 0010 0010 0100 0100 1000 0010 0100 1000

1.3.3.3 Resync Mark

The Resync Mark is a one-byte pattern interspersed at regular intervals after the Data Sync Mark within the Data Area. It serves to limit the propagation of errors and to regain bit and byte synchronization when the VFO must ride through defects within the Data Area. The Resync Mark pattern is shown below:

0010 0000 0010 0100

The structure of the Resync Mark pattern allows it to complete the (2,7) RLL encoding of the preceding information byte. Resync Marks are used only in the Data Area. One Resync Mark is inserted after every 15 information bytes for 512-byte sectors and after every 20 information bytes for 1024-byte sectors.

1.3.4 Buffer Area

The Buffer Area consists of an area reserved to absorb motor speed tolerances and other electro-

CL-SM330
*Optical Disk ENDEC/ECC* mechanical tolerances during the writing and erasing processes.

No written information is present in the Buffer Area, but the first byte serves as a Data Area Postamble to allow closure of channel bits in the variable-length (2,7) RLL encoding scheme. The CL-SM330 writes this Byte using the Resync Mark pattern. During a Read Sector Operation, any pattern which properly completes RLL encoding of the last ECC Redundancy Byte is allowed.

1.4 Error Correction and Detection Codes

Defect rates for optical disk media are substantially higher than those for magnetic disk media. The CL-SM330 assures data integrity by implementing the ANSI/ISO standard Reed-Solomon error-correcting code and CRC code for the Data Area. 16 ECC redundancy symbols per interleave are used to correct up to eight bytes in error per interleave. Four CRC redundancy symbols per sector are used to detect miscorrection by the error-correcting code. The following sections define these codes and their basic error correction and detection capabilities.

1.4.1 Finite Field Definition

Let $\beta^i$ represent elements of a finite field generated by the following polynomial over GF(2):

$$x^8 + x^5 + x^3 + x^2 + 1$$

Elements of the finite field employed by the codes implemented are given by the following:

$$\alpha^i = (\beta^i)^{88}$$

1.4.2 Error-Correcting Code Description

The error-correcting code implemented is a long-distance, interleaved, Reed-Solomon code operating on eight-bit symbols. ECC redundancy bytes are inverted (EXCLUSIVE-OR-ed with hex 'FF') before writing. In a shift-register implementation, the shift-register is initialized to zero.

The ECC generator polynomial is of degree sixteen, distance seventeen, self-reciprocal, with coefficients from GF(256):

$$G(x) = \prod_{i=120}^{135} (x + \alpha^i)$$

The coefficients of the ECC generator polynomial (in hexadecimal) are as following:

01 5C A0 56 0B 44 02 01 A7 01 02 44 0B 56 A0 5C 01

The number of ECC redundancy bytes per interleave is 16. The total number of ECC redundancy bytes per sector is the number of ECC redundancy bytes per interleave multiplied by the number of interleaves for the selected sector size.

CL-SM330
*Optical Disk ENDEC/ECC*

The formula used for the calculations is given below:

$$P_{uce} = \frac{1}{k \times n} \sum_{i > e}^{n} \left[\begin{array}{c} n \\ i \end{array}\right] p^i (1-p)^{n-i}$$

where

- n = interleave length in symbols (n = 120 in this case)
- k = Symbol width in bits (k = 8 for byte symbols)
- e = Maximum number of symbol errors correctable per interleave (e = 8 for hardware correction)
- p = Raw symbol error probability (in units of symbol errors per symbol)

Note that for the assumption of small bursts only,

- p = k*RAW BURST ERROR RATE, where units of RAW BURST ERROR RATE is burst error events per bit

1.4.5 ECC Misdetection Probability

When the number of errors in an interleave exceeds the guaranteed correction power of the error-correcting code, it is possible for the ECC remainder bytes produced to be identical to those produced by some correctable set of errors. This is called miscorrection, since the correction algorithm will leave the real errors in place and 'correct' the apparent set of errors, creating errors not caused by media defects. Using the error-correction algorithm implemented within the CL-SM330, the miscorrection probability of the error-correcting code is given by the following:

$$P_{mc} = \frac{\# \text{ of remainder bytes}}{\# \text{ of possible remainder bytes}} = \sum_{i=0}^{s} \frac{\frac{n}{i} 255^i}{256^{(e+i)}}$$

where $$\left[\begin{array}{c} n \\ r \end{array}\right] = \frac{n!}{r!(n-r)!} = \prod_{j=0}^{r-1} \frac{(n-j)}{(r-j)}$$

As an example, one interleave of a 512 data-byte, five interleave sector in the 90 mm re-writable format is 120 bytes in length (104 data/VU/CRC bytes and 16 ECC redundancy bytes). When the error-correcting code is used to correct up to eight symbols in error, the miscorrection probability is $$P_{mc} = \sum_{i=0}^{8} \frac{\left[\begin{array}{c} 120 \\ i \end{array}\right] 255^i}{256^{(8+i)}} = 4.7\text{E-}8$$

in units of miscorrected interleaves per uncorrectable interleave.

1.4.6 CRC Misdetection Probability

When an uncorrectable error occurs, which is miscorrected by the error-correcting code, it is possible, though extremely unlikely, for the CRC residue bytes produced to be all zero. This is called misdetection, since the CRC code would fail to detect the existence of the uncorrectable error. The statistical misdetection probability of the CRC code is given by $$P_{md} = 2^{-32} = 2.3\text{E-}10$$

in units of undetected uncorrectable sectors per uncorrectable sector. The CRC misdetection probability is independent of the sector size and number of interleaves.

1.4.7 Probability Of Undetected Error

As noted above, only those error events which cause the number of symbol-errors in any single interleave to exceed eight are subject to miscorrection. For such an error event to be undetected would require both miscorrection by the error-correcting code and misdetection by the CRC code. Thus the probability of occurrence of an undetected, uncorrectable interleave is the product of the probability of occurrence of an uncorrectable interleave, the miscorrection probability of the error-correcting code, and the statistical misdetection probability of the CRC code. The probability of occurrence of an uncorrectable sector is nearly the same as that of an uncorrectable interleave on an events per bit basis, so the probability of transferring undetected erroneous data is given by:

$$P_{ued} = P_{uce} * P_{mc} * P_{md}$$

Using values for $P_{uce}$, $P_{mc}$, and $P_{md}$ from above, the probability of transferring undetected erroneous data under a random one-byte error distribution with a raw burst error rate of 1.E-4 per bit for 512 data-byte, five-interleave sectors in the 90 mm re-writable format is:

$$P_{ued} = 1.4E\text{-}18 * 4.7E\text{-}8 * 2.3E\text{-}10 = 1.5E\text{-}35$$

in units of undetected erroneous sectors per bit, excluding hardware-failure and track-format-induced errors. Note well that this computation was performed using a value for $P_{uce}$ which assumed an error burst-length distribution which is not realistic for optical media. However, even if $P_{uce}$ is several orders of magnitude higher, $P_{ued}$ will still be less than 1E-30.

CL-SM330
Optical Disk ENDEC/ECC

1.4.3 CRC Code Description

The CRC code implemented is a Reed-Solomon code operating on one-byte symbols which are the EXCLUSIVE-OR sum of data bytes across interleaves. There are four CRC redundancy bytes per sector, regardless of the number of interleaves. CRC redundancy bytes are not inverted, are written immediately after the user data and VU/PTR bytes, and are covered by the error-correcting code. In a shift-register implementation, the shift-register is initialized to zero.

The CRC code is specially constructed so that its residue can be adjusted as correction occurs; when correction is complete, the residue should have been adjusted to zero.

The CRC generator polynomial is of degree four, distance five, with coefficients from GF(256):

$$G(x) = \prod_{i=136}^{139} (x + \alpha^i)$$

The coefficients of the CRC polynomial (in hexadecimal, high order first) are as following:

01 E8 C2 23 C6

The CRC code combined with the error-correcting code provides adequate protection against sync framing errors. The Resync Error Threshold provides additional protection against sync framing errors.

1.4.4 ECC Correction Power

To determine the performance of the error-correcting code for a particular application, the burst length distribution must be known. Initial defects that are handled by alternate sector assignment would not be included in the burst length distribution.

For purposes of illustration only, probabilities of uncorrectable error are shown below for a simple defect distribution in which error bursts are assumed to occur at random intervals and each burst is assumed to affect a single symbol (one byte). It is important to note that this is not a realistic defect distribution assumption for optical media. For defect distributions in which error bursts cluster or error bursts span more than one symbol, each of which may be likely for optical media, the actual uncorrectable error rates may be significantly greater than those shown.

The calculations assume that the error-correcting code is used to correct up to eight bytes in error per interleave in 512 data-byte, five-interleave sectors in the 90 mm re-writable format. The raw burst error rate is the ratio of burst error events to total bits transferred. The uncorrectable error rate is the ratio of uncorrectable error events to total bits transferred.

| RAW BURST ERROR RATE DEFECT EVENT/BIT | PROBABILITY OF UNCORRECTABLE ERROR ($P_{uce}$) UNCORR. INTERLEAVE EVENTS/BIT |
| --- | --- |
| 1.0E-4 | 1.4E-18 |
| 3.0E-5 | 2.8E-23 |
| 1.0E-5 | 1.4E-27 |
| 3.0E-6 | 2.9E-32 |
| 1.0E-6 | 1.5E-36 |

We claim:

1. A method of detecting a Data Sync Mark in an ISO optical track format having one or more errors therein comprising the steps of;
   (a) segmenting the expected Data Sync Mark pattern into a sequence of 12 expected four-bit groups;
   (b) comparing each four-bit group of the Data Sync Mark detector data stream with its expected four-bit group value to determine whether they match;
   (c) comparing the total number of the four-bit groups matching their expected four-bit group values with a threshold number of four-bit groups to determine if a Data Sync Mark was detected.

2. A method of detecting a Sector Mark when the Sector Mark Marks differ in time length from a predetermined nominal time length by the steps of:
   (a) generating a reference clock;
   (b) sampling the input data to the mark detector on both the rising and falling edges of said reference clock;
   (c) logically ANDing the two samples of step (b) to shorten the detector input when the Sector Mark Marks are shorter in time length than the predetermined nominal time length and logically ORing the two samples of step (b) to lengthen the detector input when the Sector Mark Marks are longer in time length than the predetermined nominal time length.

3. A method of detecting a certain defective Sector Mark comprising the steps of:
    (a) receiving a defective Sector Mark data stream; and
    (b) validating all Sector Mark bits except the first bit of each Sector Mark MARK and SPACE.

4. A method of improving the reliability of special mark detection comprising the steps of:
    (a) windowing each special mark detector; and,
    (b) expanding each subsequent special mark window upon a failure to detect a special mark, up to the maximum window size.

5. A method of detecting a certain defective Sector Mark comprising the steps of:
    (a) receiving a defective Sector Mark data stream; and
    (b) validating all Sector Mark bits except the first and second bits of each Sector Mark MARK and SPACE.

6. A method of detecting a valid Address Mark by keeping the PLL in lock comprised of programming a register to skip the first, or the first two, or all three of the ID fields of a Sector Format.

7. A method of preventing false detection of an Address Mark comprised of programming a window to adjust the Address Mark time delays based on the speed tolerance of the drive, and the drive form factor, and the sector size.

8. A method of preventing false detection of a Data Sync Mark comprised of programming a window to adjust the Data Sync Mark time delays based on the speed tolerance of the drive, the drive form factor, and the sector size.

9. A method of preventing false detection of a Sector Mark comprised of programming a window to adjust the Sector Mark time delays based on the speed tolerance of the drive, and the drive form factor, and the sector size.

10. A method in accordance with claim 9, wherein said window size is programmably adjustable in accordance with the previous sector data field errors.

11. A method of preventing errors when detecting a Sector Mark in a sector format of a disk storage system comprised of widening a programmably adjustable window when the Sector Mark of the previous sector was not found.

12. A method of preventing errors when detecting an Address Mark in a sector format of a disk storage system comprised of widening a programmably adjustable window when the Address Mark of the previous sector was not found.

13. A method of preventing errors when detecting a Data Sync Mark in a sector format of a disk storage system comprised of widening a programmably adjustable window when the Data Sync Mark of the previous sector was not found.

14. A method for detecting Resync Mark with a programmably adjustable window comprising the steps of:
    (a) skipping the first predetermined number of Resync Marks;
    (b) setting the Resync Mark window length to a predetermined number of reference clock cycles of a continuous reference clock signal;
    (c) detecting the initial Resync Mark;
    (d) variably adjusting the size of the Resync Mark window by widening said window size when Resync Mark is missed and shortening said window size when Resync Mark is found.

* * * * *